235-379
12/9/86 OR 4,628,194

United States Patent [19]
Dobbins et al.

[11] Patent Number: 4,628,194
[45] Date of Patent: Dec. 9, 1986

[54] METHOD AND APPARATUS FOR CURRENCY VALIDATION

[75] Inventors: Bob M. Dobbins, Phoenixville; Elwood E. Barnes, Parkesburg, both of Pa.

[73] Assignee: Mars, Inc., McLean, Va.

[21] Appl. No.: 659,411

[22] Filed: Oct. 10, 1984

[51] Int. Cl.[4] .......... G06F 15/30

[52] U.S. Cl. .......... 235/379; 209/534; 235/449; 382/7; 382/18

[58] Field of Search .......... 235/449, 379; 382/7, 382/18, 51; 209/534; 194/4 R, DIG. 14, DIG. 26

[56] References Cited

U.S. PATENT DOCUMENTS 3,870,629 3/1975 Carter et al. .
3,966,047 6/1976 Steiner .
4,283,708 8/1981 Lee .
4,349,111 9/1982 Shah et al. .
4,464,787 8/1984 Fish et al. .
4,470,496 9/1984 Steiner .
4,490,846 12/1984 Ishida et al. .......... 382/7
4,495,585 1/1985 Buckley .......... 382/18 X

*Primary Examiner*—David L. Trafton
*Attorney, Agent, or Firm*—Davis Hoxie Faithfull & Hapgood

[57] ABSTRACT

An improved currency validator having an electrical signal generating sensor for scanning an area of a bank note and generating a sequence of electrical signals in response to the currency identifying characteristics detected by the sensor in the area scanned is described. Circuitry is provided for measuring the intervals between the generated signals, classifying each of the measured intervals into one of a plurality of sets and determining the difference between the number of intervals in one of said sets and the number of intervals in another of said sets. By comparing the above difference with a constant, information concerning the validity or denomination of the bank note is obtained. Additional circuitry is described for normalizing measured intervals and set bounds to take into effect variations in the speed of transport of banknotes which are to be discriminated.

52 Claims, 7 Drawing Figures

METHOD AND APPARATUS FOR CURRENCY VALIDATION

BACKGROUND OF THE INVENTION

1. Field of the Invention

The present invention relates to a method and apparatus for validating paper currency, particularly United States one, two and five dollar bills, and more particularly to such a method and apparatus in which the authenticity and denomination of paper currency is identified by sensing the characteristics of a piece of currency along a predetermined scan line.

2. Description of the Prior Art

A number of devices have been proposed which identify and distinguish between various denominations of U.S. paper currency or "bills", but none of these devices has been completely satisfactory.

Genuine U.S. paper currency contains a variety of printed indicia which may be used to identify the currency as authentic, and also to distinguish between authentic currency of various denominations.

One indication of authenticity is the fact that certain areas on a U.S. bill are printed with ink with magnetic properties. For example, the portrait which appears in the center of every U.S. bill is, in a genuine bill, printed entirely with magnetic ink. The fanciful engraving which forms the printed border of each U.S. bill is likewise composed entirely of magnetic ink, as are the large capital letters or large numerals which appear to the right of the portrait and which identify the denomination of the bill (i.e., "ONE", "TWO", "FIVE", etc.). In contrast, the green Treasury Department seal which underlies the denomination identifying letters or numerals to the right of the portrait, as well as the black Federal Reserve Bank seal which appears to the left of the portrait, are both printed in non-magnetic ink.

Each denomination U.S. bill is likewise characterized by the distance between the grid lines which comprise the background of the portrait field. In one dollar bills, for example, the space between vertical grid lines is equal to 0.008 inches. For two and five dollar bills, the grid line space is equal to 0.010 inches and 0.011 inches, respectively.

Prior art currency validators have been proposed which identify authentic U.S. bills and distinguish between bills of various denominations by measuring the average spacing between the vertical grid lines in the portrait areas of the bills. One such device is disclosed in U.S. Pat. No. 4,349,111 to Shah et al.

Identification of bills based on average grid line spacing is likely to lead to failures to distinguish between bills having relatively small differences in grid spacing. For example, certain commercial bill validators utilizing the average spacing technique cannot be used with both two dollar and five dollar bills, because the average grid line spacings are too similar.

Another problem with various prior art validators is that they may accept high denomination bills as valid lower denomination bills.

Many prior art currency validators require that the tested bill be inserted into the validator in a specific orientation (e.g., Federal Reserve seal first). Such devices result in authentic bills being rejected merely because of improper orientation. It is therefore desirable to provide a currency validator which is operationally insensitive to bill orientation.

Many of the prior art currency validators require careful regulation of the speed at which the bill is scanned for information. In such validators, even a slight variation in scanning speed, such as that resulting from an instantaneous drop in power line voltage, can cause authentic bills to be rejected and produce inaccuracies in the identification of bill denomination. It is therefore desirable to provide a currency validator which is insensitive to the speed at which a bill is scanned.

In order to avoid some of the problems of speed regulation, some prior art validators, such as disclosed in U.S. Pat. No. 4,464,787 to Fish et al, employ detectors at fixed positions to positively identify the position of the bill and thereby ascertain the bill area being tested. These validators, however, generally require a testing channel at least as long as the bill being tested.

SUMMARY OF THE INVENTION

A currency validator in accordance with the present invention has a plurality of sensors positioned to encounter a bill and generate electrical signals in response to certain features of the bill. The electrical signals are processed by a logic circuit, such as a microprocessor, to determine authenticity and denomination of the bill being tested. In the presently preferred embodiment, a histogram technique is employed to identify and distinguish certain features.

In the presently preferred embodiment for U.S. bills, described in greater detail below, information printed along a relatively narrow, horizontal, lengthwise path along the center of U.S. paper currency is utilized to accurately identify and distinguish between genuine bills of varying denominations.

A transmissive sensor is provided to detect the physical presence or absence of the bill, a reflective sensor is provided to detect optical information on the surface of the bill, and a magnetic sensor is provided to detect magnetic information on the surface of the bill. These three sensors are positioned so that they are encountered in sequence as a bill moves through the validator, with the reflective sensor and magnetic sensor being positioned to encounter the bill along a path which runs lengthwise through the center of the bill along its larger dimension.

The electric signals generated by the three sensors are relayed to a microprocessor having a read-only memory (ROM) and a random access memory (RAM). The signals are analyzed according to a program stored in ROM to determine whether the detected information indicates the presence of an authentic bill of proper denomination.

The signals generated by the reflective sensor and magnetic sensor are analyzed to determine the presence or absence of each magnetic region or non-magnetic space on the bill under test, as well as the width of each detected magnetic region and non-magnetic space and the characteristics detected in them, and to compare these values to known values for a genuine bill.

Information indicative of both authenticity and denomination is provided by the horizontal width of each of the printed areas mentioned above (which will hereafter be referred to as the "portrait field", "border field", "black seal field", and "denomination field"). In addition, the horizontal width of the areas or "spaces" between each of these fields is also useful in determining bill authenticity and denomination.

Within each field, the number of lines, the horizontal space between adjacent lines, and the ratio of the cumulative non-magnetic area to the overall field size may all be used to further identify and distinguish between bills of varying denomination.

The signals generated by the magnetic sensor are utilized to determine the width of the border field of the bill under test, as well as the number of lines appearing therein, and to compare these values to known values for a genuine bill.

The vertical grid characteristics of the portrait field, previously noted, are also employed. In accordance with the preferred embodiment of the present invention, the signals generated by the magnetic sensor are utilized to determine the size of the spaces between magnetic ink lines of the bill under test. As noted above, the portrait area has a plurality of regularly spaced lines. The spacings are detected and these measured spaces are then organized into groups according to size, forming what will be referred to herein as a "histogram." The difference in the number of spaces among groups is then analyzed to help determine bill authenticity and denomination.

The signals generated by the magnetic sensor are utilized to determine the width of the denomination field, as well as the ratio of the larger non-magnetic spaces within the denomination field to the overall field width, and to compare these values to known values for a genuine bill.

The present invention utilizes the signals generated by the various sensors to perform additional tests, described below, which further indicate whether the bill under test is a genuine bill of proper denomination.

After authenticity and denomination of the bill have been determined, the preferred embodiment performs a series of additional tests to insure that the bill is properly accetpted.

BRIEF DESCRIPTION OF THE DRAWINGS

The detailed description of the invention will be made with reference to the accompanying drawings, wherein like numerals designate corresponding parts in the several figures.

DESCRIPTION OF THE PREFERRED EMBODIMENT

The following detailed description is of the best presently contemplated mode of carrying out the invention.

This description is not to be taken in a limiting sense; it is made merely for the purpose of illustrating the general principles of the invention.

Figure 1:
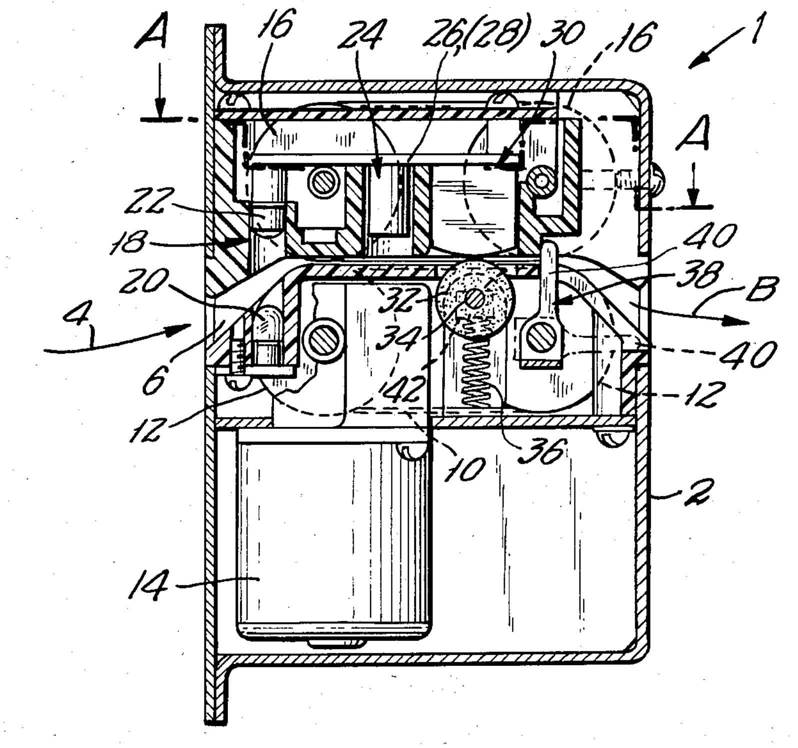
FIG. 1 is a cross-sectional view of the device according to the present invention.
Figure 2:
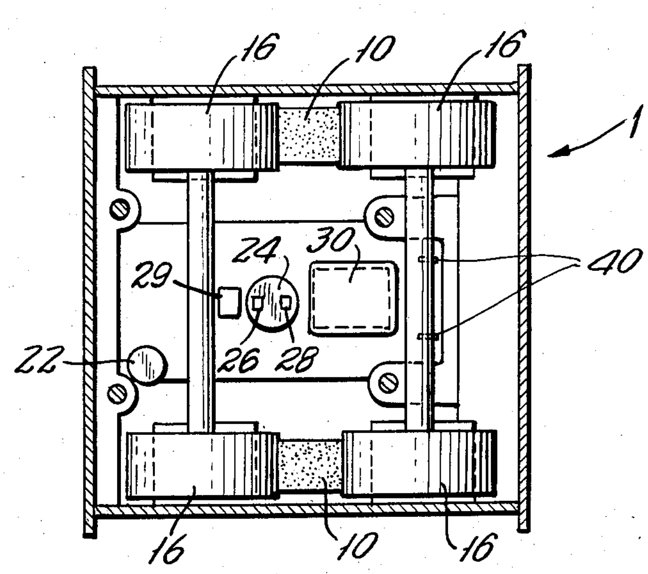
FIG. 2 is a plan view of the device taken along the line A—A of FIG. 1.

FIGS. 1 and 2 show a currency validator 1 having a housing 2 containing a bill passageway 4 having an entry 6 and an exit 8.

Disposed on either side of bill passageway 4 are two continuous tractor belts 10 which are supported by parallel rollers 12. The rollers 12 are operably connected via a series of gears (not shown) to a motor 14. The motor controlled belts 10 act to advance a bill through passageway 4 in a forward direction (from left to right in FIG. 1). The motor 14 is reversible so that it can drive belts 10 in an opposite direction, reversing the direction of travel of the bill.

Positioned directly above each belt 10 is a set of wheels 16 which further assist the inserted bill in advancing through the passageway 4.

Adjacent entry 6 is a transmissive sensor 18 consisting of an optical transmitter 20 and an optical receiver 22 disposed on opposite sides of the bill passageway 4. Interruption of a light beam travelling from transmitter 20 to receiver 22 will cause receiver 22 to generate an electric signal indicating the presence of an object in the entry 6 of passageway 4.

Located directly above the approximate center of passageway 4 is a reflective sensor 24 comprising a second optical transmitter 26 and a second optical receiver 28, both of which are located in relatively close proximity on the same side of passageway 4. Reflective sensor 24 is positioned to detect and respond to the presence or absence of optical information on an object (such as a bill) positioned in passageway 4. If the surface of the object directly beneath the reflective sensor 24 is relatively reflective (as are the unprinted areas of U.S. bills) then the light emitted by transmitter 26 will be reflected by the surface of the object onto the receiver 28. If the surface is relatively unreflective (as are the printed areas of U.S. bills), or there is no object in the passageway 4, then the light emitted by transmitter 26 will not be reflected onto receiver 28.

Adjacent reflective sensor 24 is a magnetic sensor 30, which generates an electric signal in response to the presence of magnetic information on the surface of a bill fed immediately beneath the sensor. Positioned immediately beneath the magnetic sensor 30 is a roller wheel 32 rotatably connected to an axle 34. Axle 34 is in turn supported by spring supports 36, which act to bias the roller wheel 32 toward the magnetic sensor 30. The spring biased roller wheel 32 thereby acts to press the inserted bill firmly against the magnetic sensor 30, thereby ensuring accurate detection of magnetic information on the bill.

A permanent magnet 29 is located above the passageway between the entry 6 and the magnetic sensor 30. It enhances the signal produced by the magnetic sensor 30 by biasing the magnetic ink on the bill being tested.

The reflective sensor 24, the magnetic sensor 30 and the permanent magnet 29 are positioned along passageway 4 so that each of them will scan the middle portion of any bill passing through the passageway 4.

Adjacent the exit 8 and positioned beneath the center of the passageway 4 is a multi-pronged jam sensor 38. Jam sensor 38 is rotatably connected to the axle joining rollers 12. The jam sensor 38 may be rotated about this axle through an angle of at least 90°, from a first vertical position illustrated by the solid lines in FIG. 1 to a second horizontal position illustrated by the broken lines in the same FIGURE. The prongs 40 of the jam sensor 38 are spring biased so that in their normal position the prongs 40 are oriented vertically and protrude upward through the plane of the passageway 4, as indicated by the solid lines in FIG. 1.

The leading edge of an object advancing through the passageway 4 will encounter the prongs 40 and force the prongs 40 into the horizontal position indicated by the broken lines in FIG. 1. The prongs 40 will remain in this horizontal position, clear of the exit 8, until the object is removed from the passageway 4 either through the exit 8 or through the entrance 6. Removal of the object from the passageway 4 in either direction will allow the prongs 40 to return to their initial vertical orientation. The return of the jam sensor 38 to its original position is detected by an optical sensor 44, which generates an electric signal.

If an object is removed from passageway 4 via exit 8, the prongs 40 will prevent that object from being retrieved intact through the passageway 4. Jam sensor 38 is specifically designed to defeat what is referred to as the "bill-on-a-string" cheat mode.

The prototype validator previously mentioned has three principal electronic subassemblies, in the form of printed circuit boards named for their principal functions: the power supply board, the control board and the pre-amplifier board. The circuits on these boards are shown generally in FIGS. 3–5, respectively. The various other functions are divided among the control boards based upon physical location and available space. In the prototype validator, the power supply board is located below the bill passageway 4, the preamplifier board is located above the passageway 4 and the control board is located alongside the other parts of the validator.

Figure 3:
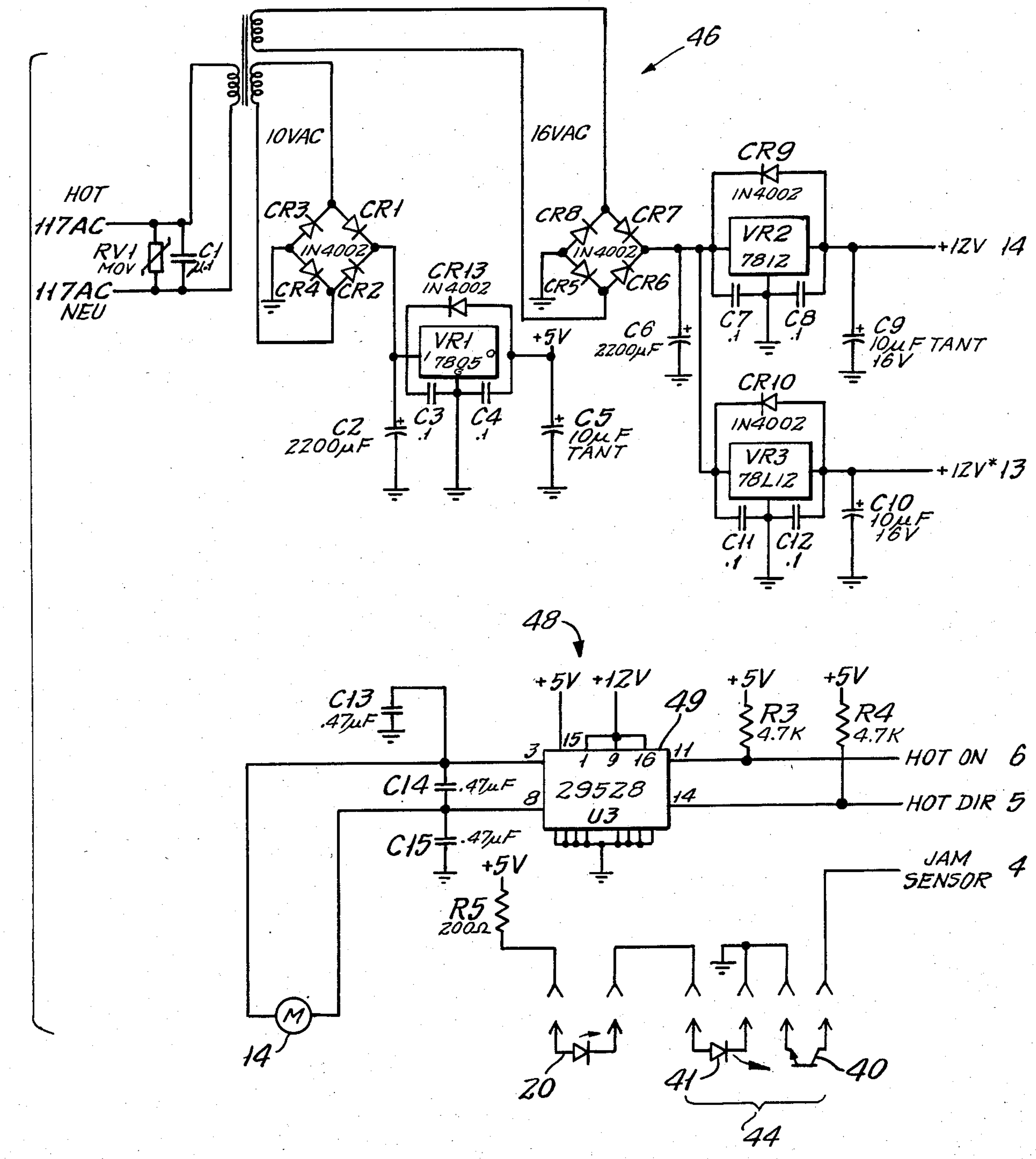
FIG. 3 shows a circuit diagram illustrating the power supply used for one embodiment of the present invention.

FIG. 3 shows the power supply 46, the motor drive circuit 48, including a Sprague-type 2952B, DC motor driver chip 49, the validator drive motor M, the optical transmitter LED 20 of the transmissive sensor 18, and the optical transmitter LED 41 and the optical sensor 40 of the jam sensor 38 which transmits a signal indicative of a jam to the microprocessor 102.

Figure 4:
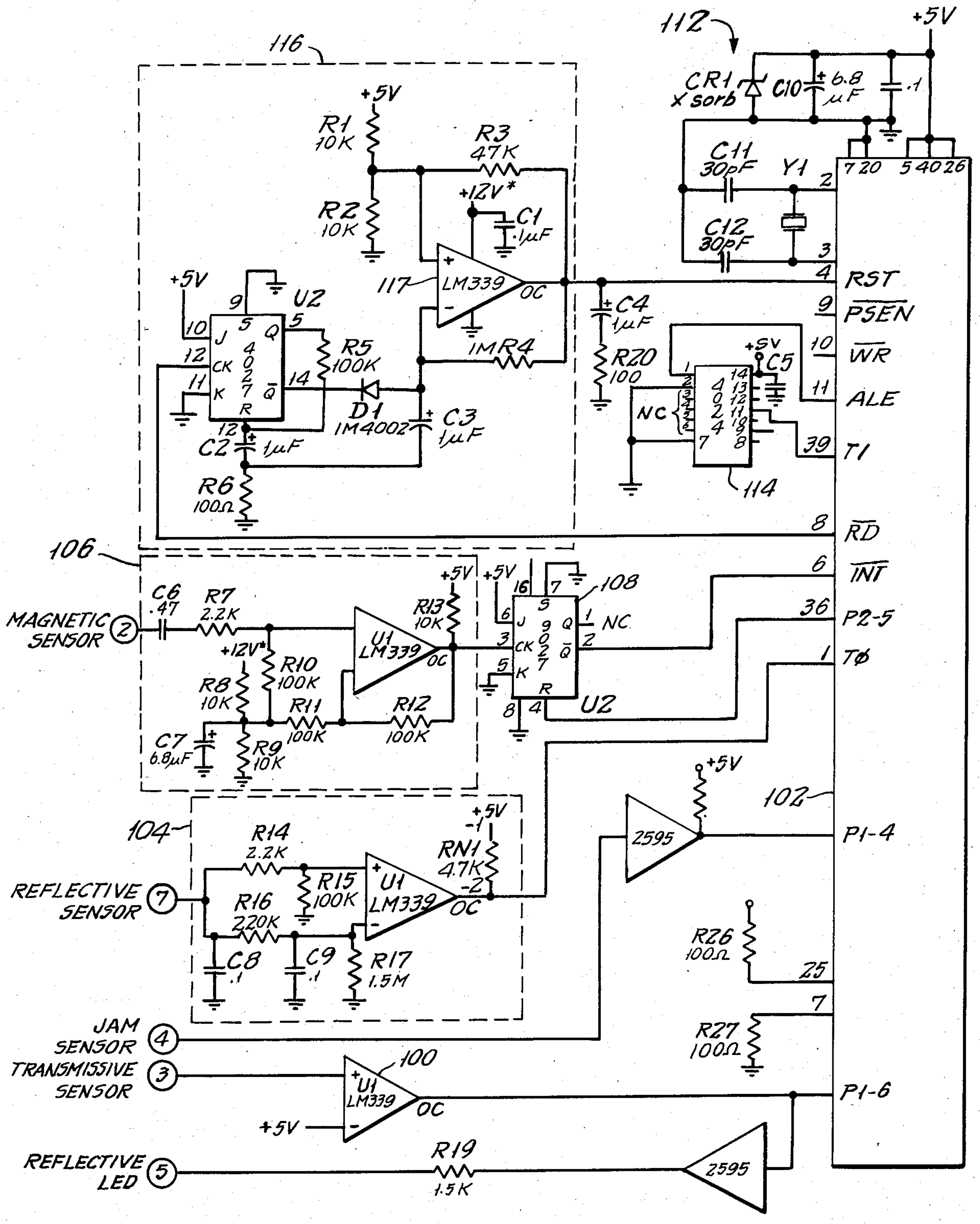
FIG. 4 shows a circuit diagram illustrating the control board used for one embodiment of the present invention.

FIG. 4 shows the control board which includes a microprocessor 102 and most of the directly associated circuits. In the preferred embodiment of the present invention, microprocessor 102 consists of the 8049 microprocessor manufactured by the Intel Corporation of Santa Clara, Calif. The microprocessor 102 contains a read-only memory (ROM) and, in this embodiment, a random access memory (RAM) which may be used to store data during operation, and which is capable of being written into and read from during the validation procedure.

Figure 5:
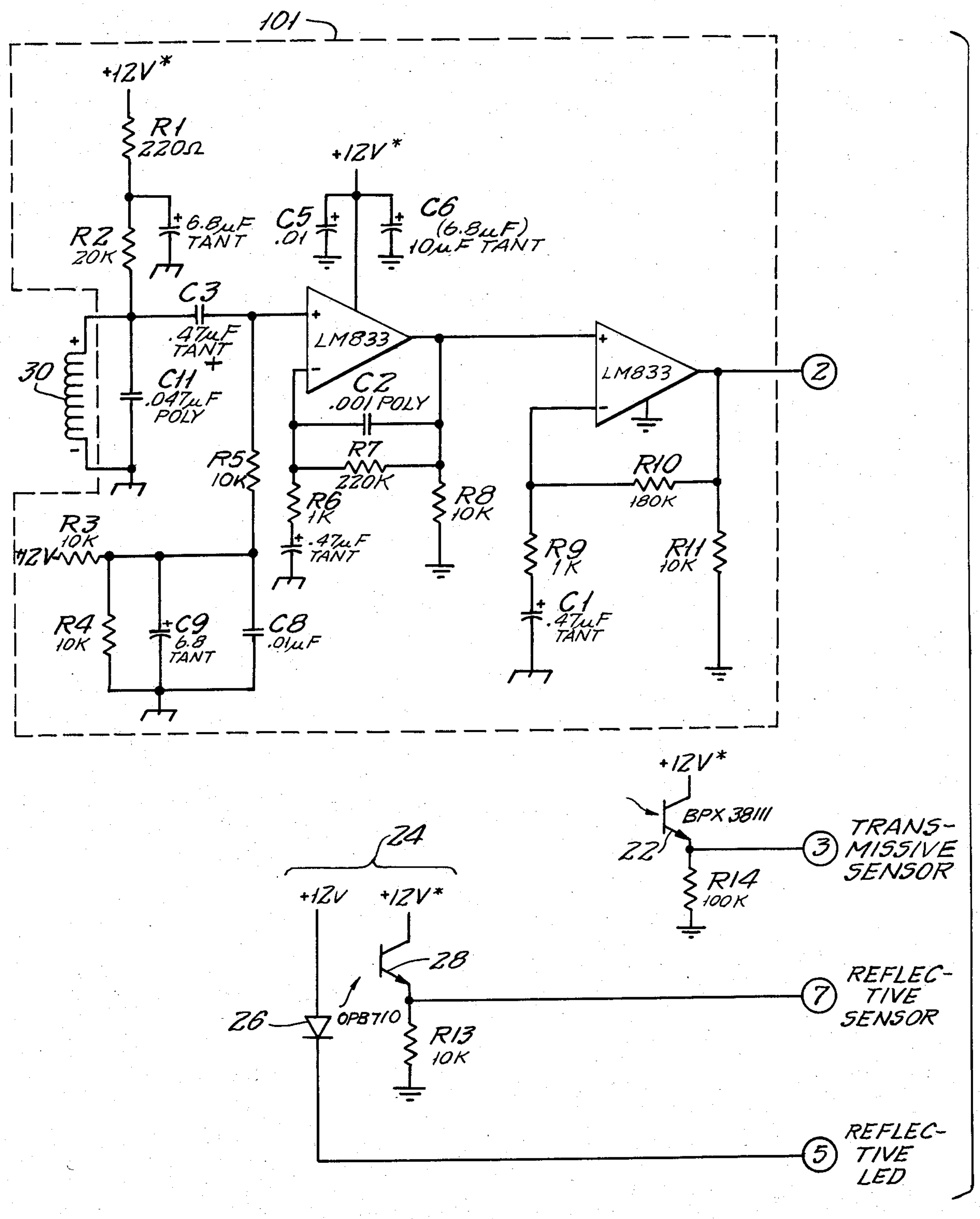
FIG. 5 shows a circuit diagram illustrating the preamplifier board used for one embodiment of the present invention.

The output from the photoresponsive section 22 of the transmissive sensor 18, shown in FIG. 5, is connected to a comparator circuit 100 which has its output connected to pin six of the second I/O port of the microprocessor 102, shown in FIG. 4.

A second comparator circuit 104, shown in FIG. 4, is connected to the output of the reflective sensor 24, shown in FIG. 5. The comparator circuit 104 has its output connected to the input pin T0 of the microprocessor 102. The LED portion 26, associated with the reflective sensor 24 is also shown in FIG. 5. It is controlled by a signal from pin 31 or pin 33 of the first I/O port of the microprocessor 102.

A third amplification circuit 106 is connected to the output of the magnetic sensor 30, both shown in FIG. 5.

A flip flop circuit 108, shown in FIG. 4, is connected to the output of amplification circuit 106. It has one output line connected to the interrupt request input INT of the microprocessor 102, and the other line connected to pin 25 of the second I/O port of microprocessor 102 to receive a reset signal when the microprocessor 102 has acted on the "interrupt" request.

The "deadman timer" and reset circuit 116 monitors an output on the READ line, RD, of the microprocessor 102 for a continuing train of pulses, produced under control of the program, indicating that the microprocessor 102 is operating normally. So long as said pulses are received, capacitor C3 is kept in a discharged mode. If the pulses cease, indicative of a program failure in the microprocessor 102, the capacitor C3 charges causing the comparator 117 to send a reset signal to the reset input RST of the microprocessor 102. In normal power-up of the validator, the charging of the capacitor C4 resets the microprocessor 102.

A clock circuit 112, including a crystal or resonator Y1, fixes the frequency of operations and steps the microprocessor 102 through a series of operations based upon instructions stored within the microprocessor 102 or in an external program memory, such as read-only memory (ROM). The frequency produced by the clock circuit 112 is divided in the microprocessor by a factor of fifteen and the divided frequency signal appears as a periodic logic signal at Pin 11 of the microprocessor 102 which is called ALE. The signal is further divided in frequency by a factor of four by a divider circuit 114 and is fed into an input port T1 of the microprocessor 102. This clock derived signal is used to drive an internal eight-bit counter in the microprocessor 102. By looking at overflows of this internal counter CTR1 (not shown) and by use of two internal random access memory locations (RAM), an accurate time base is created within the microprocessor 102. The microprocessor 102 also includes two RAM extension registers CTR2 and CTR3 (not shown). Together, the counter CTR1 and these two registers CTR2 and CTR3 form a Time Base Counter (TBC).

Every individual signal generated by the transmissive sensor 18, reflective sensor 24, magnetic sensor 30 or optical sensor 44 may thereby be uniquely associated with the time value contained in the TBC at the time these signals are perceived by the microprocessor 102. The intervals between any one signal generated by the above four sensors 18, 24, 30 and 44, and a second signal from one of them may thereby also be determined by the difference in count contained in the TBC associated with the occurrence of the first signal and the count in the TBC associated with the occurrence of the second signal. Only the time value associated with an event is stored, not the event itself. Note also that the time value associated with a particular event is not directly related to a specific physical position on the bill.

To initiate operation of the validator, the leading edge of the bill to be tested is inserted into the entry 6 of the passageway 4. Interruption of the light beam between the optical transmitter 20 and the optical receiver 22 of the transmissive sensor 18 by the inserted bill generates a signal which starts the motor 14 moving in a forward direction. The inserted bill is then gripped between the wheels 16 and moving belt 10 and thereby advanced through passageway 4, travelling from left to right as shown in FIGS. 1 and 2, so that each point on the upward facing surface of the bill encounters first the reflective sensor 24 and then the magnetic sensor 30.

Interruption of the transmissive sensor 18 also establishes the starting point of the value or count stored in the TBC. Within a predetermined time after the interruption of the transmissive sensor, the magnetic sensor 30 must generate signals indicating the detection of two magnetic ink lines within a predetermined span of time. The detection of two lines having magnetic properties, as opposed to one line, is required because a single magnetic signal may be due to the presence of a spurious magnetic line on the bill or other spurious electric signal within the system. In contrast, the detection of two such signals within a short period of time indicates, within a reasonable degree of certainty, that the signals are due to the presence of engraved ink lines on the bill and not some spurious feature.

These magnetic signals are generated by the passage of magnetic material of the bill, first under the permanent magnet 29 to bias the magnetic material, and then under the magnetic head 30 where detection of the magnetic material will produce a small electrical signal. This signal is amplified by a pre-amplifier 101, shown in FIG. 5, to produce an analog signal at its output. This analog signal is converted into logic levels suitable for processing by the comparator circuit 106 which is located on the control board, shown in FIG. 4. These logic levels set a logic element, flip flop 108, whose output state is then sensed by the microprocessor 102.

The first magnetic signal which is followed within a predetermined length of time by a second magnetic signal causes the contents of the Time Base Counter to be stored in RAM. In a genuine bill, this first magnetic signal is an indication of a detection of the edge of the first magnetic field or border field. Each of the magnetic pulses in the border field causes a RAM location to be incremented. This provides a total count of the magnetic pulses in the border field.

The contents of the Time Base Counter associated with every subsequent signal generated by the magnetic sensor is likewise saved, but these subsequently saved values are immediately discarded if they are followed within a predetermined short period of time by a further subsequent value. This process of saving and immediately replacing in memory the most recent magnetic signal Time Base Counter values continues until a magnetic signal is not followed within a predetermined short length of time by a subsequent signal. The process of storing and replacing continues until there is a gap of predetermined size and the total count of magnetic pulses saved in RAM equals or exceeds a predetermined count stored in ROM. In a genuine bill, the last Time Base Counter value saved represents the end of the first magnetic field and the beginning of the first magnetic space or gap.

The fact that a first magnetic field has been detected is stored as a bit in a RAM location to be referred to as the Recognition Status Register.

The second magnetic field to be detected by the magnetic sensor 30 will be either the portrait field or the denomination field, depending upon how the bill was oriented when it was introduced into passageway 4. The present invention utilizes the interval between the final signal of the first magnetic field and the initial signal of the second magnetic field to determine bill orientation as follows.

After detection of the first magnetic field has been completed, the bill continues to be advanced past the magnetic sensor 30 until the initial magnetic line of the second magnetic field is detected by the magnetic sensor 30. The count in the time base counter TBC at the time of this event is stored in RAM. (As with detection of the initial line of the first magnetic region, the initial line of the second magnetic region will be recognized as such and stored only if followed within a predefined short span of time by another magnetic line.)

The interval between the initial line of the second magnetic region and the final line of the first magnetic region is calculated and its value is compared with a predetermined value stored in ROM.

If the calculated interval is greater than the value stored in ROM, then it is determined that the bill is in the "portrait field first" orientation (that is, the bill was inserted into the passageway 4 so that the portrait field is scanned by the magnetic sensor 30 prior to the time that the denomination field is scanned by the magnetic sensor 30). If the calculated interval is less than the value stored in ROM, then it is determined that the bill is in the "denomination field first" orientation (meaning that the denomination field is scanned by the magnetic sensor 30 prior to the portrait field.)

If the calculated interval is greater than a second, larger value stored in ROM, indicating that the interval between the first and second magnetic fields is larger than that found in a genuine U.S. bill, then the motor is reversed and the bill is rejected.

Assuming that the bill has been inserted portrait field first, the next field of interest to be detected by the magnetic sensor 30 will be the portrait field.

The first magnetic line of the portrait field to pass beneath the magnetic sensor 30 will cause the sensor 30 to generate a signal. The initial signal produced by the presence of the portrait field beneath the magnetic sensor 30 will be detected and cause the count or time stored in the Time Base Counter to be stored in RAM in the same manner as described above with respect to the initial signal of the border field. Additionally, a location in RAM will be used to keep total count of magnetic pulses in the portrait field.

Each subsequent magnetic line within the portrait field which passes beneath the magnetic sensor 30 will cause the sensor 30 to generate an additional electric signal. Each of the next sixteen signals which follow the initial signal will cause the count or time stored in the Time Base Counter to be stored in RAM. It will be noted that these sixteen values of time correspond to the detection by the magnetic sensor 30 of the vertical grid lines which (depending on bill orientation) comprise the left or right-hand side of the portrait field.

The next seventeen signals generated during the scanning of the portrait field will similarly cause the count or time stored in the Time Base Counter to be stored in RAM. Any additional signals generated will cause the count or time stored in the Time Base Counter to be stored in RAM and be added to the second set of seventeen values. As each additional value is added, the "oldest" value in the set will be discarded from RAM. In this manner, only the seventeen most recently generated values will be maintained in RAM. These values will correspond to the detection of vertical grid lines appearing on the trailing edge of the portrait field.

The end of the portrait field can occur after the following three conditions are met: (1.) the absence of magnetic signal for a time greater than a predetermined value stored in ROM (26 ms in the present embodiment); (2.) a total count of magnetic pulses in the portrait field greater than a predetermined value stored in ROM (40 in the present embodiment); and, (3.) a portrait field width greater than a predetermined value stored in ROM (160 ms in the present embodiment). The portrait field width is obtained by subtracting from the end count or end time of the portrait field the begin count or start time of the portrait field. This is stored in RAM and will be used to normalize or scale the data after the motor is stopped.

The last magnetic line of the portrait field to pass beneath the magnetic sensor 30 will generate a signal which will cause the count or time stored in the Time Base Counter to be stored in RAM in the same manner as described above with respect to the final signal of the border field.

The intervals between the adjacent values in each of the two sets of the seventeen values stored in memory will also be calculated and stored. It is noted that these calculated intervals will correspond to the spacing of vertical grid lines on both the right and left-hand sides of the portrait field. These calculated intervals will be used to determine bill authenticity and denomination in a manner which will be described below.

Again assuming entry of the bill portrait field first, the next field of interest scanned by the magnetic sensor will be the denomination field.

Passing of the first magnetic line of the denomination field beneath the magnetic sensor 30 will cause the magnetic sensor to generate an electric signal. The initial signal generated by the presence of the denomination field will be determined and the count indicative of time of occurrence will be stored in RAM in the manner described above with respect to the initial signal generated by the presence of the border field.

Each additional magnetic line within the denomination field which passes beneath the magnetic sensor 30 will cause the magnetic sensor 30 to generate an additional electric signal. Each such additional electric signal will also cause the count stored in the time base counter TBC to be stored in RAM.

The interval between successive electric signals within the denomination field is calculated and compared with a predefined constant. If the calculated interval between successive signals is greater than the predefined constant stored in ROM, then the value of the calculated interval is added to an accumulated interval value stored in RAM. The accumulated value thereby stored in RAM represents the accumulated widths of the "gaps" or larger non-magnetic areas within the denomination field.

The end of the denomination field can only occur after the absence of magnetic signals for a time greater than that of a predetermined value in ROM (41 ms in the present embodiment) and a field width exceeding a minimum value predetermined in ROM (100 ms in the present embodiment).

The last magnetic line of the denomination field to pass beneath the magnetic sensor 30 will generate a signal which will be detected and cause the count stored in the time base counter TBC to be stored in RAM in the same manner as described above with respect to the final signal of the border field. The denomination field bit is set in the recognition status register.

The interval between the denomination field and the portrait field is calculated and stored in memory. In the denomination field first orientation, this interval consists of the interval between the final signal of the denomination field and the initial signal of the portrait field. In the portrait field first orientation, this interval consists of the interval between the final signal of the portrait field and initial signal of the denomination field.

In either orientation, the calculated interval between the portrait field and denomination field is compared with a predetermined value stored in memory. If the calculated interval is larger than the predetermined value, indicating that the space between the portrait field and the denomination field is larger than in a genuine U.S. bill, the motor is reversed and the bill is rejected.

In addition to the magnetic sensor 30, the reflective sensor 24 is active while the bill is being transported. Its operation may be described as follows:

Any dark area of the bill that is detected by the reflective sensor 24 will cause the output of comparator circuit 104 to go low. This level will be sensed by the microprocessor 102 on pin one. If the output of comparator 104 stays low in excess of some minimum time (which is stored in ROM), then the optical detect bit is set in the recognition status register in RAM. The particular value N is presently selected so that any dark object which causes a continuous level output from the reflective sensor 24 while the bill is moved approximately 1/16 of an inch beneath the reflective sensor 24 will cause the optical detect bit of the recognition status register to be set. When the optical detect bit is set, an optical timer value is loaded into RAM. In the prototype this value is 48, representative of 0.6 inches at the nominal speed of movement of the bill. As the bill moves along passageway 4, the optical timer value in RAM will be decremented. If any magnetic pulse is detected, then the optical detect bit is cleared and the optical timer value is ignored. If the optical detect bit is not cleared and the value of the optical timer decrements to zero, then the seal detect bit of the recognition status register will be set. Note that the preferred value, which is stored in ROM, is such that the bill will be moved approximately 0.6 inches from the time that the optical detect bit is set until the seal detect bit can be set. This value is dependent upon the spacing between the reflective and magnetic sensors, which is approximately 0.5 inches in the embodiment of the present currency validator. Thus, for the seal detect bit to be set, there must be:

a. a dark line of some minimum width which is detected by the reflective sensor 24.

b. no output of the magnetic sensor 30 for approximately 0.5 inches before and until approximately 0.1 inch after optical activity by the reflective sensor 24 has first been detected.

If the bill has been inserted black seal first, then with a genuine bill the presence of optical signals and absense of magnetic signals in the black seal area after the first border field will cause the seal detect bit to be set in the recognition status register.

If the bill has been inserted in the denomination field first direction, then the reflective sensor 24 will respond to optical information in the denomination field after the first border field. However, the detection of magnetic activity in this region by magnetic sensor 30 will cause the optical detect bit to be cleared and preclude the seal detect bit from being set. Note that detection of magnetic activity, clearing of the optical detect bit and precluding the setting of the seal detect bit will also occur in the portrait area and in the first border field. With a genuine bill, the optical activity and absence of magnetic activity in the black seal region will cause the seal detect bit to be set. Once the seal detect bit of the recognition status register has been set, it remains set for the remainder of the bill processing.

The data collection will continue until the motor 14 is stopped. This occurs either at a fixed time after the transmissive sensor 18 is uncovered, or when a sufficient number of magnetic signals have been detected, indicating a fourth trailing border field.

After the motor is stopped the bill is retained in the passageway 4 while the collected data is analyzed.

The first step in the analysis of the data collected from the surface of the bill is the computation of what is referred to as the "normalization constant". The normalization constant is a value equal to the ratio of the total portrait field width (i.e. the measured interval between the detection of the initial signal and final signal in the portrait field) and the known portrait field width of a genuine U.S. bill. The calculated normalization constant is a value which is used to correct for variations in the detected data due to changes in motor speed or condition of the bill. Use of the normalization constant removes the need for speed control and its associated sensors or electronics.

The microprocessor 102 also calculates a value which will be referred to as the percent denomination space. This value is equal to the ratio of the total accumulated denomination "space" (the larger magnetic gaps within the denomination field) to the denomination field width. The value of the percent denomination space may be indicative of bills of different denomination.

Each time the microprocessor has determined that it has successfully detected the conditions necessary for the beginning and ending of one of the magentic fields, (i.e. first or border field, denomination field, portrait field and trailing or back border field) then the bit associated with that field is set in the Recognition Status Register. The fact that the device scans the black, non-magnetic Federal Reserve Seal, i.e. the fact that the device detects the presence of an optical field and the absence of a magnetic field, is also stored in the Recognition Status Register.

After the bill has been stopped, the microprocessor checks to ensure that the first three field bits of the Recognition Status Register are set as well as the Seal Detection Bit. The trailing border bit is ignored in this test. If the device finds that these four bits are not set, then the bill is rejected.

In another test, the previously calculated portrait field interval (i.e. the interval between the initial signal of the portrait field and the final signal of the portrait field) is compared with both a minimum and a maximum allowable portrait field interval value stored in ROM. If the calculated portrait field interval falls outside the range of these predetermined minimum and maximum values (which vary from the known portrait field width by approximately plus or minus 20%), then the bill is rejected.

In another test, each of the previously calculated intervals between adjacent signals generated by the vertical gridline in the portrait field is compared against a predetermined maximum interval value stored in ROM. If any of the calculated intervals exceeds this predetermined maximum value, then the bill is rejected.

In another test, the previously calculated denomination field width (i.e. the interval between the initial magnetic pulse of the denomination field and the final magnetic pulse of the denomination field) is compared against a predetermined maximum value stored in ROM. If the calculated denomination field interval exceeds this predetermined maximum value, then the bill is rejected.

If all of the above criteria have been satisfied, the detailed analysis of the data developed from the portrait field proceeds.

As previously indicated, the horizontal distance between vertical grid lines in the portrait area of a U.S. bill are indicative of that bill's denomination. One dollar, two dollar and five dollar bills are uniquely identified from one another by grid line spacing values of 0.008 inches, 0.010 inches and 0.011 inches, respectively. Each of these three grid line spacing values, which will be referred to as "seed" values, is stored in ROM. In addition, a fourth grid line spacing seed value (which in the preferred embodiment of the present invention is equal to 0.007 inches) is also stored in ROM. This value, referred to as the "0.007 reject criteria", is used to distinguish between two dollar bills and one hundred dollar bills in the manner described below.

It is recognized that the actual grid line spacing of even genuine one, two and five dollar bills will not always be precisely equal to one of the three seed values identified above. Instead, the actual values will vary over a small range centered about each seed value. Therefore, associated with each seed value is a "window" of maximum and minimum values which are acceptable as being equivalent to the seed value. The maximum and minimum window values associated with each seed value are also stored as constants in ROM.

Figure 6:
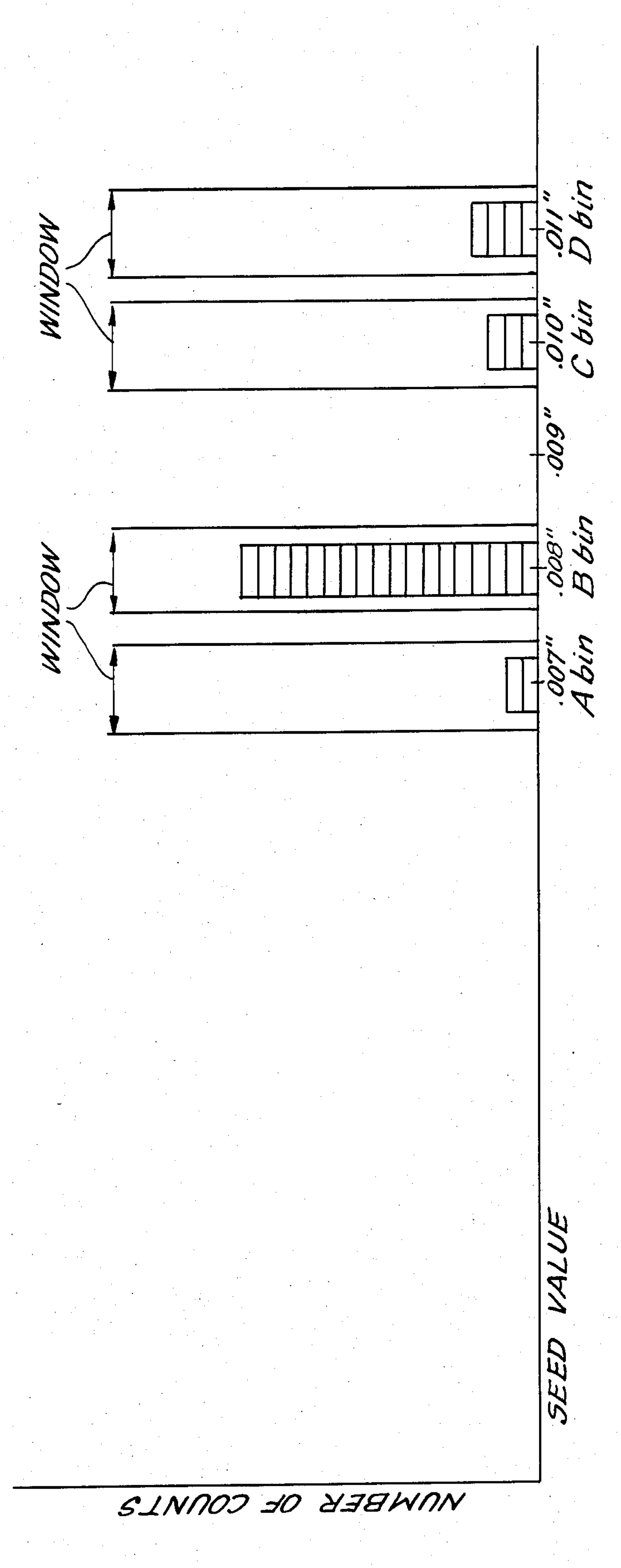
FIG. 6 shows a graph of the histogram illustrating a portion of the analysis of data performed by the present invention.

Each seed value and its associated window may be thought of as a "bin" into which measured grid line spacings may be sorted according to size. Four such bins are illustrated in FIG. 6. The four bins illustrated in FIG. 6 are identified by the letters A, B, C and D, and correspond respectively to seed values of the 0.007 inch reject criteria, one dollar bills, two dollar bills and five dollar bills.

The actual grid line spacings of a bill may be measured and sorted according to size into these four bins, thereby forming a histogram of measured grid line spacings. It is expected that the largest number of grid line spacings will be sorted into the B bin if the measured bill is a genuine one dollar bill, the C bin if the measured bill is a genuine two dollar bill, and the D bin if the measured bill is a genuine five dollar bill. Further, there will be a number of spacings sorted into the A bin if the measured bill is a genuine one hundred dollar bill. A typical distribution of measured grid line spacings for a genuine one dollar bill is illustrated in FIG. 6.

The B, C or D bin containing the largest number of counts is therefore a useful indicator of the denomination of the bill. The absolute number of counts falling within each bin is also useful in identifying authentic bills and distinguishing between bills of various denomination. The difference in the number of counts between the bin containing the largest number of counts and the remaining bins is also a useful indicator of bill authenticity and denomination, as well as an indication of the confidence level of the measurement.

Initially, the previously calculated normalization constant is used to adjust (or "normalize") each of the four seed values stored in ROM to correct for variations detected in scanning the bill. The normalized seed values, together with the windows stored in ROM, are used to form the four bins A, B, C and D, into which each of the calculated 34 portrait field intervals is counted. If one or more of the 34 calculated intervals is of such size that it cannot be sorted into any one of the bins A, B, C and D, then that interval is simply not counted.

Figure 7:
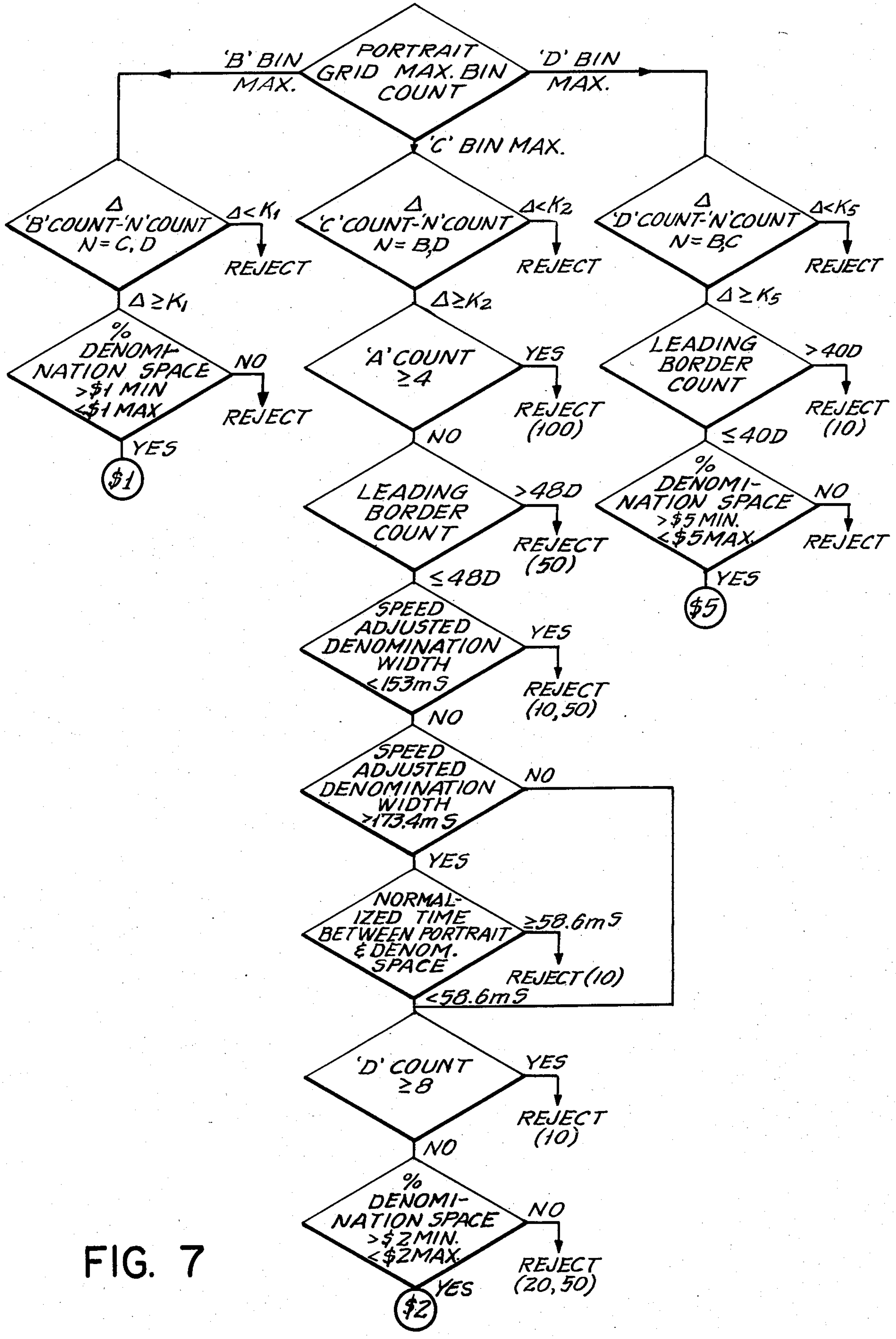
FIG. 7 shows a flow chart representing the steps which are used in analyzing data that is relied upon to determine the authenticity and denomination of U.S. bills.

After the histogram has been formed, and if none of the above tests has indicated the presence of an inauthentic bill, the authenticity and denomination of the bill is determined in accordance with the steps illustrated in the decision tree shown in FIG. 7.

As previously mentioned, the horizontal distance between the vertical grid lines in the portrait area of a U.S. one, two and five dollar bills allow these bills to be uniquely identified one from the other. One, two and five dollar bills are uniquely identified one from the other by grid line spacing of 0.008 inches 0.010 inches and 0.011 inches, respectively. However, the portrait areas of the US $10, $20, $50 and $100 have vertical grid lines with strong grid component spacing of either 0.010 inches and 0.011 inches, or mixtures of these. While identification of $1, $2, and $5 denomination bills may be uniquely determined by dependence upon identification of the grid spacing one from the other, these values are not sufficient to permit identification uniquely from the larger bill set of the seven values $1, $2, $5, $10, $20, $50 and $100. To uniquely identify a $1, $2, or $5 note from the seven bill set, criteria in addition to grid line spacing must be used to exclude the $10, $20, $50 and $100 dollar denominations.

If most counts fall within the B bin, then the difference in the number of counts between the B bin and the C bin, as well as the difference in the number of counts between the B bin and D bin, is calculated. If either calculated difference is less than a predefined constant $K_1$ (which, in the preferred embodiment of the present invention, is equal to 8), then a signal is generated which restarts the motor in reverse and the bill is rejected.

Note that the greater the degree to which the calculated value exceeds $K_1$, the higher the confidence in the measurement. A calculated value considerably greater than $K_1$ indicates a measurement that is more perfect than one which is only slightly larger than $K_1$. Since this calculated value is based upon the difference between components representative of different bill types, a large calculated value indicates a strong presence of the components representative of one bill and a weak presence of the components representative of other bills. Further, a large calculated value means that system noise and other factors which might pollute the measurement do not have a strong presence.

$K_1$ might be externally controlled or set to allow one to adjust the accuracy of denomination determination and bill acceptance/rejection ratios. If one were interested in having very accurate denomination identification, then $K_1$ might be set larger, with the concomitant result of higher good bill rejections. If lower rejection and higher acceptance is important, then $K_1$ might be lowered.

If each calculated difference is greater than or equal to $K_1$, then the previously calculated percent denomination space ratio is compared to a predefined maximum allowable percent denomination space ratio for a one dollar bill, and is also compared to a predefined minimum allowable percent denomination space ratio for a one dollar bill. If this comparison indicates that the calculated percent denomination space ratio either exceeds the maximum allowable percent denomination space ratio, or is less than the minimum allowable percent denomination space ratio, then a signal is generated which reverses the motor and the bill is rejected. This particular percent denomination space ratio test is useful in distinguishing between authentic U.S. one dollar bills and "clones" (which are photocopies of legitimate currency, sometimes used in an effort to cheat currency validators).

If the calculated denomination space ratio falls between the minimum and maximum allowable percent denomination space ratios, then the bill is recognized as a genuine U.S. one dollar bill.

If the greatest number of counts falls within the D bin, then the difference in the number of counts between the D bin and the B bin, as well as the difference in the number of counts between the D bin and the C bin, is calculated. Each of these calculated values is then compared with a predefined constant $K_5$ stored in memory. In the preferred embodiment of the present invention $K_5$ is equal to 12. If either calculated difference is less than $K_5$, the bill will be rejected.

Note that this value $K_5$ might be externally controlled or raised to increase the confidence of the test (resulting in the increase in rejected good bills as a result of requiring a more perfect test) or reduced to decrease the number of rejected good bills (if the number of undesirable bills did not exceed some arbitrary criterion).

If both calculated differences are greater than or equal to $K_5$, then the previously calculated border field count is compared with a predefined border field count (which, in the preferred embodiment of the present invention, is equal to 40). If the calculated border field count is greater than the predefined border field count, the bill will be rejected. This comparison is useful in distinguishing between five dollar bills and ten dollar bills.

If the calculated border field count is less than the predefined border field count, then the previously calculated percent denomination space ratio is compared to a predefined maximum allowable percent denomination space ratio for a five dollar bill as well as a predefined minimum allowable percent denomination space ratio for a five dollar bill. If this comparison indicates that the calculated percent denomination space ratio either exceeds the maximum allowable percent denomination space ratio or is less than the minimum allowable percent denomination space ratio, then the bill is rejected. If the calculated denomination space ratio falls between the minimum and maximum allowable percent denomination space ratios, then the bill is recognized as a genuine U.S. five dollar bill.

If the greatest number of counts falls within the C bin, then the difference in the number of counts between the C bin and the B bin, as well as the difference in the number of counts between the C bin and the D bin, is calculated. Each of these calculated differences is then compared with a predefined constant $K_2$ stored in memory. In the preferred embodiment of the present invention $K_2$ is equal to 10.

(Note that this value $K_2$ might be externally controlled or raised to increase the confidence of the test (resulting in the increase in rejected good bills as a result of requiring a more perfect test) or reduced to decrease the number of rejected good bills (if the number of undesirable bills did not exceed some arbitrary criterion.)

If either one of the calculated bin count differences is less than $K_2$, then the bill will be rejected. If both of the calculated bin count differences are greater than or equal to $K_2$, then the number of counts falling in the A bin is compared with a predefined A count value stored in memory. In the preferred embodiment of the present invention, the predefined A count value is equal to 4. This test is useful in distinguishing between two dollar bills and one hundred dollar bills.

If the number of counts falling within the A bin is greater than or equal to the predefined A count value, then the bill will be rejected. If the number of counts falling within the A bin is less than the predefined A count value, then the previously calculated border field count is compared with a predefined border field count constant stored in ROM. In the preferred embodiment of the present invention, this predefined border field count constant is equal to 48. This comparison is useful in distinguishing between two dollar bills and fifty dollar bills.

If the calculated border field count is greater than the predefined border field count constant, then the bill will be rejected. If the calculated border field count is less than or equal to the predefined border field count constant, then the previously calculated denomination width is normalized using the normalization constant and compared to a first predefined normalized denomination width constant. In the preferred embodiment, this first predefined normalized denomination width constant is equal to 153 mS. This comparison is useful in distinguishing between two dollar bills and ten dollar bills, as well as distinguishing between two dollar bills and fifty dollar bills.

If the calculated normalized denomination width is less than the first predefined normalized denomination width constant, then the bill will be rejected. If the calculated normalized denomination width is greater than or equal to the first predefined normalized denomination width constant, then the calculated normalized denomination width will be compared with a second predefined normalized denomination width constant. In the preferred embodiment of the present invention, this second predefined denomination width constant is equal to 173.4 mS.

If this comparison indicates that the calculated denomination width is less than or equal to the second predefined denomination width constant, then the program will branch to the "D bin count test" described below. If this comparison indicates that the calculated denomination width is greater than the predefined second denomination width constant, then the previously calculated normalized interval between the portrait field and the denomination field will be compared to a predefined interval between the portrait field and the denomination field. In the preferred embodiment, this predefined interval is equal to 58.6 mS. This comparison between the calculated interval and the predefined interval constant is useful in distinguishing two dollar bills from ten dollar bills.

If the calculated interval between fields is greater than or equal to the predefined field interval constant, then the bill will be rejected. If the calculated interval between fields is less than the predefined field interval constant, then the number of counts in the D bin will be compared with a predefined D bin count stored in memory. In the preferred embodiment, this predefined D bin count is equal to 8. This test is useful in distinguishing between two dollar bills and ten dollar bills.

If the comparison between the calculated D bin count and the predefined D bin count constant indicates that the calculated D bin count is greater than or equal to the D bin constant, then the bill will be rejected. If the comparison indicates that the calculated D bin count is less than the predefined D bin count constant, then the previously calculated percent denomination space ratio will be compared to a predefined maximum allowable percent denomination space ratio for a two dollar bill as well as a predefined minimum allowable denomination space ratio for a two dollar bill.

If this comparison indicates that the calculated denomination space ratio either exceeds the maximum allowable denomination space ratio or is less than the minimum allowable denomination space ratio, then the bill will be rejected. If the calculated denomination space ratio falls between the minimum and maximum allowable denomination space ratio, then the bill will be recognized as a genuine U.S. two dollar bill.

At this point, if the bill has been identified by the foregoing tests as genuine and of correct denomination, a signal is generated which restarts the motor 14 in the forward direction. Subsequent to the restart of the motor 14, a number of additional tests are performed to insure that a validated bill is properly advanced through passageway 4 and exit 8.

Within a predetermined time after the restart of motor 14, the optical jam sensor 44 must detect the release of the jam sensor 38 from its horizontal position and a return of the jam sensor 38 to its vertical position (as shown by the unbroken lines in FIG. 1). The non-release of the jam sensor 38 within a certain time after the motor restart is an indication that the bill is either being held in passageway 4 or being removed through entrance 6. If the sensor 44 does not detect the release of the jam sensor 38 within the required time, then the motor 14 will be reversed and the bill will be rejected. This test is useful in defeating what is referred to as the "bill-on-a-string" cheat mode.

In addition, both while the motor 14 is off and after restart of motor 14, the number of signals generated by the reflective sensor 24 must remain below a certain predefined constant number. If the number of signals generated by the reflective sensor 24 exceeds this predefined constant number, the motor will be reversed and the bill will be rejected. An excessive number of signals generated by the reflective sensor 24 both while the motor 14 is off and after motor restart is an indication that the bill is being withdrawn from the passageway 4 through the entrance 6. This test is useful in defeating what is referred to as the "bill-on-paper" cheat mode.

From the above it will be seen that the present invention utilizes the spacing between the vertical grid lines in the portrait area of U.S. bills to determine the authenticity and denomination of such bills without calculating the average spacing between such grid lines. Instead, the present invention utilizes a histogram of grid spacing data to identify bill authenticity and denomination. Tests have shown that this histogram technique provides a valuable advance over the prior art.

For example, tests have shown a substantially higher acceptance rate for authentic one dollar, two dollar and five dollar bills using the present invention. Moreover, the present invention is capable of distinguishing between these bills of various denomination with a higher degree of accuracy than prior art validators.

The validator 1 can be programmed to operate in both "teach" and "learn" modes. The teach mode is employed in a validator which does not have all of the operational constants stored in ROM. The validator is taught by telling it that a known bill type will be inserted. The microprocessor then infers and stores in some kind of changeable memory the constants appropriate to this type bill. The learn mode is employed in a validator which stores one or more operational constants in changeable memory. In the learn mode, the microprocessor modifies these stored constants over a period of time, under program control, based upon experience with acceptable bills. Suitable changeable memory which might be used includes EEPROM, battery protected RAM, shadow RAM or other memory which can be changed by the microprocessor, but whose constants will not be affected by loss of power to the validator.

The present invention may be embodied in other specific forms without departing from the spirit or essential characteristics thereof. For example, while the preferred embodiment disclosed herein is designed for identifying and distinguishing among genuine U.S. one, two and five dollar bills, the principles of the present invention may also be utilized in identifying and distinguishing among higher denomination bills, as well as paper currency of countries other than the United States. While the preferred embodiment of the present invention disclosed herein utilizes a "histogram" technique for analyzing magnetic data collected from the portrait field of a U.S. bill, the same histogram technique may also be utilized to analyze data from other portions of the bill and to analyze optical information retrieved from the surface of the bill.

Further details of the operation of the preferred embodiment of the present invention are disclosed in the computer program listing which follows.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

```
LOC  OBJ      LINE      SOURCE STATEMENT

               ;
               ; Mars Money Systems Firmware Control Comments
               ;
               ; Part Number                              00-21-ZXX
               ;
               ; Revision Level                                   0
               ;
               ; Release Date                              00/00/00
               ;
               ; Part Label                               00-21-ZXX0
               ;
               ; Programmer                          Thomas E. Shuren
               ;
               ; Product Application,   This program controls the
               ;                      1,2 & 5 dollar bill acceptor.
               ;
               ;.
               ; Part History,   Originated begining  05/22/84
               ;
               ;
               $Eject
               ;  HARDWARE RESOURCE DEFINITIONS.
               ;
               ; INT    The hardware interupt pin is both the magnetic
               ;      sensor input and the power down warning input.
               ;
               ; T1     The T1 input is driven by ALE divided by four.
               ;
               ; T0     The T0 input is the reflective sensor input.
               ;
               ; WR     The WR output is not used.
               ;
               ; RD     The RD output is used to reset the hardware
               ;      deadman timer.
               ;
               ; TIMER/COUNTER,  During bill recognition the internal
               ;                timer/counter is used to time the bills
               ;                progress. The clock rate is determined
               ;                by the T1 input at ALE/4 (10us @ 6Mhz).
               ;                 Once recognition is complete the timer
               ;                /counter is available.
               ;
               ; BUS    All 8 data bus pins are connected to an eight
               ;      position 'DIP' switch used for option selection.
               ;
               ; Ports 1 and 2 are assigned as follows,
               ; Multiple names are assingned to the same port
               ; pin when double or triple duty is performed.

0001           I1DATA   EQU     01H     ;P1-0 Smart Interface Data
0001           I2ENA1   EQU     01H     ;P1-0 Isolated Interface Enable 1
0001           I3INH    EQU     01H     ;P1-0 A.C. Interface Inhibit

0002           I1INTR   EQU     02H     ;P1-1 Smart Interface Interupt
0002           I2ENA2   EQU     02H     ;P1-1 Isolated Interface Enable 2
0002           I3ENA    EQU     02H     ;P1-1 A.C. Interface Enablet

0004           I1SEND   EQU     04H     ;P1-2 Smart Interface Send
0004           I2ENA5   EQU     04H     ;P1-2 Isolated Interface Enable 5

0008           I1ENA    EQU     08H     ;P1-3 Smart Interface Enable
0008           I2ESCR   EQU     08H     ;P1-3 Isolated Interface Escro
```

```
0010     JAMSEN   EQU     10H        ;P1-4 Output path jam sensor
                                     ;     Low = bill present

0020     STKFUL   EQU     20H        ;P1-5 Stacker full limit switch
                                     ;     Low = full
0020     OUTSRV   EQU     20H        ;P1-5 Out of service output

0040     TRASEN   EQU     40H        ;P1-6 Transmissive sensor input
                                     ;     Low = bill present
0040     DEBUG    EQU     40H        ;P1-6 Debug Data output port

0080     PSHMTR   EQU     80H        ;P1-7 Stacker Push motor output


0001     I2CRD1   EQU     01H        ;P2-0 Isolated Interface credit 1
0001     I2RELY   EQU     01H        ;P2-0 Isolated Interface Relay

0002     I2CRD2   EQU     02H        ;P2-1 Isolated Interface credit 2

0004     I2CRD5   EQU     04H        ;P2-2 Isolated Interface credit 5

0008     MTRON    EQU     08H        ;P2-3 Motor on (low)/off (high).
0010     MTRDIR   EQU     10H        ;P2-4 Motor reverse (low)/
                                     ;forward (high).

0020     INTRST   EQU     20H        ;P2-5 Interupt Flip Flop Reset
                                     ;     High = reset

0040     STKLIM   EQU     40H        ;P2-6 Stacker upper limit sw
                                     ;     Low = bill present

0080     STKCAM   EQU     80H        ;P2-7 Stacker push motor cam sw
                                     ;     Low = motor off home

         $Eject
         ;  INTERNAL RAM ALLOWCATIONS.

         ; Register bank 0 is used for all main programs.
         ; Register bank 1 is used for all interupt routines.
         ;
         ; R4' is the temp. timer snapshot reg.
         ; R5' is the timer overflow counter during recognition.
         ; R6' is the R5' overflow counter.
         ; R7' is the temporary accumulator reg.


0012              ORG     12H        ; STACK AREA USED

0012     DPSPCE:  DS      1          ;Denom to portrait space ( in
                                     ; mag spaces).
0013     SPEED:   DS      2          ;Speed factor storage reg.

0015     OPDBNC:  DS      1          ;Reflective optics debounce cntr
0016     OPTMR:   DS      1          ;In BEXEC, Optics test delay tmr
                                     ;In INTRFC, Reflective pulse cntr
0017     DATMES:  DS      1          ;Smart interface data message

0020              ORG     20H

0020     SCRTCH:  DS      13         ;13 bytes scratch pad. see below

002D     BCNT1:   DS      1          ;Leading border mag. pulse count

002E     DNMWTH:  DS      2          ;Denomination mag. width
0030     SPCWTH:  DS      2          ;Total of denomination spaces >
                                     ;"n" ms.
0032     DPRCNT:  DS      1          ;DNMWTH/SPCWTH = 0 to .996

0033     PRTWTH:  DS      2          ;Portrait mag. width
0035     PRTCNT:  DS      1          ;Portrait mag. pulse count
0036     PRTRT:   DS      68         ;Portrait mag. pulse spacing
                                     ;34 16 bit values.

007A     BCNT2:   DS      1          ;Trailing border mag. pulse count

007B     RECSTA:  DS      1          ;Recognition status register

007C     TRATMR:  DS      1          ;Transmissive sensor off to end
                                     ;of bill timer.
007D     ACCDNM:  DS      1          ;Accepted bill denomination code
                                     ;00 = rejected bill
                                     ;01=$1, 02=$2, 04=$5
007E     OPTNSW:  DS      1          ;Option switch reg. read by Int-
                                     ;erface test INTTST.
007F     INTSTA:  DS      1          ;Interface status register, Set
                                     ;up by INTTST.

         ; Srcatch pad utilization.
         ; During data collection.

0020     MSPCES   EQU     SCRTCH+0 ;Number of mag. spaces between
                                   ;MSTOP and present timer value.
0021     MSTART   EQU     SCRTCH+1 ;Mag. field start time
0024     MSTOP    EQU     SCRTCH+4 ;Mag. field stop time
```

```
      ; During bill recognition.

0020  ADJGS    EQU     SCRTCH    ;Adjusted grid for .007 inches
0022  HITS     EQU     SCRTCH+2 ;# of .007" hits
0023  ADJG1    EQU     SCRTCH+3;Adjusted grid norm for $1
0025  HIT1     EQU     SCRTCH+5 ;# of $1 grid values.
0026  ADJG2    EQU     SCRTCH+6 ;Adjusted grid norm for $2
0028  HIT2     EQU     SCRTCH+8 ;# of $2 grid values.
0029  ADJG5    EQU     SCRTCH+9 ;Adjusted grid norm for $5
002B  HIT5     EQU     SCRTCH+11;# of $5 grid values.

      $Eject

      ; The recognition status register bits are as follows,
      ; RECSTA bit 0 = MBRDR1 - Set for leading border detected
      ; RECSTA bit 1 = MDENOM - Set for denomination detected
      ; RECSTA bit 2 = MPRTRT - Set for Portrait area detected
      ; RECSTA bit 3 = MBRDR2 - Set for trailing border detected
      ; RECSTA bit 4 = FORWRD - Set if denomination is detected
      ;                befor portrait.
      ; RECSTA bit 5 = ERROR - Set on any Magnetic sequence or
      ;                timing error.
      ; RECSTA bit 6 = OPDET - Set when any "dark" time
      ;                > SDEBNC is detected within 100 MAGSPC's
      ;                of the end of a mag. field.
      ;                Reset on any mag. pulse detected.
      ; RECSTA bit 7 = SDETCT - Set if  OPDET is set at the
      ;                end of 100 MAGSPC's of no mag. pulses.


      ; OPTNSW, Optoin Switch register bit definitions.
      ;        Sw off = Bit off = 0  Sw on = Bit on = 1
      ; Bit 0 = Single 400ms pulse    Relay pulse patern
      ; Bit 1 = Long pulse patern     Short pulse patern
      ; Bit 2 = LSB of # of pulses per dollar
      ; Bit 3 = 2SB of # of pulses per dollar
      ; Bit 4 = MSB of # of pulses per dollar
      ; Bit 5 = Credit line outputs   Relay Output
      ; Bit 6 = High level or Serial  Low level isolated
      ; Bit 7 = Stacker not present   Stacker Present


      ; INTSTA, Interface Status Register bit definitions
      ; Bit 0 = $1 bill accept enabled
      ; Bit 1 = $2 bill accept enabled
      ; Bit 2 = $5 bill accept enabled
      ; Bit 3 = Escro bill enabled
      ; Bit 4 =
      ; Bit 5 = Low Level Isolated Interface Active
      ; Bit 6 = High Level Isolated Interface Active
      ; Bit 7 = Serial Interface Active


      ; ACCDNM, Accept denomination byte will also indicate
      ;         certain reject criteria.
      ; 00H  indicates Interupt error conditions or field
      ;                bits or no seal. See RECSTA for details.
      ; 01H  indicates $1 bill accept
      ; 02H  indicates $2 bill accept
      ; 04H  indicates $5 bill accept
      ; 10H  indicates BEXEC early reject
      ; 20H  indicates Portrait width out by 20%
      ; 30H  indicates bad portrait edge value
      ; 40H  indicates Gross denomination width error
      ; 50H  indicates indavidual bill criteria

      $Eject

      ;     CONSTANTS

      ; Major feature nominal widths and limits.

6590  PRTNOM   EQU     26000D          ;26000 = 1.3" @ 5"/sec
5460  PRTHI    EQU     21600D          ;20% fast
7EF4  PRTLOW   EQU     32500D          ;20% Slow

43F8  DNMNOM   EQU     17400D          ;17400 = .87" @ 5"/sec
30D4  DNMHI    EQU     12500           ;Fast
5528  DNMLOW   EQU     21800           ;Slow

      ; Portrait Grid histagram bin seperation minimums.

0008  SEPONE   EQU     08D       ;Minimum one dollar bill
                                 ;seperation.
000A  SEPTWO   EQU     10D       ;Minimum two dollar bill
                                 ;seperation.
000C  SEPFIV   EQU     12D       ;Minimum five dollar bill
                                 ;seperation.

      ; Portrait Grid histagram windows.

0010  LWDWS    EQU     16D       ;.007 inch low window
0008  HWDWS    EQU     08D       ;.007 inch high window
0008  LWDW1    EQU     08D       ;One dollar low window
0010  HWDW1    EQU     16D       ;One dollar high window
0010  LWDW2    EQU     16D       ;Two dollar low window
```

```
0006            HWDW2    EQU      06D        ;Two dollar high window
0006            LWDW5    EQU      06D        ;Five dollar low window
0010            HWDW5    EQU      16D        ;Five dollar high window

                ; Portrait Grid histagram center seeds.

008C            SEEDS    EQU      140D       ;Special .007" grid center
00A0            SEED1    EQU      160D       ;One dollar grid center seed
00C8            SEED2    EQU      200D       ;Two dollar grid center seed
00DC            SEED5    EQU      220D       ;Five dollar grid center seed

                ; Denomination gross space percentage limits.

0060            LPCNT1   EQU      060H       ;$1 denomination %  low limit
00FE            HPCNT1   EQU      0FEH       ;$1 denomination %  high limit
003A            LPCNT2   EQU      03AH       ;$2 denomination %  low limit
00A1            HPCNT2   EQU      0A1H       ;$2 denomination %  high limit
0059            LPCNT5   EQU      059H       ;$5 denomination %  low limit
00B0            HPCNT5   EQU      0B0H       ;$5 denomination %  high limit

                ; Smart interface message definitions

0081            ONEDLR   EQU      81H        ;$1 bill message
0082            TWODLR   EQU      82H        ;$2 bill message
0083            FIVDLR   EQU      83H        ;$5 bill message

0089            VEND     EQU      89H        ;"Vend", Bill accepted
008A            RETRN    EQU      8AH        ;Bill returned "escrowed"
008B            SLUG     EQU      8BH        ;Bad bill returned
008C            FAILUR   EQU      8CH        ;Failure detected ??


                $Eject
0000                     ORG      00H

0000 248A       RESET:   JMP      INIT       ;Go initialize IO and Ram


0003                     ORG      03H

                ;;;;;;;;;;;;;;;;;;;;;;;;;;;;;;;;;;;;;;;;;;;;;;;;;;;;;;;;;;
                ;                                                        ;
                ; EINTR ,  External Interupt routine. Here for a         ;
                ;             magnetic pulse detected.                   ;
                ;                                                        ;
                ; INPUT:      None                                       ;
                ; OUTPUT:     3 byte timer value in MSTART or MSTOP      ;
                ;             as appropriate.                            ;
                ; MODIFIED:   Acc., R0', R1', R2', R3', R4',             ;
                ;             MSTART, MSTOP                              ;
                ;;;;;;;;;;;;;;;;;;;;;;;;;;;;;;;;;;;;;;;;;;;;;;;;;;;;;;;;;;


0003 D5         EINTR:   SEL      RB1
0004 AF                  MOV      R7,A                  ;Save the Accumulator
0005 42                  MOV      A,T                   ;Get the timer value
0006 AC                  MOV      R4,A                  ;and save it in R4'

0007 160B                JTF      BMPTMR                ;Go inc overflow counters
0009 0414                JMP      MAGP

000B 42         BMPTMR:  MOV      A,T                   ;Get the timer and inc the
000C AC                  MOV      R4,A                  ;overflow registers.
000D A5                  CLR      F1
000E B5                  CPL      F1
000F 1D                  INC      R5
0010 FD                  MOV      A,R5
0011 9614                JNZ      MAGP
0013 1E                  INC      R6

0014 B491       MAGP:    CALL     SUBSTP                ;Calc INTR TIME - MSTOP
0016 C61A                JZ       MAGP1                 ;and save in MSPCES.
0018 BBFF                MOV      R3,#0FFH              ;Use FF if > 255
001A B920       MAGP1:   MOV      R1,#MSPCES
001C FB                  MOV      A,R3
001D A1                  MOV      @R1,A

001E B821       MAGP2:   MOV      R0,#MSTART            ;If INTR TIME - MSTART is
0020 B493                CALL     SUBTIM                ;=> 2048 go test for end
0022 9629                JNZ      ENDTST                ;of field.
0024 FB                  MOV      A,R3                  ;If its < 2048 go test for
0025 03F8                ADD      A,#07D NOT            ;begining of field.
0027 E689                JNC      BGNTST

                $Eject
                ; End of magnetic field determination.
                ; Define the end of the magnetic field as follows,
                ; 1. The end of the leading border is at 12 MAGSPCes
                ;    after a minimum pulse count of "n".
                ; 2. The end of the denomination field is at 16 MAGSPCes
                ;    after a minimum width of 100ms (40 * 2.55ms).
                ; 3. The end of the portrait field is at 10 MAGSPC after
                ;    a minimum MSTART to MSTOP time of 160ms and a min
                ;    pulse count of "n".
                ;
                ; Note. One MAGSPC (magnetic space) is 2.55ms.
```

```
0029 B87B        ENDTST: MOV     R0,#RECSTA
002B F0                  MOV     A,@R0            ;Get RECSTA
002C 9234                JB4     FWDBIL           ;Jump if forward bill

002E 324A        RVSBIL: JB1     DNMTST           ;Go to denom test.
0030 525D                JB2     PRTTST           ;Go to portrait test.
0032 0438                JMP     BRDTST           ;Go to leading border test

0034 525D        FWDBIL: JB2     PRTTST
0036 324A                JB1     DNMTST

0038 123C        BRDTST: JB0     BRDT1            ;Cont if field bit set
003A 047D                JMP     LDSTRT
003C F1          BRDT1:  MOV     A,@R1            ;Get MSPCES
003D 03F4                ADD     A,#11D NOT       ;Sub 12 cnts
003F E669                JNC     JMAGPB           ;Exit if < 12

0041 B82D                MOV     R0,#BCNT1        ;Don't end field if count
0043 F0                  MOV     A,@R0            ;is less than 10.
0044 03F6                ADD     A,#09D NOT
0046 E669                JNC     JMAGPB           ;Exit if < 10

0048 047D                JMP     LDSTRT           ;Go load MSTART

004A F1          DNMTST: MOV     A,@R1            ;Get MSPCES
004B 03F0                ADD     A,#15D NOT       ;Sub 16 cnts
004D E669                JNC     JMAGPB           ;Exit if < 16

004F B82F                MOV     R0,#DNMWTH +1    ;Don't end field if width
0051 F0                  MOV     A,@R0            ;is less than 100ms
0052 03D8                ADD     A,#39D NOT
0054 E669                JNC     JMAGPB           ;Exit if < 40D.

0056 B87B                MOV     R0,#RECSTA       ;If forward bill save
0058 F0                  MOV     A,@R0            ;MSPCES in DPSPCE (denom
0059 9277                JB4     SAVDPS           ;ination to portrait space)
005B 047D                JMP     LDSTRT           ;Go load MSTART

005D F1          PRTTST: MOV     A,@R1            ;Get MSPCES
005E 03F6                ADD     A,#09D NOT       ;Sub 10 cnts
0060 E669                JNC     JMAGPB           ;Exit if < 10

0062 B834        PRTT1:  MOV     R0,#PRTWTH +1    ;Don't end field if width
0064 F0                  MOV     A,@R0            ;is less tham 160ms.
0065 03C0                ADD     A,#63D NOT
0067 F66B                JC      PRTT3            ;Continue if =>64D
0069 2400        JMAGPB: JMP     MAGPB            ;Else exit.

006B B935        PRTT3:  MOV     R1,#PRTCNT       ;Test for PRTCNT < 40
006D F1                  MOV     A,@R1
006E 03D8                ADD     A,#39D NOT
0070 E669                JNC     JMAGPB           ;Don't load MSTART if
                                                  ;PRTCNT < 40



0072 B87B                MOV     R0,#RECSTA       ;If reverse bill save
0074 F0                  MOV     A,@R0            ;MSPCES in DPSPCE (denom
0075 927D                JB4     LDSTRT           ;ination to portrait space)
0077 B812        SAVDPS: MOV     R0,#DPSPCE
0079 B920                MOV     R1,#MSPCES
007B F1                  MOV     A,@R1            ;Get MSPCES
007C A0                  MOV     @R0,A            ;Save DPSPCE


007D B821        LDSTRT: MOV     R0,#MSTART       ;Load MSTART with the
007F B4AA                CALL    LDTIME           ;present timer value.

0081 FF          EXEINT: MOV     A,R7             ;Restore Acc.
0082 BB01                MOV     R3,#01H          ;01 indicates hardware
                                                  ;interupt to BEXEC.
0084 8A20                ORL     P2,#INTRST       ;Reset the Int flip flop
0086 9ADF                ANL     P2,#INTRST NOT

0088 93                  RETR




                 BGNTST:
0089 B824        MAGPA:  MOV     R0,#MSTOP        ;If MSTOP-MSTART is neg.
008B B921                MOV     R1,#MSTART       ;load MSTOP with MSTART
008D BA03                MOV     R2,#03           ;and determine new mag.
008F 97                  CLR     C
0090 F0          MAGPA1: MOV     A,@R0
0091 37                  CPL     A
0092 71                  ADDC    A,@R1
0093 18                  INC     R0
0094 19                  INC     R1
0095 EA90                DJNZ    R2,MAGPA1
0097 E669                JNC     JMAGPB           ;If not, Process the data

0099 BA03        MAGPA3: MOV     R2,#03           ;Load MSTOP with MSTART
009B C8          MPA3A:  DEC     R0
009C C9                  DEC     R1
009D F1                  MOV     A,@R1
```

```
009E A0                    MOV     @R0,A
009F EA9B                  DJNZ    R2,MPA3A
                   $Eject

                   ; New magnetic field determination. Use MSPCES and
                   ;previously set bits in RECSTA to determine the new
                   ;magnetic field starting here.
                   ; If MSPCES < 80        and MDENOM is not set, set MDENOM.
                   ;                       and MDENOM is set and MPRTRT is
                   ;                       not set, set MPRTRT.
                   ;                       and MDENOM and MPRTRT are both
                   ;                       set, set the ERROR bit.
                   ; If 80 <=MSPCES < 200  and MDENOM is set and MPRTRT is
                   ;                       set, set MBRDR2 bit.
                   ;                       and MDENOM is not set and MPRTRT
                   ;                       is not set, set MPRTRT bit.
                   ; If MSPCES=> 200       Set the ERRORT bit.

                   ; If MBRDR1 is not set then this is the first border.

00A1 B97B          MAGPA4: MOV     R1,#RECSTA
00A3 F1                    MOV     A,@R1
00A4 12AB                  JB0     MPA4A           ;Jump if border set
00A6 4301                  ORL     A,#01H
00A8 A1                    MOV     @R1,A           ;Set border bit
00A9 2400                  JMP     MAGPB

                   ; Branch for MSPCES < 80, between 80 and 200, and > 200.

00AB B820          MPA4A:  MOV     R0,#MSPCES      ;Address # of Mag. spaces
00AD F0                    MOV     A,@R0
00AE 03B0                  ADD     A,#79D NOT      ;Sub 80 from MSPCES
00B0 E6BC                  JNC     MPA4B           ;If<80 go test RECSTA bits
00B2 0388                  ADD     A,#119D NOT     ;Sub another 120
00B4 E6CF                  JNC     MPA4C           ;If<200 test RECSTA bits.

00B6 F1            SETERR: MOV     A,@R1           ;Get RECSTA
00B7 4320                  ORL     A,#20H          ;Set ERROR bit.
00B9 A1                    MOV     @R1,A           ;Save
00BA 242D                  JMP     LDSTOP          ;Go load new STOP time


                   ; Here if MSPCES is < 80.

00BC F1            MPA4B:  MOV     A,@R1           ;Get RECSTA
00BD 32C8                  JB1     MPA4B1          ;If MDENOM, test MPRTRT

00BF 52C3                  JB2     SETDNM          ;If MPRTRT, Don't set
00C1 4310          SETFWD: ORL     A,#10H          ;FORWRD
00C3 4302          SETDNM: ORL     A,#02H          ;Else set MDENOM
00C5 A1                    MOV     @R1,A           ;Save
00C6 2400                  JMP     MAGPB           ;Go process the data

00C8 52DA          MPA4B1: JB2     SETBRD2         ;If MPRTRT, set MBRDR2
00CA 4304          SETPRT: ORL     A,#04H          ;Else set MPRTRT
00CC A1                    MOV     @R1,A           ;Save
00CD 2400                  JMP     MAGPB           ;Go process the data


                   MPA4C:  ;Here if MSPCES => 80 and < 175.
                           ;If MDENOM and MPRTRT are not equal, set ERROR.
                           ;If equal and set set MBRDR2 else set MPRTRT.

00CF F1                    MOV     A,@R1           ;Get RECSTA
00D0 32D6                  JB1     MPA4C1          ;If MDENOM, test MPRTRT
00D2 52B6                  JB2     SETERR          ;If not MDENOM and MPRTRT
00D4 04CA                  JMP     SETPRT          ;If not MDENOM and not
                                                   ;MPRTRT, set MPRTRT

00D6 52DA          MPA4C1: JB2     SETBRD2         ;If MDENOM and MPRTRT
                                                   ;set MBRDR2.
00D8 04B6                  JMP     SETERR          ;Else set ERROR

00DA 4308          SETBRD2:ORL     A,#08H          ;Set MBRDR2
00DC A1                    MOV     @R1,A
00DD 2400                  JMP     MAGPB
                   $Eject


                   ;;;;;;;;;;;;;;;;;;;;;;;;;;;;;;;;;;;;;;;;;;;;;;;;;;;;;;;;;
                   ;                                                       ;
                   ; RDREF ,     Read the reflective sensor. If on 5       ;
                   ;            times in a row ret Acc=0 else Acc=1.       ;
                   ;                                                       ;
                   ; INPUT:      None                                      ;
                   ; OUTPUT:     Acc=0 sensor low, Acc=1 sensor high.      ;
                   ; MODIFIED:   Acc., R2                                  ;
                   ;                                                       ;
                   ;;;;;;;;;;;;;;;;;;;;;;;;;;;;;;;;;;;;;;;;;;;;;;;;;;;;;;;;;


00DF 27            RDREF:  CLR     A
00E0 BA05                  MOV     R2,#05D         ;Sensor 'on' count
00E2 36E7          RDREF1: JT0     EXRDRF          ;If 'off' exit with Acc=1
00E4 EAE2                  DJNZ    R2,RDREF1
00E6 83                    RET                     ;Return Acc=0 if 'on'
```

```
0OE7 17          EXRDRF: INC     A
0OE8 83                  RET                          ;Return non 0 indicates
                                                      ;the sensor is not
                                                      ;'just on'.



                 ;;;;;;;;;;;;;;;;;;;;;;;;;;;;;;;;;;;;;;;;;;;;;;;;;;;;;;;;;;;;;;
                 ;                                                           ;
                 ; TSTENA,  Compare the enable status (1,2 or 5)             ;
                 ;          to the denomination of bill received             ;
                 ;          Return Acc.=0 for not enabled.                   ;
                 ; INPUT:     None                                           ;
                 ; OUTPUT:    Acc=0 for no enable, <>0 if enabled            ;
                 ; MODIFIED:  Acc., R0, R1                                   ;
                 ;                                                           ;
                 ;;;;;;;;;;;;;;;;;;;;;;;;;;;;;;;;;;;;;;;;;;;;;;;;;;;;;;;;;;;;;;


0OE9 B87F        TSTENA: MOV     R0,#INTSTA           ;Test for accepted bill
0OEB B97D                MOV     R1,#ACCDNM           ;enabled.
0OED F0                  MOV     A,@R0                ;Get INTSTA
0OEE 5307                ANL     A,#07H               ;Keep only enable bits
0OF0 51                  ANL     A,@R1                ;Compare with denomin-
0OF1 83                  RET                          ;ation code.


                 ;;;;;;;;;;;;;;;;;;;;;;;;;;;;;;;;;;;;;;;;;;;;;;;;;;;;;;;;;;;;;;
                 ;                                                           ;
                 ; BRAKE ,    Stop the motors forward motion by              ;
                 ;          reversing it for 200ms.                          ;
                 ;                                                           ;
                 ; INPUT:     None                                           ;
                 ; OUTPUT:    None                                           ;
                 ; MODIFIED:  Acc., R2                                       ;
                 ;                                                           ;
                 ;;;;;;;;;;;;;;;;;;;;;;;;;;;;;;;;;;;;;;;;;;;;;;;;;;;;;;;;;;;;;;


0OF2 9AEF        BRAKE:  ANL     P2,#MTRDIR NOT       ;Reverse motor for 100ms
0OF4 BA0A                MOV     R2,#10D              ;'electronic brake'
0OF6 F460                CALL    WAIT                 ;10 * 2.5ms = 025ms
0OF8 8A18                ORL     P2,#(MTRON OR MTRDIR)
0OFA 83                  RET


                 $Eject

0100                     ORG     100H

                 ; Save magnetic pulse data in accordance with the field
                 ;bits in RECSTA.
                 ;
                 ; If MBRDR2 bit is set - Exit via LDSTOP.
                 ; If FORWRD bit is set - and MPRTRT bit is set, save INTR
                 ;                        TIME - MSTART IN PRTWTH and INTR
                 ;                        TIME - MSTOP in PRTRT ram based
                 ;                        on portrait ram pointer PPNTR.
                 ;                      - and MPRTRT is not set and MDENOM
                 ;                        is set, save INTR TIME - MSTART
                 ;                        in DNMWTH.
                 ; If FORWRD bit not set- and MDENOM is set, save INTR
                 ;                        TIME - MSTART in DNMWTH.
                 ;                      - and MDENOM is not set and MPRTRT
                 ;                        is set, save INTR TIME - MSTART
                 ;                        in PRTWTH and INTR TIME - MSTOP
                 ;                        in PRTRT ram based on the
                 ;                        portrait ram pointer PPNTR.
                 ;                      - and neither MDENOM nor MPRTRT
                 ;                        bits are set, inc. BCNT1.
                 ;

0100 B97B        MAGPB:  MOV     R1,#RECSTA           ;Set up RECSTA address
0102 F1                  MOV     A,@R1                ;RESET the optics detect
0103 53BF                ANL     A,#40H NOT           ;bit for any mag. pulse
0105 A1                  MOV     @R1,A
0106 B815                MOV     R0,#OPDBNC           ;And set the debounce
0108 B006                MOV     @R0,#06              ;counter

010A B491                CALL    SUBSTP               ;INTR TIME - MSTOP
010C 965A                JNZ     JSTERR               ;Error exit if > 65535

010E FB                  MOV     A,R3                 ;If < .0015' ie. 25 cnts
                                                      ;Exit via LDSTOP
010F 9616                JNZ     MAGPB1               ;Test ans. highbyte
0111 FA                  MOV     A,R2
0112 03E7                ADD     A,#24D NOT
0114 E62D                JNC     LDSTOP               ;Test lowbyte < 25

0116 B821        MAGPB1: MOV     R0,#MSTART           ;Address last Mag. time
0118 B493                CALL    SUBTIM               ;R2, R3=INTR TIME-MSTART
011A 965A                JNZ     JSTERR               ;Error exit if > 65535
```

```
011C FB            MOV    A,R3             ;Set ERROR bit for any
011D 0377          ADD    A,#88H NOT       ;field > 1.75". This helps
011F F65A          JC     JSTERR           ;find framing errors.

0121 F1            MOV    A,@R1            ;Get RECSTA
0122 7255          JB3    MAGPB4           ;Count 2nd border pulses
0124 9233          JB4    MAGPB3           ;Jump if forward bill

0126 3235  MAGPB2: JB1    LDDNM            ;Go load denomination data
0128 525C          JB2    LDPRT            ;Go load portrait data
012A B82D  LDBRD:  MOV    R0,#BCNT1        ;Inc. First border count
012C 10            INC    @R0

012D B824  LDSTOP: MOV    R0,#MSTOP        ;Load MSTOP with the
012F B4AA          CALL   LDTIME           ;present timer value.
0131 0481          JMP    EXEINT


0133 525C  MAGPB3: JB2    LDPRT            ;Go load portrait data
0135 B82E  LDDNM:  MOV    R0,#DNMWTH       ;Load denomination width
0137 FA            MOV    A,R2
0138 A0            MOV    @R0,A
0139 18            INC    R0
013A FB            MOV    A,R3
013B A0            MOV    @R0,A

013C B491  LDDNM1: CALL   SUBSTP           ;If the space between
013E 964A          JNZ    LDDNM2           ;pulses is > 10.0ms
0140 FA            MOV    A,R2             ;add one to the
0141 37            CPL    A                ;'SPACE' counter
0142 03E8          ADD    A,#1000D LOW
0144 FB            MOV    A,R3
0145 37            CPL    A
0146 1303          ADDC   A,#1000D HIGH
0148 F653          JC     EXLDD

014A B830  LDDNM2: MOV    R0,#SPCWTH       ;Add space width to total
014C F0            MOV    A,@R0            ;space width
014D 6A            ADD    A,R2
014E A0            MOV    @R0,A
014F 18            INC    R0
0150 F0            MOV    A,@R0
0151 7B            ADDC   A,R3
0152 A0            MOV    @R0,A
0153 242D  EXLDD:  JMP    LDSTOP


0155 B87A  MAGPB4: MOV    R0,#BCNT2        ;Count trailing border
0157 10            INC    @R0              ;pulse
0158 242D          JMP    LDSTOP

015A 04B6  JSTERR: JMP    SETERR

           $Eject


015C B833  LDPRT:  MOV    R0,#PRTWTH       ;Load portrait data
015E FA            MOV    A,R2
015F A0            MOV    @R0,A
0160 18            INC    R0
0161 FB            MOV    A,R3
0162 A0            MOV    @R0,A

0163 18            INC    R0
0164 10            INC    @R0              ;Increment PRTCNT

           ; Save INTR TIME - MSTOP in protrait ram. The first
           ;17 samples are saved in sequence. The second 17 samples
           ;are saved and pushed along to generate a ram image of
           ;the first and last 17 samples of the portrait.

0165 B835  LDPRT2: MOV    R0,#PRTCNT       ;Subtract 18 from the
0167 F0            MOV    A,@R0            ;portrait pulse counter
0168 03EE          ADD    A,#17D NOT       ;to determine storage
016A E67A          JNC    LDPRT4           ;technique.


           ; The second 17 samples.

016C BA20  LDPRT3: MOV    R2,#32D          ;# of bytes to push
016E B85A          MOV    R0,#PRTRT + 36D  ;Address setup
0170 B958          MOV    R1,#PRTRT + 34D
0172 F0    PSHLOP: MOV    A,@R0
0173 A1            MOV    @R1,A
0174 18            INC    R0
0175 19            INC    R1
0176 EA72          DJNZ   R2,PSHLOP
0178 2481          JMP    LDPRT5



           ; The first 17 samples.

017A B935  LDPRT4: MOV    R1,#PRTCNT       ;Adrs portrait pulse cntr
017C F1            MOV    A,@R1            ;Get portrait pulse count
017D E7            RL     A                ;Times 2
```

```
017E 0334               ADD     A,#PRTRT -2         ;Add in base address
0180 A9                 MOV     R1,A                ;Save in RO

                ; Compute and store @R1 INTR TIME - MSTOP.
0181 B491       LDPRT5: CALL    SUBSTP              ;Sub MSTOP from INTR TIME
0183 FA                 MOV     A,R2                ;Load INTR TIME - MSTOP
0184 A1                 MOV     @R1,A               ;into the last location
0185 19                 INC     R1
0186 FB                 MOV     A,R3
0187 A1                 MOV     @R1,A
0188 242D               JMP     LDSTOP

                $Eject


                ;;;;;;;;;;;;;;;;;;;;;;;;;;;;;;;;;;;;;;;;;;;;;;;;;;;;;;;;
                ;                                                      ;
                ; INIT  ,  Initialize after hardware reset.            ;
                ;                                                      ;
                ;;;;;;;;;;;;;;;;;;;;;;;;;;;;;;;;;;;;;;;;;;;;;;;;;;;;;;;;

                ;       1. Set up I/O ports.
                ;       2. Clear internal ram
                ;       3. Recall from NOVRAM.


018A C5         INIT:   SEL     RB0
018B 89FF               ORL     P1,#0FFH
018D 8AFF               ORL     P2,#0FFH

018F B800               MOV     R0,#00H             ;Read bus to tristate it
0191 80                 MOVX    A,@R0

0192 B87F       INIT1:  MOV     R0,#7FH             ;Clear internal ram
0194 B000       CLRLOP: MOV     @R0,#00H
0196 E894               DJNZ    R0,CLRLOP

0198 BB08       INIT2:  MOV     R3,#08D
019A BA64       INIT3:  MOV     R2,#100D            ;Power up time delay
019C F460               CALL    WAIT                ;2.5ms times R2
019E EB9A               DJNZ    R3,INIT3

                ; Test for a bill present in the unit and attempt to
                ;move it.

01A0 F496       INIT4:  CALL    GETP2               ;Read P2
01A2 F6A0               JC      INIT4               ;Loop til good read

01A4 F2A8       INIT4A: JB7     INIT5               ;Jump if PUSH CAM 'off'
01A6 24AA               JMP     PUSHIT

01A8 D2B0       INIT5:  JB6     INIT6               ;Jump if limit sw 'off'
01AA D4AC       PUSHIT: CALL    PUSH                ;Else run the push motor
01AC C6BB               JZ      IDLE                ;Idle if successful
01AE D4DD               CALL    SNDFLR              ;Send failure message
                                                    ;if smart interface


01B0 F481       INIT6:  CALL    GETP1               ;Read P1
01B2 F6B0               JC      INIT6               ;Loop on bad read
01B4 37                 CPL     A
01B5 5350               ANL     A,#JAMSEN OR TRASEN
01B7 C6BB               JZ      IDLE                ;Contin. if niether is on
01B9 8450               JMP     BILREJ              ;Else try to reject it


                $Eject

                ;;;;;;;;;;;;;;;;;;;;;;;;;;;;;;;;;;;;;;;;;;;;;;;;;;;;;;;;
                ;                                                      ;
                ; IDLE  ,   Wait here for a bill.                      ;
                ;                                                      ;
                ;;;;;;;;;;;;;;;;;;;;;;;;;;;;;;;;;;;;;;;;;;;;;;;;;;;;;;;;

                ; 1. If the transmissive sensor or the jam sensor is 'on'
                ;    on entry, try to reject it then proceed with the
                ;    out of service tests.
                ; 2. Out Of Service Tests. If any of the following inputs
                ;    are 'on' light the out of service lamp till cleared,
                ;    Transmissive Sensor, Jam 'knife' sensor, Stacker
                ;    limit, Stacker full and Stacker push motor.
                ; 3. If 'In' service test for enabled. If not loop.
                ; 4. If Enabled test for 'Start' sensor  'on' for
                ;    a minimum time (05ms) and go to bill executive
                ;    (BEXEC) when true.

01BB 15         IDLE:   DIS     I                   ;Disable  interupt

01BC 8A20               ORL     P2,#INTRST          ;Reset the Int flip flop
01BE 9ADF               ANL     P2,#INTRST NOT

01C0 8A18               ORL     P2,#(MTRON OR MTRDIR)   ;Motor Off

01C2 F481       IDLE1:  CALL    GETP1               ;Reject if trans. or jam
01C4 F6C2               JC      IDLE1               ;Loop on bad read
01C6 37                 CPL     A
```

```
01C7 5350              ANL     A,#TRASEN OR JAMSEN
01C9 C6CD              JZ      OOS              ;Continue if both "off"
01CB D4D3              CALL    REJBIL           ;Go reject the bill

01CD F496      OOS:    CALL    GETP2            ;Lock up here if the
01CF F6CD              JC      OOS              ;Loop on bad read
01D1 37                CPL     A
01D2 53C0              ANL     A,#STKLIM OR STKCAM
01D4 96F2              JNZ     LOOS             ;Stacker limit sw or the
                                                ;Push Motor Cam sw or the
01D6 F481              CALL    GETP1
01D8 F6CD              JC      OOS              ;Loop on bad read
01DA 37                CPL     A
01DB 5370              ANL     A,#JAMSEN OR TRASEN OR STKFUL
01DD 96F2              JNZ     LOOS             ;Jam sensor or the
                                                ;Stacker full sw is "on"
                                                ;Transmissive sensor "on"

01DF B400      IDLE2:  CALL    INTTST           ;Go Read the option sw
                                                ;and test interface lines
01E1 F0                MOV     A,@R0            ;Get Interface status
01E2 5307              ANL     A,#07H
01E4 C6DF              JZ      IDLE2            ;Loop if not enabled.

01E6 BC0C              MOV     R4,#12D          ;Trans. sensor debounce
01E8 F481      IDLE3:  CALL    GETP1            ;400us
01EA F6DF              JC      IDLE2            ;Loop for bad read
01EC D2DF              JB6     IDLE2            ;Loop while "off"
01EE ECE8              DJNZ    R4,IDLE3         ;Dec. count while "on"

01F0 4400              JMP     BINIT

01F2 99DF      LOOS:   ANL     P1,#OUTSRV NOT   ;Light the Out Of Service
01F4 24CD              JMP     OOS

               $Eject
0200                   ORG     200H

               ;;;;;;;;;;;;;;;;;;;;;;;;;;;;;;;;;;;;;;;;;;;;;;;;;;;;;;;;;
               ;                                                       ;
               ; BINIT ,  Bill recognition Initialization.             ;
               ;                                                       ;
               ;;;;;;;;;;;;;;;;;;;;;;;;;;;;;;;;;;;;;;;;;;;;;;;;;;;;;;;;;

0200 BA6B      BINIT:  MOV     R2,#(ACCDNM-SPEED)+1
0202 B813              MOV     R0,#SPEED
0204 B000      BICLR:  MOV     @R0,#00H         ;Clear all recognition
0206 18                INC     R0               ;Ram and RB1
0207 EA04              DJNZ    R2,BICLR

0209 D5                SEL     RB1              ;Initialize the TIMER
020A 27                CLR     A

020B B87D      BINIT1: MOV     R0,#ACCDNM       ;Clear accept denomination
020D B000              MOV     @R0,#00H

020F AD                MOV     R5,A             ;Load the timer overflow
0210 AE                MOV     R6,A             ;counters
0211 C5                SEL     RB0
0212 62                MOV     T,A              ;Zero the timer
0213 1615              JTF     $+2              ;Clear the timer flag
0215 45                STRT    CNT              ;Start the timer running

0216 9AF7      BINIT2: ANL     P2,#MTRON NOT    ;Start the motor forward

0218 BA64              MOV     R2,#100D         ;250ms delay while the
021A F460              CALL    WAIT             ;magnetics quiet down

021C 8A20      BINIT3: ORL     P2,#INTRST       ;Clear the Intr. F/F
021E 9ADF              ANL     P2,#INTRST NOT
0220 05                EN      I                ;Enable the Ext. Intr.


               $Eject

               ;;;;;;;;;;;;;;;;;;;;;;;;;;;;;;;;;;;;;;;;;;;;;;;;;;;;;;;;;
               ;                                                       ;
               ; BEXEC ,  Bill recognition executive.                  ;
               ;                                                       ;
               ;;;;;;;;;;;;;;;;;;;;;;;;;;;;;;;;;;;;;;;;;;;;;;;;;;;;;;;;;

               ; The timer overflows once every 2.55ms. The bill moves
               ;,nominally, at 5 inches per second. therefor each timer
               ;overflow period is approximately .01275 inches of bill
               ;movement.

0221 15        BEXEC:  DIS     I
0222 1629              JTF     BEXECA           ;Wait for timer overflow
0224 05                EN      I
0225 7631              JF1     BEXECC           ;or F1 set indicating
0227 4421              JMP     BEXEC            ;timer overflow in INTR.

0229 D5        BEXECA: SEL     RB1
022A 1D                INC     R5
022B FD                MOV     A,R5
022C 962F              JNZ     BEXECB
```

```
022E 1E               INC     R6
022F C5       BEXECB: SEL     RB0
0230 05               EN      I
0231 A5       BEXECC: CLR     F1
0232 08               INS     A,BUS              ;Create deadman pulse


              ; Subtract the last mag. pulse interupt time (MSTOP)
              ;from the present timer value read into R4,R5 & R6.
              ;The middle byte is MSPCES.
              ;Since an interupt during this calculation will alter
              ;MSTOP, bit 0 in R3' must be monitored to determine
              ;whether or not this occured. If it does occur MSPCES
              ;will be set to 0.

0233 B91B     BEXEC1: MOV     R1,#1BH            ;R3' address
0235 F1               MOV     A,@R1              ;Get it and reset
0236 53FE             ANL     A,#01H NOT         ;the Int occured bit
0238 A1               MOV     @R1,A

0239 B81C     GETTIM: MOV     R0,#1CH            ;R4' address
023B F0               MOV     A,@R0
023C AC               MOV     R4,A
023D 18               INC     R0
023E F0               MOV     A,@R0
023F AD               MOV     R5,A               ;Save mid byte
0240 18               INC     R0
0241 F0               MOV     A,@R0
0242 AE               MOV     R6,A               ;Save highbyte

0243 B491             CALL    SUBSTP             ;Calculate the interval
                                                 ;between now and last
                                                 ;known mag. pulse.

0245 C649             JZ      BEX1A              ;Continue if highbyte = 0
0247 BBFF             MOV     R3,#0FFH           ;Else force MSPCES=FF.

0249 F1       BEX1A:  MOV     A,@R1              ;Test R3' for Int occured
024A 37               CPL     A
024B 124F             JB0     BEX1C
024D BB00     BEX1B:  MOV     R3,#00D            ;Make 0 MSPCES if true

024F FB       BEX1C:  MOV     A,R3               ;Quotient lowbyte
0250 B820             MOV     R0,#MSPCES
0252 A0               MOV     @R0,A              ;MSPCES stored

              $Eject
              ; Read in the reflective sensor. If its dark for 50us
              ;decrement the optics debounce counter (OPDBNC). If its
              ;white (ever) reload the optics debounce counter to 05
              ;(05 counts = 12.75ms or approx. 1/16" at 5"/sec.).
              ;When the debounce counter is decremented to 0 set the
              ;OPDET bit in RECSTA.

0253 B815     BEXEC2: MOV     R0,#OPDBNC         ;Address optics debounce
0255 14DF             CALL    RDREF              ;Read the reflective
0257 C65B             JZ      BEX2A              ;Dec. debounce if "on"
0259 B006     RLOPD:  MOV     @R0,#06D           ;Optics debounce loaded

025B F0       BEX2A:  MOV     A,@R0              ;Dec the debounce counter
025C C668             JZ      EXBEX2             ;unless its already 0
025E 07               DEC     A
025F A0               MOV     @R0,A
0260 9668             JNZ     EXBEX2

0262 B87B     BEX2B:  MOV     R0,#RECSTA         ;Set the OPDET bit in
0264 F0               MOV     A,@R0              ;RECSTA when OPDBNC is
0265 4340             ORL     A,#40H             ;dec'ed to 00.
0267 A0               MOV     @R0,A
              EXBEX2:


              ; Load the optics timer with 48 (.6" at 5"/sec) while
              ;the optics detect bit is reset.
              ; While the optics detect bit is set, decrement the
              ;optics timer. When it reaches zero, set the Seal detect-
              ;ed bit.

0268 B87B     BEXEC3: MOV     R0,#RECSTA         ;Adrs recognition status
026A B916             MOV     R1,#OPTMR          ;Adrs the optics timer

026C F0               MOV     A,@R0              ;Get RECSTA
026D D273             JB6     BEX3A              ;Go dec OPTMR if OPDET set
026F B130             MOV     @R1,#48D           ;Reload OPTMR
0271 447E             JMP     BEXEC4

0273 F1       BEX3A:  MOV     A,@R1              ;Get OPTMR
0274 C67E             JZ      BEXEC4             ;Exit if already zero
0276 07               DEC     A
0277 A1               MOV     @R1,A
0278 967E             JNZ     BEXEC4             ;Exit if not yet zero

027A F0       BEX3B:  MOV     A,@R0              ;Get RECSTA
027B 4380             ORL     A,#80H             ;Set SDETCT bit
027D A0               MOV     @R0,A

              $Eject
```

```
                  ; Early bill rejection tests. Reject the bill if,
                  ; 1. If the output (jam) sensor is detected (low) befor
                  ;    the first magnetic pulse is seen.
                  ; 2. If the value of MSPCES is  => 250.
                  ; 3. If the ERROR bit in RECSTA is set by EINTR.

027E F481         BEXEC4: CALL    GETP1           ;Read P1
0280 B87B                 MOV     R0,#RECSTA      ;Address Recognition stat
0282 F68A         BEX4A:  JC      BEX4B           ;Skip jam test if bad read
0284 928A                 JB4     BEX4B           ;Jam sensor off, exit

0286 F0                   MOV     A,@R0           ;Get RECSTA
0287 37                   CPL     A
0288 1295                 JB0     JMPREJ          ;Reject if MBRDR1 not set

028A B920         BEX4B:  MOV     R1,#MSPCES
028C F1                   MOV     A,@R1           ;Test for MSPCES=> 250
028D 0306                 ADD     A,#249D NOT
028F F695                 JC      JMPREJ          ;Reject if => 250

0291 F0           BEX4C:  MOV     A,@R0           ;Test Error Bit set
0292 37                   CPL     A
0293 B29B                 JB5     BEXEC5          ;Cont. if no error bit
0295 B87D         JMPREJ: MOV     R0,#ACCDNM
0297 B010                 MOV     @R0,#10H        ;Set reject value
0299 8450                 JMP     BILREJ          ;Go reverse motor.


                  ; If the transmissive sensor goes 'off' for a minimum
                  ;time (typ. 100ms, .5' at 5'/sec) or the trailing
                  ;border bit (MBRDR2) in RECSTA is set go to bill
                  ;recognition (BILREC), else loop.

029B F481         BEXEC5: CALL    GETP1
029D F6AE                 JC      BEX5C           ;Skp sen tst if bad read
029F B87C         BEX5A:  MOV     R0,#TRATMR      ;Address the timer
02A1 D2A9                 JB6     BEX5B           ;Test timer if 'off'
                                                  ;Reload timer if 'on'
02A3 B934                 MOV     R1,#PRTWTH +1   ;with the portrait width
02A5 F1                   MOV     A,@R1           ;highbyte to adjust for
02A6 0305                 ADD     A,#05D          ;speed. Add 5 for non 0
02A8 A0                   MOV     @R0,A

02A9 F0           BEX5B:  MOV     A,@R0
02AA 07                   DEC     A
02AB A0                   MOV     @R0,A
02AC C6BB                 JZ      BILREC          ;Go to bill recognition


02AE B87B         BEX5C:  MOV     R0,#RECSTA      ;Get recognition status
02B0 F0                   MOV     A,@R0
02B1 37                   CPL     A
02B2 7221                 JB3     BEXEC           ;Loop if not MBRDR2

02B4 B87A                 MOV     R0,#BCNT2       ;If trailing border count
02B6 F0                   MOV     A,@R0           ;less than 20, Loop
02B7 03EB                 ADD     A,#20D NOT
02B9 E621                 JNC     BEXEC
                                                  ;Go atempt recognition
                  $Eject

                  ;;;;;;;;;;;;;;;;;;;;;;;;;;;;;;;;;;;;;;;;;;;;;;;;;;;;;;;
                  ;                                                     ;
                  ; BILREC,  Bill recognition.                          ;
                  ;                                                     ;
                  ;;;;;;;;;;;;;;;;;;;;;;;;;;;;;;;;;;;;;;;;;;;;;;;;;;;;;;;


                  ; Stop the motor and ...
                  ;
                  ; 1.  Compute Bill speed factor by dividing the nominal
                  ;     portrait width (PRTNOM) by the measured portrait
                  ;     width at five inches per second (PRTWTH).
                  ; 2.  Compute the Denomination space percentage by
                  ;     dividing the denomonation space value by the
                  ;     denomination width.
                  ; 3.  Compute the portrait grih histagram.
                  ;
                  ; 4.  Test for 3 magnetic field bits and the Seal bit.
                  ; 5.  Test the portrait width to be within 20% of
                  ;     the nominal at 5 inches per second.
                  ; 6.  Test the edges of the portrait samples for values
                  ;     greater than 3FFH.
                  ; 7.  Test the overall denomination width for gross error.
                  ; 8.  Branch to indavidual bill denomination tests based
                  ;     on the portrait grid histagram bins.


02BB 15           BILREC: DIS     I

02BC 14F2                 CALL    BRAKE           ;Reverse motor for
                                                  ;200ms
```

```
                 ;     Compute Bill speed factor by dividing the nominal
                 ;     portrait width (PRTNOM) by the measured portrait
                 ;     width at five inches per second (PRTWTH).
                 ;     Save the result in SPEED.
02BE B833        BR1:     MOV     R0,#PRTWTH          ;Divide portrait width
02C0 F0                   MOV     A,@R0               ;by 26000
02C1 AE                   MOV     R6,A
02C2 18                   INC     R0
02C3 F0                   MOV     A,@R0
02C4 AF                   MOV     R7,A                ;Divisor loaded
02C5 BA90                 MOV     R2,#PRTNOM LOW
02C7 BB65                 MOV     R3,#PRTNOM HIGH     ;Dividend loaded
02C9 F413                 CALL    DIV16               ;DIVIDE
02CB B813                 MOV     R0,#SPEED           ;Save the result in
02CD F9                   MOV     A,R1                ;ram @ SPEED.
02CE A0                   MOV     @R0,A               ;Lowbyte
02CF FA                   MOV     A,R2
02D0 18                   INC     R0
02D1 A0                   MOV     @R0,A               ;Highbyte
                 ;     Compute the Denomination space percentage by
                 ;     dividing the denomonation space value by the
                 ;     denomination width.
02D2 B82E        BR2:     MOV     R0,#DNMWTH          ;Denom width in divisor
02D4 F0                   MOV     A,@R0
02D5 AE                   MOV     R6,A
02D6 18                   INC     R0
02D7 F0                   MOV     A,@R0
02D8 AF                   MOV     R7,A
02D9 B830                 MOV     R0,#SPCWTH          ;Denom spaces in dividend
02DB F0                   MOV     A,@R0
02DC AA                   MOV     R2,A
02DD 18                   INC     R0
02DE F0                   MOV     A,@R0
02DF AB                   MOV     R3,A
02E0 F413                 CALL    DIV16
02E2 B832                 MOV     R0,#DPRCNT          ;Fractional answer in
02E4 F9                   MOV     A,R1
02E5 A0                   MOV     @R0,A
                 ;     Compute the portrait grid histagram.
                 ;     Normalize the three GRID values for the speed of
                 ;     this bill by  PRTWTH/PRTNOM * Grid Value = Adjusted
                 ;     Grid value. Store these in ADJGS thru ADJG5.
                 ;      Compare each value in portrait ram to the adjusted
                 ;     grid values, plus and minus the fixed windows. Add
                 ;     one to the 'hit' counter (HITS thru HIT5) for each
                 ;     portrait ram entry that fits.
02E6 B833        BR3:     MOV     R0,#PRTWTH          ;Divide portrait width
02E8 F0                   MOV     A,@R0               ;by 26000
02E9 AA                   MOV     R2,A
02EA 18                   INC     R0
02EB F0                   MOV     A,@R0
02EC AB                   MOV     R3,A                ;Divisor loaded
02ED BE90                 MOV     R6,#PRTNOM LOW
02EF BF65                 MOV     R7,#PRTNOM HIGH     ;Dividend loaded
02F1 F413                 CALL    DIV16               ;DIVIDE
02F3 F9                   MOV     A,R1
02F4 AE                   MOV     R6,A
02F5 FA                   MOV     A,R2
02F6 AF                   MOV     R7,A
02F7 6400                 JMP     BR3A
                 $Eject
0300                      ORG     300H
0300 B820        BR3A:    MOV     R0,#ADJGS           ;Clear recognition regs
0302 BA0D                 MOV     R2,#13D
0304 B000        BR3A1:   MOV     @R0,#00
0306 18                   INC     R0
0307 EA04                 DJNZ    R2,BR3A1
0309 B920        BR3B:    MOV     R1,#ADJGS           ;Set up and compute and
030B B800                 MOV     R0,#00              ;save the adjusted grid
030D B47E                 CALL    COMPAG              ;nominal value
030F B923        BR3C:    MOV     R1,#ADJG1           ;Set up and compute and
0311 B801                 MOV     R0,#01              ;save the adjusted grid
0313 B47E                 CALL    COMPAG              ;nominal value
```

```
0315 B926    BR3D:  MOV    R1,#ADJG2       ;Set up and compute and
0317 B802           MOV    R0,#02          ;save the adjusted grid
0319 B47E           CALL   COMPAG          ;nominal value

031B B929    BR3E:  MOV    R1,#ADJG5       ;Set up and compute and
031D B803           MOV    R0,#03          ;save the adjusted grid
031F B47E           CALL   COMPAG          ;nominal value


0321 BB22    BR3F:  MOV    R3,#34          ;# of samples to test
0323 B936           MOV    R1,#PRTRT       ;1st sample being tested

0325 B820    BR3G:  MOV    R0,#ADJGS       ;Adjusted grid address
0327 BA76           MOV    R2,#WNDWS LOW   ;ROM based window address
0329 B448           CALL   TSTSMPL         ;Go test grid sample

032B B823           MOV    R0,#ADJG1       ;Adjusted grid address
032D BA78           MOV    R2,#WNDW1 LOW   ;ROM based window address
032F B448           CALL   TSTSMPL         ;Go test grid sample

0331 B826           MOV    R0,#ADJG2       ;Adjusted grid address
0333 BA7A           MOV    R2,#WNDW2 LOW   ;ROM based window address
0335 B448           CALL   TSTSMPL         ;Go test grid sample

0337 B829           MOV    R0,#ADJG5       ;Adjusted grid address
0339 BA7C           MOV    R2,#WNDW5 LOW   ;ROM based window address
033B B448           CALL   TSTSMPL         ;Go test grid sample

033D 19             INC    R1
033E 19             INC    R1
033F EB25           DJNZ   R3,BR3G




             ;    Test for 3 magnetic field bits and the Seal bit.


0341 B87B    BR4:   MOV    R0,#RECSTA      ;Test recognition status
0343 F0             MOV    A,@R0
0344 B2FC           JB5    REJJMP          ;Reject if error bit set
0346 4378           ORL    A,#78H
0348 37             CPL    A
0349 96FC           JNZ    REJJMP          ;Reject if any of the 3
                                           ;field bits or the seal
                                           ;bit are not set.


             ;    Test the portrait width to be within 20% of
             ;  the nominal at 5 inches per second.

034B B87D    BR5:   MOV    R0,#ACCDNM      ;Set bill reject value
034D B020           MOV    @R0,#20H

034F B833           MOV    R0,#PRTWTH      ;Sub 26000 - 20% from
0351 F0             MOV    A,@R0           ;portrait width.
0352 37             CPL    A
0353 0360           ADD    A,#PRTHI LOW
0355 18             INC    R0
0356 F0             MOV    A,@R0
0357 37             CPL    A
0358 1354           ADDC   A,#PRTHI HIGH
035A F6FC           JC     REJJMP          ;Reject bill if less

035C B833           MOV    R0,#PRTWTH      ;Sub 26000 + 20% from
035E F0             MOV    A,@R0           ;portrait width.
035F 37             CPL    A
0360 03F4           ADD    A,#PRTLOW LOW
0362 18             INC    R0
0363 F0             MOV    A,@R0
0364 37             CPL    A
0365 137E           ADDC   A,#PRTLOW HIGH
0367 E6FC           JNC    REJJMP          ;Reject bill if greater



             ;    Test the edges of the portrait samples for values
             ;  greater than 3FFH.


0369 B87D    BR6:   MOV    R0,#ACCDNM      ;Set bill reject value
036B B030           MOV    @R0,#30H

036D B837           MOV    R0,#PRTRT +1    ;Test the 1st N portrait
036F BA0D           MOV    R2,#13D         ;ram entry MSB's for
0371 F0      BR6A:  MOV    A,@R0           ;=> 4.
0372 03FC           ADD    A,#03H NOT
0374 F6FC           JC     REJJMP          ;Reject if => 4.
0376 18             INC    R0
0377 18             INC    R0
0378 EA71           DJNZ   R2,BR6A

037A B85F    BR6B:  MOV    R0,#PRTRT +41   ;Test the last N portrait
037C BA0D           MOV    R2,#13D         ;ram entry MSB's for
037E F0      BR6C:  MOV    A,@R0           ;=> 4.
```

```
037F 03FC           ADD     A,#03H NOT      ;Reject if => 4.
0381 F6FC           JC      REJJMP
0383 18             INC     R0
0384 18             INC     R0
0385 EA7E           DJNZ    R2,BR6C


          ;   Test the overall denomination width for gross error.


0387 B87D      BR7: MOV     R0,#ACCDNM      ;Set bill reject value
0389 B040           MOV     @R0,#40H

038B B813           MOV     R0,#SPEED       ;Put the speed factor in
038D F0             MOV     A,@R0           ;R6 & R7 for MULT16
038E AE             MOV     R6,A            ;Lowbyte
038F 18             INC     R0
0390 F0             MOV     A,@R0           ;Highbyte
0391 AF             MOV     R7,A

0392 B82E           MOV     R0,#DNMWTH      ;Set up to multiply
0394 F0             MOV     A,@R0           ;denomination width by
0395 AA             MOV     R2,A            ;the speed factor in
0396 18             INC     R0              ;R6, R7
0397 F0             MOV     A,@R0
0398 AB             MOV     R3,A

0399 F400           CALL    MULT16

039B FD             MOV     A,R5            ;If R5 > 0 reject
039C 96FC           JNZ     REJJMP

039E FB             MOV     A,R3            ;Adjusted denom width
039F 37             CPL     A
03A0 03D4           ADD     A,#DNMHI LOW
03A2 FC             MOV     A,R4
03A3 37             CPL     A
03A4 1330           ADDC    A,#DNMHI HIGH
03A6 F6FC           JC      REJJMP          ;Reject bill if less

03A8 FB             MOV     A,R3
03A9 37             CPL     A
03AA 0328           ADD     A,#DNMLOW LOW
03AC FC             MOV     A,R4
03AD 37             CPL     A
03AE 1355           ADDC    A,#DNMLOW HIGH
03B0 E6FC           JNC     REJJMP          ;Reject bill if greater



          ; $1 bill tests

03B2 B87D      BR9: MOV     R0,#ACCDNM      ;Set bill reject value
03B4 B050           MOV     @R0,#50H

03B6 B928           MOV     R1,#HIT2        ;Test HIT1 > HIT2 by at
03B8 B4B3           CALL    TSTONE          ;least SEPONE
03BA F6D4           JC      BR10            ;Ex if HIT1-HIT2<SEPVAL

03BC B92B     BR9B: MOV     R1,#HIT5        ;Test HIT1 > HIT5 by at
03BE B4B3           CALL    TSTONE          ;least SEPONE
03C0 F6D4           JC      BR10            ;Ex if HIT1-HIT5<SEPVAL

03C2 B832     BR9C: MOV     R0,#DPRCNT      ;Test denomination space
03C4 F0             MOV     A,@R0           ;percentage.
03C5 03A0           ADD     A,#(LPCNT1 -1) NOT
03C7 E6FC           JNC     REJJMP          ;Reject if < low limit
03C9 F0             MOV     A,@R0
03CA 0302           ADD     A,#(HPCNT1-1) NOT
03CC F6FC           JC      REJJMP          ;Reject if > high limit

03CE B87D     BR9D: MOV     R0,#ACCDNM      ;Accepted bill denom.
03D0 B001           MOV     @R0,#01         ;01 fo $1 bill accept
03D2 8460           JMP     INTRFC



          ; $2 bill tests

03D4 B925     BR10: MOV     R1,#HIT1        ;Test HIT2 > HIT1 by at
03D6 B4BD           CALL    TSTTWO          ;least SEPTWO
03D8 F6FE           JC      JMPBR11         ;Ex if HIT2-HIT1<SEPVAL

03DA B92B    BR10B: MOV     R1,#HIT5        ;Test HIT2 > HIT5 by at
03DC B4BD           CALL    TSTTWO          ;least SEPTWO
03DE F6FE           JC      JMPBR11         ;Ex if HIT2-HIT5<SEPVAL

             BR10D:                         ;Special case rejection
03E0 B822           MOV     R0,#HITS        ;If the .007" bin is =>
03E2 F0             MOV     A,@R0           ;04 this was probably
03E3 03FC           ADD     A,#03D NOT      ;a $100 bill.
03E5 F6FC           JC      REJJMP

03E7 B82D    BR10E: MOV     R0,#BCNT1       ;If the border count is
03E9 F0             MOV     A,@R0           ;greater than 48 this
03EA 03CF           ADD     A,#48D NOT      ;was probably a $50 bill.
```

```
03EC F6FC                JC       REJJMP

03EE B813      BR10F:    MOV      R0,#SPEED         ;Put the speed factor in
03F0 F0                  MOV      A,@R0             ;R6 & R7 for MULT16
03F1 AE                  MOV      R6,A              ;Lowbyte
03F2 18                  INC      R0
03F3 F0                  MOV      A,@R0             ;Highbyte
03F4 AF                  MOV      R7,A

03F5 B82E                MOV      R0,#DNMWTH        ;Set up to multiply
03F7 F0                  MOV      A,@R0             ;denomination width by
03F8 AA                  MOV      R2,A              ;the speed factor in
03F9 18                  INC      R0                ;R6, R7
03FA 8400                JMP      BR10F1


03FC 8450      REJJMP:   JMP      BILREJ
03FE 842D      JMPBR11:  JMP      BR11
               $Eject
0400                     ORG      400H

0400 F0        BR10F1:   MOV      A,@R0
0401 AB                  MOV      R3,A

0402 F400                CALL     MULT16

0404 FC                  MOV      A,R4              ;If the speed adjusted
0405 03C3                ADD      A,#60D NOT        ;denomination width MSB
0407 E650                JNC      BILREJ            ;is < = 60D
                                                    ;this was a $50 bill.

0409 03F7                ADD      A,#08D NOT        ;If its > 68D its a $2
040B F614                JC       BR10G             ;so just continue.

040D B812      BR10F2:   MOV      R0,#DPSPCE        ;If denom width is between
040F F0                  MOV      A,@R0             ;60 & 68 test dennom to
0410 03E9                ADD      A,#22D NOT        ;portrait space. If < 60ms
0412 E650                JNC      BILREJ            ;reject as a $10 bill


0414 B82B      BR10G:    MOV      R0,#HIT5          ;If $5 hit count is =>
0416 F0                  MOV      A,@R0             ;8 this was probably
0417 03F8                ADD      A,#07D NOT        ;a $10 bill.
0419 F650                JC       BILREJ

041B B832      BR10H:    MOV      R0,#DPRCNT        ;Test denomination space
041D F0                  MOV      A,@R0             ;percentage.
041E 03C6                ADD      A,#(LPCNT2 -1) NOT
0420 E650                JNC      BILREJ            ;Reject if < low limit
0422 F0                  MOV      A,@R0
0423 035F                ADD      A,#(HPCNT2-1) NOT
0425 F650                JC       BILREJ            ;Reject if > high limit

0427 B87D                MOV      R0,#ACCDNM        ;Accepted bill denom.
0429 B002                MOV      @R0,#02           ;02 fo $2 bill accept
042B 8460                JMP      INTRFC




               ; $5 bill test

042D B925      BR11:     MOV      R1,#HIT1          ;Test HIT5 > HIT1 by at
042F B4C7                CALL     TSTFIV            ;least SEPFIV
0431 F650                JC       BILREJ            ;Ex if HIT5-HIT1<SEPVAL

0433 B928      BR11B:    MOV      R1,#HIT2          ;Test HIT5 > HIT2 by at
0435 B4C7                CALL     TSTFIV            ;least SEPFIV
0437 F650                JC       BILREJ            ;Ex if HIT5-HIT2<SEPVAL

0439 B82D      BR11D:    MOV      R0,#BCNT1         ;If the leading border
043B F0                  MOV      A,@R0             ;count is > 40D this
043C 03D7                ADD      A,#40D NOT        ;was a $10 bill.
043E F650                JC       BILREJ

0440 B832      BR11E:    MOV      R0,#DPRCNT        ;Test denomination space
0442 F0                  MOV      A,@R0             ;percentage.
0443 03A7                ADD      A,#(LPCNT5 -1) NOT
0445 E650                JNC      BILREJ            ;Reject if < low limit
0447 F0                  MOV      A,@R0
0448 0350                ADD      A,#(HPCNT5-1) NOT
                                                    ;Reject if > high limit

044A B87D      BR11F:    MOV      R0,#ACCDNM        ;Accepted bill denom.
044C B004                MOV      @R0,#04           ;04 fo $5 bill accept
044E E660                JNC      INTRFC            ;Else accept it


               $Eject

               ;;;;;;;;;;;;;;;;;;;;;;;;;;;;;;;;;;;;;;;;;;;;;;;;;;;;;;;;;;;;
               ;                                                          ;
               ; BILREJ,   Bill rejection control.                        ;
               ;                                                          ;
               ;;;;;;;;;;;;;;;;;;;;;;;;;;;;;;;;;;;;;;;;;;;;;;;;;;;;;;;;;;;;

```

```
0450 B817        BILREJ:  MOV     R0,#DATMES       ;Set up SLUG message
0452 B08B                 MOV     @R0,#SLUG

0454 B87F        BILRET:  MOV     R0,#INTSTA       ;Send slug message if
0456 F0                   MOV     A,@R0            ;Smart interface
0457 37                   CPL     A
0458 F25C                 JB7     EXBR1            ;Go return the bill if not
045A F4AB                 CALL    SNDMES           ;Else send the message

045C D4D3        EXBR1:   CALL    REJBIL           ;Go send the bill back
045E 84FA                 JMP     EXINT2           ;Send DEBUG data
                                                   ;and ret to IDLE



                 $Eject


0460 BA50        INTRFC:  MOV     R2,#80D          ;Kill 200ms "quiet time"
0462 F460                 CALL    WAIT

0464 B87F                 MOV     R0,#INTSTA       ;Use interface status
0466 F0                   MOV     A,@R0            ;branch.
0467 F26F                 JB7     SMART            ;Serial Interface
0469 B2AB                 JB5     DUMB             ;Low Level Isolated
046B D2E9                 JB6     MORON            ;High Level Isolated
046D 8450                 JMP     BILREJ


                 ;;;;;;;;;;;;;;;;;;;;;;;;;;;;;;;;;;;;;;;;;;;;;;;;;;;;
                 ;                                                  ;
                 ;  SMART ,     Serial "MC5000 style" Interface     ;
                 ;                                                  ;
                 ;                                                  ;
                 ;  INPUT:                                          ;
                 ;  OUTPUT:                                         ;
                 ;  MODIFIED:                                       ;
                 ;                                                  ;
                 ;;;;;;;;;;;;;;;;;;;;;;;;;;;;;;;;;;;;;;;;;;;;;;;;;;;;


046F B917        SMART:   MOV     R1,#DATMES       ;Adrs data message ram

0471 B87D                 MOV     R0,#ACCDNM       ;Get accepted bill
0473 F0                   MOV     A,@R0            ;denomination
0474 B181                 MOV     @R1,#ONEDLR      ;Set up DATMES
0476 1282                 JB0     SNDVAL           ;Send $1 value if set
0478 B182                 MOV     @R1,#TWODLR      ;Set up DATMES
047A 3282                 JB1     SNDVAL           ;Send $2 value if set
047C B183                 MOV     @R1,#FIVDLR      ;Set up DATMES
047E 5282                 JB2     SNDVAL           ;Send $5 value if set
0480 8450                 JMP     BILREJ           ;Reject if none set

0482 F4AB        SNDVAL:  CALL    SNDMES           ;Go send message

                 ; Watch ACCENA for credit vs. retrun instuctions.
                 ; If it stays low for 5ms credit the bill.

0484 BC0D        SMART1:  MOV     R4,#13D          ;Loop count
0486 F481        SMRT1A:  CALL    GETP1            ;Read P1 (400us)
0488 F68C                 JC      SMRT1B           ;No change if bad read
048A 729A                 JB3     SMART2           ;Go to Return bill test
048C EC86        SMRT1B:  DJNZ    R4,SMRT1A        ;Loop for 5ms +

048E D469        GETBIL:  CALL    TAKBIL           ;Go swallow the bill
0490 96F4                 JNZ     FAILED

0492 B917        SNDVND:  MOV     R1,#DATMES
0494 B189                 MOV     @R1,#VEND
0496 F4AB                 CALL    SNDMES           ;Send the vend message
0498 84F8                 JMP     EXINT1           ;Exit

                 ; If ACCENA stays high for 4.5ms return the bill

049A BC0B        SMART2:  MOV     R4,#11D          ;Loop count
049C F481        SMRT2A:  CALL    GETP1            ;Read P1 (400us)
049E F6A3                 JC      SMRT2B           ;No change if bad read
04A0 37                   CPL     A
04A1 7284                 JB3     SMART1           ;Go back to low test
                                                   ;if ACCENA drops.
04A3 EC9C        SMRT2B:  DJNZ    R4,SMRT2A        ;Loop for 5ms +

04A5 B917        RTNBIL:  MOV     R1,#DATMES       ;Set up RETURNED message
04A7 B1BA                 MOV     @R1,#RETRN
04A9 8454                 JMP     BILRET

                 $Eject


                 ;;;;;;;;;;;;;;;;;;;;;;;;;;;;;;;;;;;;;;;;;;;;;;;;;;;;
                 ;                                                  ;
                 ;  DUMB  ,     "Low Level Isolated Interface"      ;
                 ;                                                  ;
                 ;                                                  ;
                 ;  INPUT:      Accepted bill denomination in ACCDNM. ;
                 ;              Interface status at time of bill start ;
                 ;              in INTSTA.                          ;
```

```
          ; OUTPUT:                                                  ;
          ; MODIFIED:                                                ;
          ;                                                          ;
          ;;;;;;;;;;;;;;;;;;;;;;;;;;;;;;;;;;;;;;;;;;;;;;;;;;;;;;;;;;;;

04AB 14E9  DUMB:    CALL    TSTENA          ;Go test enable for this
                                            ;bill.
04AD C650           JZ      BILREJ          ;Reject if not enabled
                                            ;at the time of bill
                                            ;insertion

04AF F0    DUMB1:   MOV     A,@R0           ;Get INTSTA
04B0 37             CPL     A               ;Test for Escro Enabled
04B1 72F0           JB3     RLYCDT          ;Go credit the bill if not

          ; If ESCRO is enabled, send the bill value (RLYOUT) and
          ;wait for instructions.

04B3 D400  DUMB2:   CALL    RLYOUT          ;Send bill value

04B5 B815  DUMB3:   MOV     R0,#OPDBNC      ;Load OPDBNC and OPTMR
04B7 B005           MOV     @R0,#05D        ;for reflective cheat
04B9 18             INC     R0              ;test.
04BA B000           MOV     @R0,#00D

04BC BF13           MOV     R7,#19D         ;Max wait for Enable high
                                            ;18 * 20ms(timer)=360ms
04BE BE07  DUMB3A:  MOV     R6,#07          ;Escro ret. pulse debounce
                                            ;7 times 2+ms(INTTST)=16ms
04C0 CF    DUMB3B:  DEC     R7
04C1 16C1  DUMB3C:  JTF     DUMB3C          ;Clear the timer flag
04C3 2305           MOV     A,#250D NOT
04C5 62             MOV     T,A
04C6 55             STRT    T               ;Start a 20ms timer

04C7 F46B  DUMB3D:  CALL    TSTREF          ;Test reflective for cheat
04C9 9650           JNZ     BILREJ          ;Reject if > 0 reflective
                                            ;pulses while waiting.

04CB BC05           MOV     R4,#05D         ;5 * 400us = 2ms
04CD B410           CALL    INTT2           ;Go read the Interface

04CF FE    DUMB3E:  MOV     A,R6
04D0 C6D9           JZ      DUMB3G          ;If R6=0 don't read Escro

04D2 F0             MOV     A,@R0           ;Get INTSTA
04D3 37             CPL     A
04D4 72D8           JB3     DUMB3F          ;If "on" dec. it
04D6 BE04           MOV     R6,#04D         ;Else reload it
04D8 CE    DUMB3F:  DEC     R6

04D9 FF    DUMB3G:  MOV     A,R7
04DA C6E0           JZ      DUMB4           ;Test Enable if timeout
04DC 16C0           JTF     DUMB3B          ;Dec R7 if timer overflow
04DE 84C7           JMP     DUMB3D

04E0 14E9  DUMB4:   CALL    TSTENA          ;Test enable for this bill
04E2 C6C7           JZ      DUMB3D          ;Loop if disabled

04E4 FE    DUMB5:   MOV     A,R6            ;If Escro ret pulse of
04E5 C654           JZ      BILRET          ;16ms return bill
04E7 84F0           JMP     RLYCDT          ;Else go credit the bill
          $Eject

          ;;;;;;;;;;;;;;;;;;;;;;;;;;;;;;;;;;;;;;;;;;;;;;;;;;;;;;;;;;;;
          ;                                                          ;
          ;  MORON ,    117 vac  "High Level Interface".             ;
          ;                                                          ;
          ;                                                          ;
          ;  INPUT:     Accepted bill denomination in ACCDNM.        ;
          ;  OUTPUT:    None                                         ;
          ;  MODIFIED: RA, R1                                        ;
          ;                                                          ;
          ;;;;;;;;;;;;;;;;;;;;;;;;;;;;;;;;;;;;;;;;;;;;;;;;;;;;;;;;;;;;

04E9 B97D  MORON:   MOV     R1,#ACCDNM      ;If denomination is not
04EB F1             MOV     A,@R1           ;$1 Reject this bill.
04EC D301           XRL     A,#01H
04EE 9650           JNZ     BILREJ          ;Reject if not $1

04F0 D469  RLYCDT:  CALL    TAKBIL          ;Swallow the bill.
04F2 C6F6           JZ      RCDT1           ;Send credit if good
04F4 8450  FAILED:  JMP     BILREJ          ;Reject if bad

04F6 D400  RCDT1:   CALL    RLYOUT          ;Go output relay pulse(s).

04F8 D492  EXINT1:  CALL    STACKR          ;Handle stacker if present
04FA B4D1  EXINT2:  CALL    SNDDBG          ;Go send DEBUG data
04FC 24BB           JMP     IDLE
          $Eject
```

```
0500                    ORG     500H

                ;;;;;;;;;;;;;;;;;;;;;;;;;;;;;;;;;;;;;;;;;;;;;;;;;
                ;                                               ;
                ; INTTST,   Interface Test.  Read in P1 (interface) ;
                ;           and save it in R3. Read in the Option   ;
                ;           switches and save in OPTNSW. Determine  ;
                ;           the active interface, if any, using     ;
                ;           option switch bit 6 and the state of    ;
                ;           the I/O lines.                          ;
                ;                                               ;
                ; INPUT:      At INTTST None                        ;
                ;             At INTT2  R4= # of reads              ;
                ; OUTPUT:     Option switch data in OPTNSW.         ;
                ;             Interface status   in INTSTA.         ;
                ; MODIFIED:  RA, R0, R1, R2, R3, R5                 ;
                ;                                               ;
                ;;;;;;;;;;;;;;;;;;;;;;;;;;;;;;;;;;;;;;;;;;;;;;;;;


0500 B97E       INTTST: MOV     R1,#OPTNSW      ;Option sw ram address
0502 B800       RDOPSW: MOV     R0,#00H         ;Minimize bus conflict
0504 BA0A       RDOS1:  MOV     R2,#10D         ;Switch read loop cntr
0506 80         RDOS2:  MOVX    A,@R0           ;Get the switch
0507 37                 CPL     A
0508 21                 XCH     A,@R1
0509 D1                 XRL     A,@R1
050A 9604               JNZ     RDOS1           ;Loop if not the same
050C EA06               DJNZ    R2,RDOS2        ;Loop till 10 identical

050E BC28       INTT1:  MOV     R4,#40D         ;Read in the interface
                                                ;THIS LOOP MUST BE LONGER
                                                ;THAN THE  117 A.C. OPTO
                                                ;DROP OUT TIME.
                                                ;40 * 400us =16ms

                ;Read the interface R4 times. AND together debounced
                ;reads (2 in a row that match) to catch the AC signals
                ;that are only low for-7ms each AC cycle.

0510 B8FF       INTT2:  MOV     R0,#0FFH        ;Starting value
0512 F481       INTT3:  CALL    GETP1           ;400us read
0514 F61D               JC      DECR4           ;Exit on read error
0516 2D                 XCH     A,R5            ;Save in R5
0517 DD                 XRL     A,R5            ;Compare with R5
0518 961D               JNZ     DECR4           ;Bad compare

051A FD                 MOV     A,R5            ;Get read
051B 58                 ANL     A,R0            ;AND into R0
051C A8                 MOV     R0,A            ;save

051D EC12       DECR4:  DJNZ    R4,INTT3        ;Try again
051F F8                 MOV     A,R0
0520 AD                 MOV     R5,A            ;Place read in R5


0521 B87F       INTT4:  MOV     R0,#INTSTA      ;Adrs INTerface STAtus
0523 B000               MOV     @R0,#00H        ;Kill interface status
0525 B97E               MOV     R1,#OPTNSW
0527 F1                 MOV     A,@R1
0528 D238               JB6     LLIINT          ;Go test low level Iso.

052A FD         SERINT: MOV     A,R5            ;Get P1 image
052B 7230               JB3     HLIINT          ;Go test High livel Iso.
052D B08F       SERI1:  MOV     @R0,#8FH        ;Set INTSTA to Serial
                                                ;Interface, Any bill &
052F 83         EXSERI: RET                     ;Escro enabled.

0530 3237       HLIINT: JB1     EXHLI           ;Test High level Enable
0532 37                 CPL     A
0533 1237               JB0     EXHLI           ;Test High level Inhibit
0535 B041       HLII1:  MOV     @R0,#41H        ;Set INTSTA to High Level
                                                ;Interface, $1 bill only
0537 83         EXHLI:  RET                     ;Escro disabled.

0538 FD         LLIINT: MOV     A,R5            ;Get P1 image
0539 37                 CPL     A
053A 530F               ANL     A,#0FH          ;Kill upper 4 bits
053C 1244               JB0     LLII1           ;Cont. if $1 enabled
053E 3244               JB1     LLII1           ;Cont. if $2 enabled
0540 5244               JB2     LLII1           ;Cont. if $5 enabled
0542 A0         EXLLI:  MOV     @R0,A           ;Save Escro line state
0543 83                 RET

0544 4320       LLII1:  ORL     A,#20H          ;Set Low level bit
0546 A0                 MOV     @R0,A           ;Set INTSTA to Low Level
                                                ;Interface, Bills and
                                                ;Escro enabled by port
0547 83                 RET                     ;read.
                $Eject

                ;;;;;;;;;;;;;;;;;;;;;;;;;;;;;;;;;;;;;;;;;;;;;;;;;
                ;                                               ;
                ; TSTSMPL,  Test the portrait ram sample. If it     ;
                ;           falls within the window arround the     ;
```

```
                ;          adjusted grid, increment the hit cntr.   ;
                ; INPUT:   R0 = Adjusted grid value address         ;
                ;          R1 = Portrait sample address             ;
                ;          R2 = ROM window address                  ;
                ; OUTPUT:  HIT register "n" incremented if it fits  ;
                ; MODIFIED:  RA, R0, R1, R4, R5                     ;
                ;                                                   ;
                ;;;;;;;;;;;;;;;;;;;;;;;;;;;;;;;;;;;;;;;;;;;;;;;;;;;;;

                TSTSMPL:                      ;Sub. Sample from adjusted grid
0548 F0         TSTS1:  MOV     A,@R0         ;Get adj. grid lowbyte
0549 37                 CPL     A
054A 61                 ADD     A,@R1         ;Subtract sample lowbyte
054B 37                 CPL     A
054C AD                 MOV     R5,A          ;Save answer in R5, R6
054D 18                 INC     R0
054E 19                 INC     R1
054F F0                 MOV     A,@R0         ;Get adj. grid highbyte
0550 37                 CPL     A
0551 71                 ADDC    A,@R1         ;Subtract sample highbyte
0552 37                 CPL     A
0553 AE                 MOV     R6,A          ;Save answer
0554 18                 INC     R0            ;Address "HIT" register
0555 C9                 DEC     R1            ;Address sample low

                ; If the answer is negative, make it positive.
                ; "Absolute value routine"

0556 E66A       TSTS2:  JNC     TSTS3         ;Skip if positive
0558 FD                 MOV     A,R5
0559 37                 CPL     A
055A 0301               ADD     A,#01
055C AD                 MOV     R5,A
055D FE                 MOV     A,R6
055E 37                 CPL     A
055F 1300               ADDC    A,#00H
0561 AE                 MOV     R6,A

                ; The sample is larger than the adjusted grid norm use
                ;the second window value (upper limit).

0562 FE         TSTS2A: MOV     A,R6          ;If adj. grid - sample is
0563 9675               JNZ     EXTSTS        ;> 256, Exit.
0565 FA                 MOV     A,R2          ;Get window address
0566 17                 INC     A             ;Plus one
0567 A3                 MOVP    A,@A          ;Get window
0568 A46F               JMP     TSTS3A

                ; The sample is smaller than the adjusted grid norm use
                ;the first window value (lower limit).

056A FE         TSTS3:  MOV     A,R6          ;If adj. grid - sample is
056B 9675               JNZ     EXTSTS        ;> 256, Exit.
056D FA                 MOV     A,R2          ;Get window address
056E A3                 MOVP    A,@A          ;Get window
056F 37         TSTS3A: CPL     A
0570 6D                 ADD     A,R5          ;Subtract difference
0571 37                 CPL     A
0572 F675               JC      EXTSTS        ;Exit if diff. > window
0574 10         TSTS4:  INC     @R0           ;Add one to the HIT reg.
                                              ;if diff. <= window.
0575 83         EXTSTS: RET

0576 10         WNDWS:  DB      LWDWS         ;Special .007 bin
0577 08                 DB      HWDWS
0578 08         WNDW1:  DB      LWDW1         ;$1 bill accept window
0579 10                 DB      HWDW1
057A 10         WNDW2:  DB      LWDW2         ;$2 bill accept window
057B 06                 DB      HWDW2
057C 06         WNDW5:  DB      LWDW5         ;$5 bill accept window
057D 10                 DB      HWDW5
                $Eject

                ; Compute Adjusted Grid.
                ; On entry  R1=RAM desination address

057E F8         COMPAG: MOV     A,R0          ;Grid value into R2, R3
057F 038D               ADD     A,#GRDLST LOW
0581 A3                 MOVP    A,@A
0582 AA                 MOV     R2,A
0583 BB00               MOV     R3,#00H

0585 F400               CALL    MULT16        ;Adj width * nominal grid
0587 FB                 MOV     A,R3          ;Save the adjusted grid
0588 A1                 MOV     @R1,A
0589 19                 INC     R1
058A FC                 MOV     A,R4
058B A1                 MOV     @R1,A
058C 83                 RET

058D 8C         GRDLST: DB      SEEDS,SEED1,SEED2,SEED5
058E A0
058F C8
0590 DC
```

```
          ; Subtract the mag. pulse time (@R0) from the
          ;Interupt Time value (R4,R5,R6), leave result in R2, R3.
          ;If > 65535 exit with the accumulator non 0.

0591 B824   SUBSTP: MOV     R0,#MSTOP       ;Set up for SUBTIM

0593 FC     SUBTIM: MOV     A,R4            ;Lowbyte of Intr time
0594 37             CPL     A
0595 60             ADD     A,@R0           ;Sub lowbyte
0596 37             CPL     A
0597 AA             MOV     R2,A            ;Save in R2
0598 18             INC     R0
0599 FD             MOV     A,R5            ;Midbyte of Intr time
059A 37             CPL     A
059B 70             ADDC    A,@R0           ;Sub midbyte
059C 37             CPL     A
059D AB             MOV     R3,A            ;Save result in R3
059E 18             INC     R0
059F FE             MOV     A,R6            ;Highbyte of Intr time
05A0 37             CPL     A
05A1 70             ADDC    A,@R0           ;Sub highbyte
05A2 37             CPL     A
05A3 83             RET



05A4 F0     ZROTST: MOV     A,@R0           ;Three byte ORL @R0 for
05A5 C8             DEC     R0              ;zero content test.
05A6 40             ORL     A,@R0
05A7 C8             DEC     R0
05A8 40             ORL     A,@R0
05A9 83             RET

            $Eject

05AA FC     LDTIME: MOV     A,R4            ;Load the present timer
05AB A0             MOV     @R0,A           ;into ram @ R0
05AC 18             INC     R0              ;Load lowbyte to highbyte
05AD FD             MOV     A,R5            ;in ascending addresses
05AE A0             MOV     @R0,A
05AF 18             INC     R0
05B0 FE             MOV     A,R6
05B1 A0             MOV     @R0,A
05B2 83             RET


05B3 B825   TSTONE: MOV     R0,#HIT1
05B5 F0             MOV     A,@R0           ;Subtract @R1 from @R0
05B6 37             CPL     A               ;Then subtract SEPONE
05B7 61             ADD     A,@R1           ;from the result. Return
05B8 F6BC           JC      EXT1            ;carry set if the result
05BA 0308           ADD     A,#SEPONE       ;is < 0.
05BC 83     EXT1:   RET


05BD B828   TSTTWO: MOV     R0,#HIT2
05BF F0             MOV     A,@R0           ;Subtract @R1 from @R0
05C0 37             CPL     A               ;Then subtract SEPTWO
05C1 61             ADD     A,@R1           ;from the result. Return
05C2 F6C6           JC      EXT2            ;carry set if the result
05C4 030A           ADD     A,#SEPTWO       ;is < 0.
05C6 83     EXT2:   RET


05C7 B82B   TSTFIV: MOV     R0,#HIT5
05C9 F0             MOV     A,@R0           ;Subtract @R1 from @R0
05CA 37             CPL     A               ;Then subtract SEPFIV
05CB 61             ADD     A,@R1           ;from the result. Return
05CC F6D0           JC      EXT5            ;carry set if the result
05CE 030C           ADD     A,#SEPFIV       ;is < 0.
05D0 83     EXT5:   RET
            $Eject

            ;Transmit the debug info thru the Debug Data pin.

05D1 B800   SNDDBG: MOV     R0,#00H         ;Fist address to be sent
05D3 BB80           MOV     R3,#80H         ;Send all 128 data ram
05D5 F0     SNDDB1: MOV     A,@R0
05D6 B4DC           CALL    SNDBYT
05D8 18             INC     R0
05D9 EBD5           DJNZ    R3,SNDDB1
05DB 83     EXDBUG: RET


            ; Send a byte (Acc.) out the
            ; Debug data pin

05DC BC0A   SNDBYT: MOV     R4,#0AH
05DE 97             CLR     C
05DF A7             CPL     C               ;Carry = stop bit
05E0 A4E5           JMP     SND0            ;Send the start bit

05E2 67     XMTALP: RRC     A
05E3 F6E9           JC      SND1
05E5 99BF   SND0:   ANL     P1,#DEBUG NOT
```

```
05E7 A4ED                 JMP     BAUD
05E9 00         SND1:     NOP                         ;Loop path equalization
05EA 00                   NOP
05EB 8940                 ORL     P1,#DEBUG
05ED B90F       BAUD:     MOV     R1,#15D             ;15=9600b,  36=4800b
05EF E9EF       BAUD1:    DJNZ    R1,BAUD1            ;77=2400b, 161=1200b
05F1 ECE2                 DJNZ    R4,XMTALP
05F3 08                   INS     A,BUS               ;deadman
05F4 83                   RET

                $Eject
0600                      ORG     600H

                ;;;;;;;;;;;;;;;;;;;;;;;;;;;;;;;;;;;;;;;;;;;;;;;;;;;;;;;;;;;;;
                ;                                                           ;
                ; RLYOUT,  Relay output routine. Control the                ;
                ;          credit relay in accordance with the              ;
                ;          interface status and the option switch           ;
                ;          selections.                                      ;
                ;                                                           ;
                ; INPUT:   OPTNSW = current option selections               ;
                ;          INTSTA = current Interface Status                ;
                ; OUTPUT:  Appropriate # of relay closures                  ;
                ; MODIFIED: RA, R0, R1, R2                                  ;
                ;                                                           ;
                ;;;;;;;;;;;;;;;;;;;;;;;;;;;;;;;;;;;;;;;;;;;;;;;;;;;;;;;;;;;;;

0600 B87F       RLYOUT:   MOV     R0,#INTSTA          ;Adres Interface Status
0602 B97E                 MOV     R1,#OPTNSW          ;Address the option sw

0604 F0                   MOV     A,@R0
0605 D226                 JB6     RELAY               ;Relay only if High level

0607 F1                   MOV     A,@R1
0608 B226                 JB5     RELAY               ;Relay output if selected

060A B87D       CDTLNS:   MOV     R0,#ACCDNM          ;Get Bill denomination
060C F0                   MOV     A,@R0
060D 1215                 JB0     CDTONE
060F 3219                 JB1     CDTTWO
0611 521D                 JB2     CDTFIV
0613 C423                 JMP     EXRO

0615 9AFE       CDTONE:   ANL     P2,#I2CRD1 NOT      ;Lower the $1 credit line
0617 C41F                 JMP     CDTCOM
0619 9AFD       CDTTWO:   ANL     P2,#I2CRD2 NOT      ;Lower the $2 credit line
061B C41F                 JMP     CDTCOM
061D 9AFB       CDTFIV:   ANL     P2,#I2CRD5 NOT      ;Lower the $5 credit line
061F BA3C       CDTCOM:   MOV     R2,#60D             ;Set up a 150ms wait
0621 F460                 CALL    WAIT                ;60 * 2.5ms = 150ms

0623 8A07       EXRO:     ORL     P2,#(I2CRD1 OR I2CRD2 OR I2CRD5)
0625 83                   RET


0626 B87D       RELAY:    MOV     R0,#ACCDNM          ;Address bill denomination

0628 F1                   MOV     A,@R1               ;Get the option switch
0629 1231                 JB0     PULSES              ;Pulse patern if set

062B BAA0       SNGLE:    MOV     R2,#160D            ;Set up 400ms wait
062D D462                 CALL    RLYCOM              ;160 * 2.5ms = 400ms
062F C423                 JMP     EXRO

0631 531C       PULSES:   ANL     A,#1CH              ;Mask all but # pulses
0633 77                   RR      A                   ;per dollar. Then rotate
0634 77                   RR      A                   ;into LSB's.
0635 17                   INC     A                   ;0=1 1=2 etc.
0636 AB                   MOV     R3,A                ;Save in R3

0637 F0         PULSE1:   MOV     A,@R0               ;Get bill denomination
0638 1248                 JB0     PULSE4
063A 3245                 JB1     PULSE3
063C 5240                 JB2     PULSE2
063E C423                 JMP     EXRO

0640 FB         PULSE2:   MOV     A,R3                ;$5 bill. R3 * 5 pulses.
0641 E7                   RL      A                   ;Times 2
0642 E7                   RL      A                   ;Times 4
0643 C446                 JMP     P3A
0645 FB         PULSE3:   MOV     A,R3                ;$2 bill. R3 * 2 pulses.
0646 6B         P3A:      ADD     A,R3
0647 AB                   MOV     R3,A
0648 FB         PULSE4:   MOV     A,R3

0649 F1         PULSE5:   MOV     A,@R1
064A 3258                 JB1     SHRTP               ;Short pulses if set

064C BA0E       LONGP:    MOV     R2,#14D
064E D462                 CALL    RLYCOM              ;14 * 2.5ms  = 35ms
0650 BA78                 MOV     R2,#120D
0652 F460                 CALL    WAIT                ;120 * 2.5ms = 300ms
0654 EB4C                 DJNZ    R3,LONGP
0656 C423                 JMP     EXRO
```

```
0658 BA0C   SHRTP:   MOV     R2,#12D             ;12 * 2.5ms  = 30ms
065A D462            CALL    RLYCOM              ;20 * 2.5ms = 50ms
065C F45E            CALL    WAIT20
065E EB58            DJNZ    R3,SHRTP
0660 C423            JMP     EXRO


0662 9AFE   RLYCOM:  ANL     P2,#I2RELY NOT
0664 F460            CALL    WAIT                ;Wait R2 * 2.5ms
0666 8A01            ORL     P2,#I2RELY
0668 83              RET

            $Eject


            ;;;;;;;;;;;;;;;;;;;;;;;;;;;;;;;;;;;;;;;;;;;;;;;;;;;;;;;
            ;                                                     ;
            ;  TAKBIL,    Take the bill. Just dump it if no       ;
            ;             stacker. Run the stacker if present.    ;
            ;             Return Acc=0 if all ok, <>0 if jam.     ;
            ;                                                     ;
            ;  INPUT:        None                                 ;
            ;  OUTPUT:       Acc=0 if ok, Acc<>0 if jam.          ;
            ;  MODIFIED:     Acc., R0, R1, R2, R3, R4, R5         ;
            ;                                                     ;
            ;;;;;;;;;;;;;;;;;;;;;;;;;;;;;;;;;;;;;;;;;;;;;;;;;;;;;;;


0669 9AF7   TAKBIL:  ANL     P2,#MTRON NOT       ;Run Motor Forward

066B B815            MOV     R0,#OPDBNC          ;Load OPDBNC and OPTMR
066D B005            MOV     @R0,#05D            ;for reflective cheat
066F 18              INC     R0                  ;test.
0670 B000            MOV     @R0,#00D


0672 BDA0   NOSTKR:  MOV     R5,#160D            ;Max. time til JAM  1sec.
0674 BC04   NOSTK1:  MOV     R4,#004D            ;Run time after sw .002sec.
0676 ED7D   NOSTK2:  DJNZ    R5,NOSTK3           ;Cont. if not max time

0678 14F2   EREXTB:  CALL    BRAKE               ;Go stop the motor
067A 2301            MOV     A,#01
067C 83              RET                         ;Return with error

067D F46B   NOSTK3:  CALL    TSTREF              ;Test reflective for cheat
067F 9678            JNZ     EREXTB              ;Reject if > 0 reflective
                                                 ;pulses while waiting.
0681 BA02            MOV     R2,#02
0683 F460            CALL    WAIT                ;2 * 2.5ms = 5ms
0685 F481            CALL    GETP1               ;Read P1 (400us)
0687 F674            JC      NOSTK1              ;Loop if bad read
0689 37              CPL     A
068A 9274            JB4     NOSTK1              ;Loop if JAM sw 'on'
068C EC7D            DJNZ    R4,NOSTK3           ;Loop til min time

068E 14F2   EXTB:    CALL    BRAKE               ;Go stop the motor

0690 27              CLR     A                   ;Indicates good things
0691 83              RET




0692 B87E   STACKR:  MOV     R0,#OPTNSW          ;Get the option switch
0694 F0              MOV     A,@R0               ;to determine if the
0695 37              CPL     A
0696 F2D2            JB7     EXSTKR              ;Stacker is not present

0698 9AF7   LIMIT:   ANL     P2,#MTRON NOT       ;Run thr motor

069A BD5A            MOV     R5,#090D            ;Max. time to LIMIT .5sec.
069C EDA0   LIMIT1:  DJNZ    R5,LIMIT2           ;Cont. if not max time
069E C478            JMP     EREXTB

06A0 BA02   LIMIT2:  MOV     R2,#02D
06A2 F460            CALL    WAIT                ;02 * 2.5ms = 05ms
06A4 F496            CALL    GETP2               ;Read P2 (400us)
06A6 F69C            JC      LIMIT1              ;Loop if bad read
06A8 D29C            JB6     LIMIT1              ;Jump if LIMIT sw 'off'

06AA 14F2   LIMIT3:  CALL    BRAKE               ;Go stop the motor


06AC BF02   PUSH:    MOV     R7,#02              ;Two cycles on push

06AE 997F            ANL     P1,#PSHMTR NOT      ;Start the push motor

06B0 BD19   PUSH1:   MOV     R5,#025D            ;Max. time .5 sec
            PUSH2:                               ;till off home
06B2 F45E            CALL    WAIT20              ;08 * 2.5ms = 20ms
06B4 F496            CALL    GETP2               ;Read P2 (400us)
06B6 F6B2            JC      PUSH2               ;Loop if bad read
06B8 37              CPL     A
```

```
06B9 F2BF                  JB7     PUSH3             ;Jump if Off Home
06BB EDB2                  DJNZ    R5,PUSH2          ;Cont. if not max time
06BD C478                  JMP     EREXTB


06BF BD96        PUSH3:    MOV     R5,#150D          ;Max. time 3 sec.
                 PUSH4:                              ;till rehome
06C1 F45E                  CALL    WAIT20            ;08 * 2.5ms = 20ms
06C3 F496                  CALL    GETP2             ;Read P2 (400us)
06C5 F6B0                  JC      PUSH1             ;Loop if bad read
06C7 F2CD                  JB7     PUSH5             ;Jump if Home
06C9 EDC1                  DJNZ    R5,PUSH4          ;Cont. if not max time
06CB C478                  JMP     EREXTB


06CD EFB0        PUSH5:    DJNZ    R7,PUSH1          ;Go run a second cycle
06CF 8980                  ORL     P1,#PSHMTR        ;Push motor off
06D1 27                    CLR     A
06D2 83          EXSTKR:   RET


                 $Eject

                 ;;;;;;;;;;;;;;;;;;;;;;;;;;;;;;;;;;;;;;;;;;;;;;;;;;;;;;
                 ;                                                    ;
                 ; REJBIL,     Reject the bill. Atempt to expell a    ;
                 ;           bill.                                    ;
                 ;                                                    ;
                 ; INPUT:      None                                   ;
                 ; OUTPUT:     None                                   ;
                 ; MODIFIED:   Acc., R0, R2, R4, R5                   ;
                 ;                                                    ;
                 ;;;;;;;;;;;;;;;;;;;;;;;;;;;;;;;;;;;;;;;;;;;;;;;;;;;;;;



06D3 9AE7        REJBIL:   ANL     P2,#(MTRON OR MTRDIR) NOT ;Reverse motor

06D5 BDC8                  MOV     R5,#200D          ;Max. run time    10sec.
06D7 BC01                  MOV     R4,#001D          ;Run time after sw .05sec.
06D9 EDEA        RJBIL1:   DJNZ    R5,RJBIL3         ;Cont. if not max time

06DB 8A18        RJBIL2:   ORL     P2,#(MTRON OR MTRDIR)   ;Stop motor

06DD B87F        SNDFLR:   MOV     R0,#INTSTA        ;If Smart Interface send
06DF F0                    MOV     A,@R0             ;failure message
06E0 37                    CPL     A
06E1 F2E9                  JB7     EXRJBL            ;Exit if not smart

06E3 B817                  MOV     R0,#DATMES
06E5 B08C                  MOV     @R0,#FAILUR
06E7 F4AB                  CALL    SNDMES            ;Send failure message
06E9 83          EXRJBL:   RET


06EA F45E        RJBIL3:   CALL    WAIT20            ;20 * 2.5ms = 50ms
06EC F481                  CALL    GETP1             ;Read P1 (400us)
06EE F6D9                  JC      RJBIL1            ;Loop if bad read
06F0 37                    CPL     A
06F1 92D9                  JB4     RJBIL1            ;Loop if JAM sw 'on'
06F3 D2D9                  JB6     RJBIL1            ;Loop while TRASEN 'on'
06F5 ECEA                  DJNZ    R4,RJBIL3         ;Loop til min time

06F7 8A18                  ORL     P2,#(MTRON OR MTRDIR)   ;Motor off
06F9 83                    RET


                 $Eject
0700                       ORG     700H

                 ;;;;;;;;;;;;;;;;;;;;;;;;;;;;;;;;;;;;;;;;;;;;;;;;;;;;;;
                 ;                                                    ;
                 ; MULT16,  Multiply two 16 bit values.               ;
                 ;                                                    ;
                 ;                                                    ;
                 ; INPUT:    Multiplier in R2 (low) & R3 (high)       ;
                 ;           Multiplicand in R6 (low) & R7 (high)     ;
                 ; OUTPUT:   Answer in R2 (low) thru R5 (high)        ;
                 ; MODIFIED: RA, R0,      R2, R3, R4, R5, R6, R7      ;
                 ;                                                    ;
                 ;;;;;;;;;;;;;;;;;;;;;;;;;;;;;;;;;;;;;;;;;;;;;;;;;;;;;;

0700 B810        MULT16:   MOV     R0,#16D           ;Loop counter
0702 BC00                  MOV     R4,#00H           ;Clear the Answer bytes
0704 BD00                  MOV     R5,#00H

0706 97                    CLR     C
0707 F451        MLTLOP:   CALL    ROTRGT            ;4 byte rotate right
0709 E60D                  JNC     MULTB
070B F43A        MULTA:    CALL    ADDTWO   ;Add Multiplicand to answer
070D E807        MULTB:    DJNZ    R0,MLTLOP
070F 97                    CLR     C
0710 F451                  CALL    ROTRGT   ;One last rotate right
0712 83                    RET
```

```
           ;;;;;;;;;;;;;;;;;;;;;;;;;;;;;;;;;;;;;;;;;;;;;;;;;;;;;;;
           ;                                                     ;
           ;  DIV24 , 24 bit by 16 bit divide                    ;
           ;  DIV16 , 16 bit by 16 bit divide                    ;
           ;                                                     ;
           ;  For DIV24                                          ;
           ;  INPUT:  Dividend in R1 (low), R2 (mid) & R3 (high) ;
           ;          Divisor  in R6 (low) & R7 (high)           ;
           ;  OUTPUT: Quotient in R1, R2, R3                     ;
           ;          Remainder in R4, R5                        ;
           ;  For DIV16                                          ;
           ;  INPUT:  Dividend in R2 (low) & R3 (high)           ;
           ;          Divisor  in R6 (low) & R7 (high)           ;
           ;  OUTPUT: Fractional quotient in R1                  ;
           ;          Whole # quotient in R2, R3                 ;
           ;          Remainder in R4, R5                        ;
           ;  MODIFIED: RA, R0, R1, R2, R3, R4, R5, R6, R7       ;
           ;                                                     ;
           ;;;;;;;;;;;;;;;;;;;;;;;;;;;;;;;;;;;;;;;;;;;;;;;;;;;;;;;

           ; Byte sense is least to most in asending addresses.
           ; Average time through with a 6Mhz crystal is ???us.

0713 B900  DIV16:   MOV    R1,#00H            ;Divedend LSB
0715 B818  DIV24:   MOV    R0,#24D            ;Loop counter
0717 BC00           MOV    R4,#00H            ;Remainder LSB
0719 BD00           MOV    R5,#00H            ;Remainder MSB


071B 97    DIVLOP:  CLR    C
071C F441           CALL   ROTLFT   ;Five byte rotate left
071E F629           JC     DIV16B
0720 F42F  DIV16A:  CALL   SUBTWO
0722 E62B           JNC    DIV16C
0724 F43A           CALL   ADDTWO   ;Restore dividend if borrow
0726 E81B           DJNZ   R0,DIVLOP
0728 83             RET

0729 F42F  DIV16B:  CALL   SUBTWO
072B 19    DIV16C:  INC    R1
072C E81B           DJNZ   R0,DIVLOP
072E 83             RET

           $Eject
072F FC    SUBTWO:  MOV    A,R4               ;Sub. R6,R7 from R4,R5
0730 37             CPL    A
0731 6E             ADD    A,R6
0732 37             CPL    A
0733 AC             MOV    R4,A
0734 FD             MOV    A,R5
0735 37             CPL    A
0736 7F             ADDC   A,R7
0737 37             CPL    A
0738 AD             MOV    R5,A
0739 83             RET

073A FC    ADDTWO:  MOV    A,R4               ;Add R6,R7 to R4,R5
073B 6E             ADD    A,R6
073C AC             MOV    R4,A
073D FD             MOV    A,R5
073E 7F             ADDC   A,R7
073F AD             MOV    R5,A
0740 83             RET

0741 F9    ROTLFT:  MOV    A,R1               ;Five byte rotate left
0742 F7             RLC    A                  ;on R1 thru R5
0743 A9             MOV    R1,A
0744 FA             MOV    A,R2
0745 F7             RLC    A
0746 AA             MOV    R2,A
0747 FB             MOV    A,R3
0748 F7             RLC    A
0749 AB             MOV    R3,A
074A FC             MOV    A,R4
074B F7             RLC    A
074C AC             MOV    R4,A
074D FD             MOV    A,R5
074E F7             RLC    A
074F AD             MOV    R5,A
0750 83             RET

0751 FD    ROTRGT:  MOV    A,R5               ;4 byte rotate right
0752 67             RRC    A                  ;on R5 thru R2
0753 AD             MOV    R5,A
0754 FC             MOV    A,R4
0755 67             RRC    A
0756 AC             MOV    R4,A
0757 FB             MOV    A,R3
0758 67             RRC    A
0759 AB             MOV    R3,A
075A FA             MOV    A,R2
075B 67             RRC    A
075C AA             MOV    R2,A
075D 83             RET
```

```
075E BA08    WAIT20: MOV     R2,#08D            ;08 times 2.5ms=20ms
0760 23C8    WAIT:   MOV     A,#200D            ;Kill 2.5ms R2 times
0762 07      WAIT1:  DEC     A
0763 00              NOP
0764 00              NOP
0765 9662            JNZ     WAIT1
0767 08              INS     A,BUS              ;Create deadman pulse
0768 EA60            DJNZ    R2,WAIT
076A 83              RET

             $Eject

             ;;;;;;;;;;;;;;;;;;;;;;;;;;;;;;;;;;;;;;;;;;;;;;;;;;;;;;;;;;
             ;                                                        ;
             ; TSTREF,     Test the reflective sensor. Read and       ;
             ;            debounce (4 times through) the reflect-     ;
             ;            ive sensor. Count # of times low and        ;
             ;            return value in Acc.                        ;
             ;                                                        ;
             ; INPUT:      OPDBNC & OPTMR set before first entry      ;
             ; OUTPUT:     Acc. =  OPTMR                              ;
             ; MODIFIED:   Acc., R0                                   ;
             ;                                                        ;
             ;;;;;;;;;;;;;;;;;;;;;;;;;;;;;;;;;;;;;;;;;;;;;;;;;;;;;;;;;;


076B B815    TSTREF: MOV     R0,#OPDBNC
076D 14DF            CALL    RDREF              ;Test the reflective
076F C673            JZ      DECOPD
0771 B005            MOV     @R0,#05
0773 F0      DECOPD: MOV     A,@R0
0774 C67D            JZ      EXTRF
0776 07              DEC     A
0777 A0              MOV     @R0,A
0778 967D            JNZ     EXTRF
077A B816    CNTOPP: MOV     R0,#OPTMR          ;Used here to count pulses
077C 10              INC     @R0
077D B816    EXTRF:  MOV     R0,#OPTMR
077F F0              MOV     A,@R0
0780 83              RET                        ;Carry indicates cheat

             $Eject
             ;;;;;;;;;;;;;;;;;;;;;;;;;;;;;;;;;;;;;;;;;;;;;;;;;;;;;;;;;;
             ;                                                        ;
             ; GETP1 ,     Read port 1.  Return the value of P1       ;
             ;           in Acc. after 10 identical reads. Return     ;
             ;           after 20 reads if no 10 identical with       ;
             ;           the carry bit set.                           ;
             ;                                                        ;
             ; INPUT:      None                                       ;
             ; OUTPUT:     Acc.=P1 value, Carry set on error.         ;
             ; MODIFIED: Acc., R1, R2, R3, Carry                      ;
             ;                                                        ;
             ;;;;;;;;;;;;;;;;;;;;;;;;;;;;;;;;;;;;;;;;;;;;;;;;;;;;;;;;;;

             ;  Execution speed for a good read ie. 1st 10, 402us
             ;                        bad  read ie. all 20, 718us


0781 97      GETP1:  CLR     C                  ;Clear if all ok
0782 BB14            MOV     R3,#20D            ;Max # of tries counter
0784 BA0A    GETP1A: MOV     R2,#10D            ;# of identical reads
0786 EB8A    GETP1B: DJNZ    R3,GETP1C          ;Keep triing if not zero
0788 A7              CPL     C
0789 83              RET                        ;Return with carry set

078A 897F    GETP1C: ORL     P1,#7FH            ;ALL INPUTS in INPUT MODE
078C 08              INS     A,BUS              ;Create deadman pulse
078D 09              IN      A,P1
078E 29              XCH     A,R1               ;Save in R1
078F D9              XRL     A,R1               ;Compare last two reads
0790 9684            JNZ     GETP1A             ;Reload R2 if not equal
0792 EA86            DJNZ    R2,GETP1B
0794 F9              MOV     A,R1               ;Return P1 in Acc.
0795 83              RET



             ;;;;;;;;;;;;;;;;;;;;;;;;;;;;;;;;;;;;;;;;;;;;;;;;;;;;;;;;;;
             ;                                                        ;
             ; GETP2 ,     Read port 2.  Return the value of P2       ;
             ;           in Acc. after 10 identical reads. Return     ;
             ;           after 20 reads if no 10 identical with       ;
             ;           the carry bit set.                           ;
             ;                                                        ;
             ; INPUT:      None                                       ;
             ; OUTPUT:     Acc.=P2 value, Carry set on error.         ;
             ; MODIFIED: Acc., R1, R2, R3, Carry                      ;
             ;                                                        ;
             ;;;;;;;;;;;;;;;;;;;;;;;;;;;;;;;;;;;;;;;;;;;;;;;;;;;;;;;;;;

             ;  Execution speed for a good read ie. 1st 10, 402us
             ;                        bad  read ie. all 20, 718us
```

```
0796 97        GETP2:   CLR    C              ;Clear if all ok
0797 BB14               MOV    R3,#20D        ;Max # of tries counter
0799 BA0A      GETP2A:  MOV    R2,#10D        ;# of identical reads
079B EB9F      GETP2B:  DJNZ   R3,GETP2C      ;Keep triing if not zero
079D A7                 CPL    C
079E 83                 RET                   ;Return with carry set

079F 8AC0      GETP2C:  ORL    P2,#0C0H       ;ALL INPUTS in INPUT MODE
07A1 08                 INS    A,BUS          ;Create deadman pulse
07A2 0A                 IN     A,P2
07A3 29                 XCH    A,R1           ;Save in R1
07A4 D9                 XRL    A,R1           ;Compare last two reads
07A5 9699               JNZ    GETP2A         ;Reload R2 if not equal
07A7 EA9B               DJNZ   R2,GETP2B
07A9 F9                 MOV    A,R1           ;Return P2 in Acc.
07AA 83                 RET

               $Eject



               ; Send the bill message.

07AB 99FD      SNDMES:  ANL    P1,#I1INTR NOT ;Drop the interupt request

07AD BC0A      SNDM1:   MOV    R4,#10D        ;Debounce count
07AF 8904      SNDM1A:  ORL    P1,#I1SEND     ;Insure P1-2 is input
07B1 08                 INS    A,BUS          ;Create deadman pulse
07B2 09                 IN     A,P1
07B3 52AD               JB2    SNDM1          ;Wait for "send" forever
07B5 ECAF               DJNZ   R4,SNDM1A

07B7 B817      SENDIT:  MOV    R0,#DATMES
07B9 F4D9               CALL   SNDDAT

07BB BC25      SNDM2:   MOV    R4,#37D        ;Looking for send to
07BD 8904      SNDM2A:  ORL    P1,#I1SEND     ;go high for at least
07BF 09                 IN     A,P1           ;1ms
07C0 37                 CPL    A
07C1 52BB               JB2    SNDM2          ;Loop while send is low
07C3 08                 INS    A,BUS          ;Create deadman pulse
07C4 ECBD               DJNZ   R4,SNDM2A      ;Count while send is high


07C6 BC8C      SNDM3:   MOV    R4,#140D       ;Looking for send to
07C8 BB0A      SNDM3A:  MOV    R3,#10D
07CA 8904      SNDM3B:  ORL    P1,#I1SEND     ;go low within 3.5ms
07CC 08                 INS    A,BUS          ;Create deadmsn pulse
07CD 09                 IN     A,P1
07CE 52D4               JB2    SNDM3C
07D0 EBCA               DJNZ   R3,SNDM3B      ;And stay for 10 counts
07D2 E4B7               JMP    SENDIT

07D4 ECC8      SNDM3C:  DJNZ   R4,SNDM3A
07D6 8A02               ORL    P2,#I1INTR     ;Raise interupt
07D8 83                 RET


               ; Send data out the Data Out pin

07D9 F0        SNDDAT:  MOV    A,@R0
07DA BC0A               MOV    R4,#0AH
07DC 97                 CLR    C
07DD A7                 CPL    C              ;Carry = stop bit
07DE E4E3               JMP    SNDZRO         ;Send the start bit

07E0 67        SNDDLP:  RRC    A
07E1 F6E7               JC     SNDONE
07E3 99FE      SNDZRO:  ANL    P1,#I1DATA NOT
07E5 E4E9               JMP    B600
07E7 8901      SNDONE:  ORL    P1,#I1DATA
07E9 B9DB      B600:    MOV    R1,#219D       ;219*7.5us=1642.5
07EB 00        B600A:   NOP                   ;SNLDLP    + 20.0
07EC E9EB               DJNZ   R1,B600A       ;          -------
                                              ;           1662.5
                                              ;         +    5.0
                                              ;          ------
                                              ;           1667.5us

07EE ECE0               DJNZ   R4,SNDDLP

07F0 08                 INS    A,BUS
07F1 83                 RET


               $Eject
0000                    END    RESET
```

```
USER SYMBOLS
ACCDNM 007D   ADDTWO 073A   ADJG1  0023   ADJG2  0026   ADJG5  0029   ADJGS  0020   B600   07E9   B600A  07EB
BAUD   05ED   BAUD1  05EF   BCNT1  002D   BCNT2  007A   BEX1A  0249   BEX1B  024D   BEX1C  024F   BEX2A  025B
BEX2B  0262   BEX3A  0273   BEX3B  027A   BEX4A  0282   BEX4B  028A   BEX4C  0291   BEX5A  029F   BEX5B  02A9
BEX5C  02AE   BEXEC  0221   BEXEC1 0233   BEXEC2 0253   BEXEC3 0268   BEXEC4 027E   BEXEC5 029B   BEXECA 0229
BEXECB 022F   BEXECC 0231   BGNTST 0089   BICLR  0204   BILREC 02EB   BILREJ 0450   BILRET 0454   BINIT  0200
BINIT1 020B   BINIT2 0216   BINIT3 021C   BMPTMR 000B   BR1    02BE   BR10   03D4   BR10B  03DA   BR10D  03E0
BR10E  03E7   BR10F  03EE   BR10F1 0400   BR10F2 040D   BR10G  0414   BR10H  041B   BR11   042D   BR11B  0433
BR11D  0439   BR11E  0440   BR11F  044A   BR2    02D2   BR3    02E6   BR3A   0300   BR3A1  0304   BR3B   0309
BR3C   030F   BR3D   0315   BR3E   031B   BR3F   0321   BR3G   0325   BR4    0341   BR5    034B   BR6    0369
BR6A   0371   BR6B   037A   BR6C   037E   BR7    0387   BR9    03B2   BR9B   03BC   BR9C   03C2   BR9D   03CE
BRAKE  00F2   BRDT1  003C   BRDTST 0038   CDTCOM 061F   CDTFIV 061D   CDTLNS 060A   CDTONE 0615   CDTTWO 0619
CLRLOP 0194   CNTOPP 077A   COMPAG 057E   DATMES 0017   DEBUG  0040   DECOPD 0773   DECR4  051D   DIV16  0713
```

```
DIV16A 0720  DIV16B 0729  DIV16C 072B  DIV24  0715  DIVLOP 071B  DNMHI  30D4  DNMLOW 5528  DNMWOM 43F8
DNMTST 004A  DNMWTH 002E  DPRCNT 0032  DPSPCE 0012  DUMB   04AB  DUMB1  04AF  DUMB2  04B3  DUMB3  04B5
DUMB3A 04BE  DUMB3B 04C0  DUMB3C 04C1  DUMB3D 04C7  DUMB3E 04CF  DUMB3F 04D8  DUMB3G 04D9  DUMB4  04E0
DUMB5  04E4  EINTR  0003  ENDTST 0029  EREXTB 067B  EXBEX2 0268  EXBR1  045C  EXDBUG 05DB  EXEINT 0081
EXHLI  0537  EXINT1 04F8  EXINT2 04FA  EXLDD  0153  EXLLI  0542  EXRDRF 00E7  EXRJBL 06E9  EXRO   0623
EXSERI 052F  EXSTKR 0602  EXT1   05BC  EXT2   05C6  EXT5   05D0  EXTB   068E  EXTRF  077D  EXTSTS 0575
FAILED 04F4  FAILUR 008C  FIVDLR 0083  FWDBIL 0034  GETBIL 048E  GETP1  0781  GETP1A 0784  GETP1B 0786
GETP1C 078A  GETP2  0796  GETP2A 0799  GETP2B 079B  GETP2C 079F  GETTIM 0239  GRDLST 05BD  HIT1   0025
HIT2   002B  HIT5   002B  HITS   0022  HLII1  0535  HLIINT 0530  HPCNT1 00FE  HPCNT2 00A1  HPCNT5 00B0
HWDW1  0010  HWDW2  0006  HWDW5  0010  HWDWS  0008  I1DATA 0001  I1ENA  0008  I1INTR 0002  I1SEND 0004
I2CRD1 0001  I2CRD2 0002  I2CRD5 0004  I2ENA1 0001  I2ENA2 0002  I2ENA5 0004  I2ESCR 0008  I2RELY 0001
I3ENA  0002  I3INH  0001  IDLE   01BB  IDLE1  01C2  IDLE2  01DF  IDLE3  01E8  INIT   018A  INIT1  0192
INIT2  019B  INIT3  019A  INIT4  01A0  INIT4A 01A4  INIT5  01A8  INIT6  01B0  INTRFC 0460  INTRST 0020
INTSTA 007F  INTT1  050E  INTT2  0510  INTT3  0512  INTT4  0521  INTTST 0500  JAMSEN 0010  JMAGPB 0069
JMPBR1 03FE  JMPREJ 0295  JSTERR 015A  LDBRD  012A  LDDNM  0135  LDDNM1 013C  LDDNM2 014A  LDPRT  015C
LDPRT2 0165  LDPRT3 016C  LDPRT4 017A  LDPRT5 0181  LDSTOP 012D  LDSTRT 007D  LDTIME 05AA  LIMIT  0698
LIMIT1 069C  LIMIT2 06A0  LIMIT3 06AA  LLII1  0544  LLIINT 0538  LONGP  064C  LOOS   01F2  LPCNT1 0060
LPCNT2 003A  LPCNT5 0059  LWDW1  0008  LWDW2  0010  LWDW5  0006  LWDWS  0010  MAGP   0014  MAGP1  001A
MAGP2  001E  MAGPA  0089  MAGPA1 0090  MAGPA3 0099  MAGPA4 00A1  MAGPB  0100  MAGPB1 0116  MAGPB2 0126
MAGPB3 0133  MAGPB4 0155  MLTLOP 0707  MORON  04E9  MPA3A  009B  MPA4A  00AB  MPA4B  00BC  MPA4B1 00C8
MPA4C  00CF  MPA4C1 00D6  MSPCES 0020  MSTART 0021  MSTOP  0024  MTRDIR 0010  MTRDN  0008  MULT16 0700
MULTA  070B  MULTB  070D  NOSTK1 0674  NOSTK2 0676  NOSTK3 067D  NOSTKR 0672  ONEDLR 0081  ODS    01CD
OPDBNC 0015  OPTMR  0016  OPTNSW 007E  OUTSRV 0020  P3A    0646  PRTCNT 0035  PRTHI  5460  PRTLOW 7EF4
PRTNOM 6590  PRTRT  0036  PRTT1  0062  PRTT3  006B  PRTTST 005D  PRTWTH 0033  PSHLOP 0172  PSHMTR 0080
PULSE1 0637  PULSE2 0640  PULSE3 0645  PULSE4 0648  PULSE5 0649  PULSES 0631  PUSH   06AC  PUSH1  06B0
PUSH2  06B2  PUSH3  06BF  PUSH4  06C1  PUSH5  06CD  PUSHIT 01AA  RCDT1  04F6  RDOPSW 0502  RDOS1  0504
RDOS2  0506  RDREF  00DF  RDREF1 00E2  RECSTA 007B  REJBIL 06D3  REJJMP 03FC  RELAY  0626  RESET  0000
RETRN  008A  RJBIL1 06D9  RJBIL2 06DB  RJBIL3 06EA  RLOPD  0259  RLYCDT 04F0  RLYCOM 0662  RLYOUT 0600
ROTLFT 0741  ROTRGT 0751  RTNBIL 04A5  RVSBIL 002E  SAVDPS 0077  SCRTCH 0020  SEED1  00A0  SEED2  00C8
SEED5  00DC  SEEDS  008C  SENDIT 07B7  SEPFIV 000C  SEPONE 000B  SEPTWO 000A  SERI1  052D  SERINT 052A
SETERD 00DA  SETDNM 00C3  SETERR 00B6  SETFWD 00C1  SETPRT 00CA  SHRTP  0658  SLUG   00BB  SMART  046F
SMART1 0484  SMART2 049A  SMRT1A 0486  SMRT1B 04BC  SMRT2A 049C  SMRT2B 04A3  SNDO   05E5  SND1   05E9
SNDBYT 05DC  SNDDAT 07D9  SNDDB1 05D5  SNDDBG 05D1  SNDDLP 07E0  SNDFLR 06DD  SNDM1  07AD  SNDM1A 07AF
SNDM2  07BB  SNDM2A 07BD  SNDM3  07C6  SNDM3A 07CB  SNDM3B 07CA  SNDM3C 07D4  SNDMES 07AB  SNDONE 07E7
SNDVAL 0482  SNDVND 0492  SNDZRO 07E3  SNGLE  062B  SPCWTH 0030  SPEED  0013  STACKR 0692  STKCAM 0080
STKFUL 0020  STKLIM 0040  SUBSTP 0591  SUBTIM 0593  SUBTWO 072F  TAKBIL 0669  TRASEN 0040  TRATMR 007C
TSTENA 00E9  TSTFIV 05C7  TSTONE 05B3  TSTREF 076B  TSTS1  054B  TSTS2  0556  TSTS2A 0562  TSTS3  056A
TSTS3A 056F  TSTS4  0574  TSTSMP 0548  TSTTWO 05BD  TWODLR 0082  VEND   0089  WAIT   0760  WAIT1  0762
WAIT20 075E  WNDW1  0578  WNDW2  057A  WNDW5  057C  WNDWS  0576  XMTALP 05E2  ZROTST 05A4

ASSEMBLY COMPLETE,   NO ERRORS

ISIS-II ASSEMBLER SYMBOL CROSS REFERENCE, V2.0

ACCDNM  146#   568    877    886   1051   1269   1298   1323   1365   1384   1462   1492   1548   1680   2016   2035
ADDTWO 2258   2298   2320#
ADJG1   166#  1214   1234
ADJG2   168#  1218   1238
ADJG5   170#  1222   1242
ADJGS   164#  1204   1210   1230
B600   2524   2526#
B600A  2527#  2528
BAUD   1979   1983#
BAUD1  1984#  1984
BCNT1   128#   372    651   1406   1479
BCNT2   140#   688   1082
BEX1A   963    966#
BEX1B   969#
BEX1C   968    971#
BEX2A   985    988#
BEX2B   994#
BEX3A  1011   1015#
BEX3B  1021#
BEX4A  1036#
BEX4B  1036   1037   1043#
BEX4C  1048#
BEX5A  1063#
BEX5B  1064   1071#
BEX5C  1062   1077#
BEXEC   919#   923   1080   1085
BEXEC1  944#
BEXEC2  983#
BEXEC3 1007#
BEXEC4 1013   1016   1019   1034#
BEXEC5 1050   1061#
BEXECA  920    925#
BEXECB  928    930#
BEXECC  922    932#
BGNTST  340    433#
BICLR   879#   881
BILREC 1074   1116#
BILREJ  800   1053   1425   1437   1446   1452   1457   1460   1473   1477   1482   1487   1506#  1531   1556   1609
       1639   1683   1687
BILRET 1509#  1589   1664
BINIT   863    877#
BINIT1  886#
BINIT2  896#
BINIT3  901#
BMPTMR  316    319#
BR1    1126#
BR10   1370   1374   1392#
BR10B  1396#
BR10D  1400#
BR10E  1406#
BR10F  1411#
BR10F1 1422   1430#
BR10F2 1443#
BR10G  1441   1449#
BR10H  1454#
BR11   1426   1471#
BR11B  1475#
BR11D  1479#
BR11E  1484#
BR11F  1492#
BR2    1151#
BR3    1182#
BR3A   1199   1204#
BR3A1  1206#  1208
BR3B   1210#
BR3C   1214#
BR3D   1218#
BR3E   1222#
BR3F   1227#
BR3G   1230#  1248
BR4    1256#
BR5    1269#
BR6    1298#
BR6A   1303#  1308
BR6B   1310#
BR6C   1312#  1317
BR7    1323#
BR9    1365#
BR9B   1372#
BR9C   1376#
BR9D   1384#
BRAKE   587#  1118   2116   2131   2156
BRDT1   366    368#
BRDTST  361    366#
CDTCOM 2024   2026   2028#
CDTFIV 2020   2027#
CDTLNS 2016#
CDTONE 2018   2023#
CDTTWO 2019   2025#
CLRLOP  771#   772
CNTOPP 2395#
COMPAG 1212   1216   1220   1224   1866#
DATMES  122#  1506   1546   1572   1587   2218   2487
DEBUG    76#  1978   1982
DECOPD 2388   2390#
```

| | |
|---|---|
| DECR4 | 1737 1740 1746# 2287# |
| DIV16 | 1136 1165 1192 |
| DIV16A | 2296# |
| DIV16B | 2295 2302# |
| DIV16C | 2297 2303# |
| DIV24 | 2288# |
| DIVLOP | 2293# 2299 2304 |
| DNMHI | 239# 1347 1350 |
| DNMLOW | 240# 1355 1358 |
| DNMNOM | 238# |
| DNMTST | 359 364 379# |
| DNMWTH | 130# 383 660 1151 1333 1418 |
| DPRCNT | 133# 1167 1376 1454 1484 |
| DPSPCE | 115# 413 1443 |
| DUMB | 1529 1607# |
| DUMB1 | 1613# |
| DUMB2 | 1620# |
| DUMB3 | 1623# |
| DUMB3A | 1630# |
| DUMB3B | 1632# 1656 |
| DUMB3C | 1633# 1633 |
| DUMB3D | 1638# 1657 1661 |
| DUMB3E | 1645# |
| DUMB3F | 1650 1652# |
| DUMB3G | 1646 1654# |
| DUMB4 | 1655 1660# |
| DUMB5 | 1663# |
| EINTR | 311# |
| ENDTST | 337 355# |
| EREXTB | 2116# 2121 2148 2171 2181 |
| EXBEX2 | 989 992 998# |
| EXBR1 | 1512 1515# |
| EXDBUG | 1965# |
| EXEINT | 422# 656 |
| EXHLI | 1763 1765 1768# |
| EXINT1 | 1575 1691# |
| EXINT2 | 1516 1692# |
| EXLDD | 675 685# |
| EXLLI | 1776# |
| EXRDRF | 543 547# |
| EXRJBL | 2216 2221# |
| EXRO | 2021 2031# 2042 2054 2073 2080 |
| EXSERI | 1761# |
| EXSTKR | 2142 2187# |
| EXT1 | 1934 1936# |
| EXT2 | 1943 1945# |
| EXT5 | 1952 1954# |
| EXTB | 2131# |
| EXTRF | 2391 2394 2397# |
| EXTSTS | 1832 1842 1848 1851# |
| FAILED | 1570 1687# |
| FAILUR | 287# 2219 |
| FIVDLR | 282# 1554 |
| FWDBIL | 357 363# |
| GETBIL | 1569# |
| GETP1 | 795 830 843 858 1034 1061 1564 1580 1736 2125 2225 2419# |
| GETP1A | 2421# 2431 |
| GETP1B | 2422# 2432 |
| GETP1C | 2422 2426# |
| GETP2 | 782 837 2152 2166 2177 2455# |
| GETP2A | 2457# 2467 |
| GETP2B | 2458# 2468 |
| GETP2C | 2458 2462# |
| GETTIM | 949# |
| GRDLST | 1867 1880# |
| HIT1 | 167# 1392 1471 1930 |
| HIT2 | 169# 1368 1475 1939 |
| HIT5 | 171# 1372 1396 1449 1948 |
| HITS | 165# 1401 |
| HLII1 | 1766# |
| HLIINT | 1758 1763# |
| HPCNT1 | 272# 1381 |
| HPCNT2 | 274# 1459 |
| HPCNT5 | 276# 1489 |
| HWDW1 | 256# 1856 |
| HWDW2 | 258# 1858 |
| HWDW5 | 260# 1860 |
| HWDWS | 254# 1854 |
| I1DATA | 53# 2523 2525 |
| I1ENA | 64# |
| I1INTR | 57# 2478 2509 |
| I1SEND | 61# 2481 2491 2501 |
| I2CRD1 | 81# 2023 2031 |
| I2CRD2 | 84# 2025 2031 |
| I2CRD5 | 86# 2027 2031 |
| I2ENA1 | 54# |
| I2ENA2 | 58# |
| I2ENA5 | 62# |
| I2ESCR | 65# |
| I2RELY | 82# 2083 2085 |
| I3ENA | 59# |
| I3INH | 55# |
| IDLE | 790 799 823# 1693 |
| IDLE1 | 830# 831 |
| IDLE2 | 851# 855 859 860 |
| IDLE3 | 858# 861 |
| INIT | 293 763# |
| INIT1 | 770# |
| INIT2 | 774# |
| INIT3 | 775# 777 |
| INIT4 | 782# 783 |
| INIT4A | 785# |
| INIT5 | 785 788# |
| INIT6 | 788 795# 796 |
| INTRFC | 1386 1464 1494 1523# |
| INTRST | 92# 425 426 825 826 901 902 |
| INTSTA | 151# 567 1509 1526 1751 2007 2213 |
| INTT1 | 1725# |
| INTT2 | 1643 1735# |
| INTT3 | 1736# 1746 |
| INTT4 | 1751# |
| INTTST | 851 1715# |
| JAMSEN | 67# 798 833 846 |
| JMAGPB | 370 375 381 386 395 401# 406 444 |
| JMPBR1 | 1394 1398 1426# |
| JMPREJ | 1041 1046 1051# |
| JSTERR | 628 639 643 692# |
| LDBRD | 651# |
| LDDNM | 649 660# |
| LDDNM1 | 667# |
| LDDNM2 | 668 677# |
| LDPRT | 650 659 697# |
| LDPRT2 | 712# |
| LDPRT3 | 720# |
| LDPRT4 | 715 734# |
| LDPRT5 | 728 741# |
| LDSTOP | 489 635 654# 685 690 747 |
| LDSTRT | 367 377 391 412 419# |
| LDTIME | 420 655 1919# |
| LIMIT | 2144# |
| LIMIT1 | 2147# 2153 2154 |
| LIMIT2 | 2147 2150# |
| LIMIT3 | 2156# |
| LLII1 | 1773 1774 1775 1779# |
| LLIINT | 1755 1770# |
| LONGP | 2068# 2072 |
| LOOS | 841 847 865# |
| LPCNT1 | 271# 1378 |
| LPCNT2 | 273# 1456 |
| LPCNT5 | 275# 1486 |
| LWDW1 | 255# 1855 |
| LWDW2 | 257# 1857 |

| | | | | | | | | | | | | | | |
|---|---|---|---|---|---|---|---|---|---|---|---|---|---|---|
| LWDW5 | 259# | 1859 |
| LWDWS | 253# | 1853 |
| MAGP | 317 | 325 | 328# |
| MAGP1 | 329 | 331# |
| MAGP2 | 335# |
| MAGPA | 434# |
| MAGPA1 | 438# | 443 |
| MAGPA3 | 446# |
| MAGPA4 | 470# |
| MAGPB | 401 | 475 | 501 | 506 | 525 | 620# |
| MAGPB1 | 632 | 637# |
| MAGPB2 | 649# |
| MAGPB3 | 647 | 659# |
| MAGRB4 | 646 | 688# |
| MLTLOP | 2256# | 2259 |
| MORON | 1530 | 1680# |
| MPA3A | 447# | 451 |
| MPA4A | 472 | 479# |
| MPA4B | 482 | 494# |
| MPA4B1 | 495 | 503# |
| MPA4C | 484 | 509# |
| MPA4C1 | 514 | 519# |
| MSPCES | 157# | 331 | 414 | 479 | 972 | 1043 |
| MSTART | 159# | 335 | 419 | 435 | 637 |
| MSTOP | 160# | 434 | 654 | 1888 |
| MTRDIR | 89# | 587 | 590 | 828 | 2205 | 2211 | 2232 |
| MTRON | 88# | 590 | 828 | 896 | 2104 | 2144 | 2205 | 2211 | 2232 |
| MULT16 | 1340 | 1433 | 1872 | 2251# |
| MULTA | 2258# |
| MULTB | 2257 | 2259# |
| NOSTK1 | 2113# | 2126 | 2128 |
| NOSTK2 | 2114# |
| NOSTK3 | 2114 | 2120# | 2129 |
| NOSTKR | 2112# |
| ONEDLR | 280# | 1550 |
| OOS | 834 | 837# | 838 | 844 | 866 |
| OPDBNC | 119# | 624 | 983 | 1623 | 2106 | 2386 |
| OPTMR | 120# | 1008 | 2395 | 2397 |
| OPTNSW | 149# | 1715 | 1753 | 2008 | 2139 |
| OUTSRV | 72# | 865 |
| P3A | 2059 | 2061# |
| PRTCNT | 136# | 403 | 712 | 734 |
| PRTHI | 235# | 1275 | 1279 |
| PRTLOW | 236# | 1285 | 1289 |
| PRTNOM | 234# | 1133 | 1134 | 1189 | 1190 |
| PRTRT | 137# | 721 | 722 | 737 | 1228 | 1301 | 1310 |
| PRTT1 | 397# |
| PRTT3 | 400 | 403# |
| PRTTST | 360 | 363 | 393# |
| PRTWTH | 135# | 397 | 697 | 1066 | 1126 | 1182 | 1272 | 1282 |
| PSHLOP | 723# | 727 |
| PSHMTR | 78# | 2161 | 2185 |
| PULSE1 | 2050# |
| PULSE2 | 2053 | 2056# |
| PULSE3 | 2052 | 2060# |
| PULSE4 | 2051 | 2063# |
| PULSE5 | 2065# |
| PULSES | 2038 | 2044# |
| PUSH | 789 | 2159# |
| PUSH1 | 2163# | 2178 | 2184 |
| PUSH2 | 2164# | 2167 | 2170 |
| PUSH3 | 2169 | 2174# |
| PUSH4 | 2175# | 2180 |
| PUSH5 | 2179 | 2184# |
| PUSHIT | 786 | 789# |
| RCDT1 | 1686 | 1689# |
| RDOPSW | 1716# |
| RDOS1 | 1717# | 1722 |
| RDOS2 | 1718# | 1723 |
| RDREF | 541# | 984 | 2387 |
| RDREF1 | 543# | 544 |
| RECSTA | 142# | 355 | 388 | 410 | 470 | 620 | 994 | 1007 | 1035 | 1077 | 1256 |
| REJBIL | 835 | 1515 | 2205# |
| REJJMP | 1258 | 1261 | 1280 | 1290 | 1305 | 1314 | 1343 | 1351 | 1359 | 1379 | 1382 | 1404 | 1409 | 1425# |
| RELAY | 2011 | 2014 | 2035# |
| RESET | 293# | 2540 |
| RETRN | 285# | 1588 |
| RJBIL1 | 2209# | 2226 | 2228 | 2229 |
| RJBIL2 | 2211# |
| RJBIL3 | 2209 | 2224# | 2230 |
| RLOPD | 986# |
| RLYCDT | 1615 | 1665 | 1685# |
| RLYCOM | 2041 | 2069 | 2077 | 2083# |
| RLYOUT | 1620 | 1689 | 2007# |
| ROTLFT | 2294 | 2328# |
| ROTRGT | 2256 | 2261 | 2345# |
| RTNBIL | 1587# |
| RVSBIL | 359# |
| SAVDPS | 390 | 413# |
| SCRTCH | 126# | 157 | 159 | 160 | 164 | 165 | 166 | 167 | 168 | 169 | 170 | 171 |
| SEED1 | 265# | 1880 |
| SEED2 | 266# | 1880 |
| SEED5 | 267# | 1880 |
| SEEDS | 264# | 1880 |
| SENDIT | 2487# | 2506 |
| SEPFIV | 248# | 1953 |
| SEPONE | 244# | 1935 |
| SEPTWO | 246# | 1944 |
| SERI1 | 1759# |
| SERINT | 1757# |
| SETBRD | 503 | 519 | 523# |
| SETDNM | 497 | 499# |
| SETERR | 486# | 515 | 521 | 692 |
| SETFWD | 498# |
| SETPRT | 504# | 516 |
| SHRTP | 2066 | 2076# | 2079 |
| SLUG | 286# | 1507 |
| SMART | 1528 | 1546# |
| SMART1 | 1563# | 1583 |
| SMART2 | 1566 | 1579# |
| SMRT1A | 1564# | 1567 |
| SMRT1B | 1565 | 1567# |
| SMRT2A | 1580# | 1585 |
| SMRT2B | 1581 | 1585# |
| SND0 | 1974 | 1978# |
| SND1 | 1977 | 1980# |
| SNDBYT | 1962 | 1971# |
| SNDDAT | 2488 | 2515# |
| SNDDB1 | 1961# | 1964 |
| SNDDBG | 1692 | 1959# |
| SNDDLP | 2521# | 2533 |
| SNDFLR | 791 | 2213# |
| SNDM1 | 2480# | 2484 |
| SNDM1A | 2481# | 2485 |
| SNDM2 | 2490# | 2494 |
| SNDM2A | 2491# | 2496 |
| SNDM3 | 2499# |
| SNDM3A | 2500# | 2508 |
| SNDM3B | 2501# | 2505 |
| SNDM3C | 2504 | 2508# |
| SNDMES | 1513 | 1558 | 1574 | 2220 | 2478# |
| SNDONE | 2522 | 2525# |
| SNDVAL | 1551 | 1553 | 1555 | 1558# |
| SNDVND | 1572# |
| SNDZRO | 2519 | 2523# |
| SNGLE | 2040# |
| SPCWTH | 131# | 677 | 1158 |
| SPEED | 117# | 877 | 878 | 1138 | 1326 | 1411 |
| STACKR | 1691 | 2139# |
| STKCAM | 98# | 840 |
| STKFUL | 70# | 846 |

```
STKLIM    95#   840
SUBSTP   328    627    667    741    959   1888#
SUBTIM   336    638   1890#
SUBTWO  2296   2302   2308#
TAKBIL  1569   1685   2104#
TRASEN    74#   798    833    846
TRATMR   144#  1063
TSTENA   567#  1607   1660
TSTFIV  1472   1476   1948#
TSTONE  1369   1373   1930#
TSTREF  1638   2120   2386#
TSTS1   1800#
TSTS2   1818#
TSTS2A  1831#
TSTS3   1818   1841#
TSTS3A  1836   1845#
TSTS4   1849#
TSTSMP  1232   1236   1240   1244   1799#
TSTTWO  1393   1397   1939#
TWODLR   281#  1552
VEND     284#  1573
WAIT     589    776    899   1524   2029   2071   2084*  2124   2151   2361#  2367
WAIT1   2362#  2365
WAIT20  2078   2165   2176   2224   2360#
WNDW1   1235   1855#
WNDW2   1239   1857#
WNDW5   1243   1859#
WNDWS   1231   1853#
XMTALP  1976#  1985
ZROTST  1910#

CROSS REFERENCE COMPLETE
```

What is claimed is:

1. A method for determining the authenticity and denomination of paper currency, said currency having a plurality of distinct areas each containing currency identifying characteristics, said method comprising the steps of:

scanning one of said areas with an electrical signal generating sensor and thereby generating a sequence of electrical signals in response to the currency identifying characteristics detected by the sensor in the area scanned, measuring the intervals between the generated signals, classifying each of the measured intervals into one of a plurality of sets, the classification of each of the measured intervals being dependent upon the length of that interval, and determining the difference between the number of intervals in one of said sets and the number of intervals in another of said sets.

2. The method of claim 1 further comprising the steps of comparing said difference with a predetermined constant.

3. The method of claim 1 or 2 wherein the measured intervals are classified by producing a value representative of the length of each interval and comparing said value with reference values for members of the sets.

4. The method of claim 3 in which the reference values are normalized by comparison of information contained in said sequence of signals with standard information for acceptable bills.

5. The method of claim 3 in which the reference values are normalized by comparison of the measured interval between the first and last signals in said sequence of signals with a standard interval for acceptable bills.

6. The method of claim 5 in which the area scanned is a horizontal line along the major axis of a U.S. bill through the portrait, and the measured and standard intervals represent times for scanning the width of the portrait.

7. The method of claim 1 wherein the difference is determined between the number of intervals in the set containing the greatest number of intervals and the set containing the second greatest number of intervals, further comprising the step of comparing said difference with a predetermined constant.

8. The method of claim 7 in which the reference values are normalized by comparision of information contained in said sequence of signals with standard information for acceptable bills.

9. The method of claim 7 in which the reference values are normalized by comparison of the measured interval between the first and last signals in said sequence of signals with a standard interval for acceptable bills.

10. The method of claim 9 in which the area scanned is a horizontal line along the major axis of a U.S. bill through the portrait, and the measured and standard intervals represent times for scanning the width of the portrait.

11. A method for determining the authenticity and denomination of paper currency, said currency having a plurality of distinct areas each containing currency identifying characteristics, said method comprising the steps of:

scanning each of a plurality of said areas with an electrical signal generating sensor and thereby generating a sequence of electrical signals in response to the currency identifying characteristics detected by the sensor with respect to each such area scanned, measuring the intervals between the generated signals with respect to at least one such scanned area, classifying each of the measured intervals in a sequence into one of a plurality of sets, the classification of each of the measured intervals being dependent upon the length of that interval, and with respect to the intervals of a sequence, determining the difference between the number of intervals in one of said sets and the number of intervals in another of said sets.

12. A method for determining the authenticity and denomination of paper currency, said currency having a plurality of distinct areas each containing currency identifying characteristics, said method comprising the steps of:

scanning one of said areas with an electrical signal generating sensor and thereby generating a sequence of electrical signals in response to the currency identifying characteristics detected by the sensor in the area scanned, measuring the intervals between the generated signals, calculating a first quantity comprising the aggregate value of all measured intervals in the sequence having a value greater than a predetermined value, calculating a second quantity comprising the measured interval between the first and last signals in said sequence of signals, determining the ratio between said first quantity and said second quantity, and comparing said ratio with a standard ratio for acceptable bills.

13. The method of claim 2 further comprising the step of producing a signal indicative of the authenticity and denomination of said currency based upon the comparison of said difference with the predetermined constant.

14. The method of claim 13 further comprising the step of adjusting the predetermined constant to adjust the accuracy of denomination determination and the acceptance/rejection ratio.

15. The method of claim 7 further comprising the steps of determining the difference between the number of intervals in the set containing the greatest number of intervals and the number of intervals in at least one additional set beyond the second set and comparing this difference with at least one additional predetermined constant.

16. The method of claim 1 or claim 7 further comprising the step of comparing the number of intervals in a predetermined set to a constant for purposes of distinguishing lower denomination currency from higher denomination currency.

17. The method of claim 1 further comprising the steps of scanning a second of said areas with the electrical signal generating sensor and thereby generating a second sequence of electrical signals in response to the currency identifying characteristics detected by the sensor in the second area scanned, measuring the intervals between the second set of generated signals, comparing the length of the measured intervals to see if they exceed a predetermined duration constant, computing the sum of the measured intervals exceeding the duration constant, measuring the intervals between the first and last signals in the second set of generated signals, and computing the ratio of the sum of the measured intervals exceeding the duration constant, and the interval between the first and last signals in the second set of generated signals.

18. The method of claim 17 further comprising the steps of normalizing the measured interval between the first and last signals in the second set of generated signals and comparing said normalized measured interval with a predetermined width constant.

19. The method either claim 1 or claim 17 further comprising the step of scanning an additional one of said areas with a second electrical signal generating sensor.

20. The method of claim 17 further comprising the steps of measuring the interval between the first and the second sets of generated signals, and comparing the interval between the first and second sets of generated signals with a predetermined interval constant.

21. The method of claim 12 further comprising the steps of normalizing the second quantity and comparing the normalized second quantity with a first constant.

22. The method of claim 21 further comprising the step of comparing the normalized second quantity with a second constant.

23. A method for determining the authenticity and denomination of a U.S. bill, said bill having a portrait area containing a background of grid lines, said method comprising the steps of:

scanning said portrait area with a signal generating sensor and thereby generating a sequence of signals in response to the grid lines detected by said sensor, measuring the intervals between said generated signals, classifying at least some of said measured intervals into a plurality of sets having predefined bounds, the classification of each interval being dependent upon the length of that interval, calculating a value corresponding to the difference between the number of intervals in the set into which the largest number of intervals have been classified and the number of intervals in one or more of said other sets, and rejecting said bill as inauthentic or of improper denomination if said calculated value is less than a predefined difference value.

24. The method of claim 23 further comprising the steps of:

measuring the interval between the initial signal generated during scanning of said portrait area and the final signal generated during scanning of said portrait area, calculating a value corresponding to the ratio of said measured portrait area interval to a known portrait area interval, and normalizing the bounds for one or more sets of said plurality of sets based on said calculated ratio value.

25. The method of claim 23 wherein said predefined difference value is adjustable to allow the adjustment of the degree of confidence with which said bill is identified as inauthentic or of improper denomination.

26. The method of claim 23 wherein said classifying step is applied only to a preselected group of said measured intervals.

27. The method of claim 26 wherein said preselected group of measured intervals comprises intervals between signals generated by the scanning of the right and left hand sides of said portrait area.

28. The method of claim 23 wherein the plurality of sets having predefined bounds comprise sets defined about seed values of 0.008 inches, 0.010 inches and 0.011 inches, and those measured intervals not falling within one of the plurality of sets are discarded.

29. The method of claim 28 further comprising the step of normalizing the seed values.

30. The method of claim 23 wherein said bill further includes a denomination area containing bill identification lines, said method further comprising the steps of:

scanning said denomination area of said bill with the signal generating sensor and thereby generating a sequence of signals in response to the lines detected by said sensor, measuring the interval between the generated signals, calculating a first quantity corresponding to the aggregate value of all measured intervals in said sequence having a value greater than a predetermined value, calculating a second quantity corresponding to the measured interval between the initial signal and the final signal in said sequence of signals, calculating a value corresponding to the ratio between said first quantity and said second quantity, and rejecting said bill as inauthentic or of improper denomination if said calculated value is less than a predetermined minimum ratio value or greater than a predetermined maximum ratio value.

31. The method of claim 24 or claim 30 further comprising the steps of:

counting the number of intervals classified in one of said plurality of sets, rejecting said bill as inauthentic or of improper denomination if said number exceeds a predetermined value.

32. The method of claim 24 or claim 30 wherein said bill further includes a border area containing bill identification lines, said method further comprising the steps of:

scanning said border area of said bill with the signal generating sensor and thereby generating a sequence of signals in response to the lines detected by said sensor, counting the number of said generated signals, rejecting said bill as inauthentic or of improper denomination if said number exceeds a predetermined number.

33. A method as in claim 24 or 30 further comprising the steps of:

measuring the interval between the initial signal in said portrait area and the final signal of said portrait area, calculating a value equal to the ratio of said measured interval and a known interval representative of the width of the portrait field in an authentic U.S. bill, and normalizing the predefined bounds of the plurality of sets using said calculated value.

34. The method of claim 30 further comprising the steps:

measuring the interval between the initial signal in said portrait area and the final signal of said portrait area, calculating a normalization value equal to the ratio of said measured interval and a known interval representative of the width of the portrait field in a authentic U.S. bill, and normalizing the predefined bounds of the plurality of sets using the calculated normalization value before said classifying step.

35. The method of claim 34 further comprising the steps of:

measuring the interval between the final signal in the portrait area and the initial signal in the denomination area, normalizing said measured interval using the normalization value, and comparing said normalized measured interval with a stored constant value for a predetermined U.S. bill.

36. A method for determining the authenticity and denomination of paper currency, said currency having a plurality of distinct nonblank areas each containing currency identifying characteristics, said method comprising the steps of:

scanning one of said areas with an electrical signal generating sensor and thereby generating a sequence of electrical signals in response to the currency identifying characteristics detected by the sensor in the area scanned, measuring the interval between the first and last signals of the sequence, storing an interval constant representative of the interval for a known acceptable denomination of paper currency, and computing a normalization constant by computing the ratio of the measured interval and the interval constant.

37. The method of claim 36 further comprising the steps of measuring the intervals between generated signals other than the first and last signals of the sequence, defining a plurality of sets having bounds which are normalized using the normalization constant, classifying each of said measured intervals into one of the plurality of sets if that measured interval falls into any set, and determining the difference between the number of intervals in one of said sets and the number of intervals in another of said sets.

38. A method for determining the authenticity and denomination of a U.S. bill, said bill having a portrait area containing a background of grid lines, said method comprising the steps of:

scanning said portrait area with a signal generating sensor and thereby generating a sequence of signals in response to the grid lines detected by said sensor, measuring the portrait area width by determining the interval between the initial signal and the final signal for the portrait area, storing a portrait area width constant indicative of the known width of the portrait area of a genuine U.S. bill, and computing a normalization constant equal to the ratio of the measured portrait area width and the portrait area width constant.

39. An improved currency validation apparatus for determining the authenticity and denomination of paper currency having a plurality of areas containing currency identifying characteristics, said apparatus comprising:

an electrical signal generating sensor means for scanning at least one of said areas of said currency and for generating a sequence of signals in response to the currency identifying characteristics detected by the sensor in the area scanned, means for measuring the intervals between the generated signals, means for classifying at least some of the measured intervals into one of a plurality of sets, the classification of each of said measured intervals being dependent on the length of that interval, and means for obtaining information indicative of the authenticity and denomination of said currency based on the contents of these sets.

40. The apparatus of claim 39 wherein said information consists of count values of the number of intervals in the sets.

41. The apparatus of claim 40 further comprising means to determine the difference between two count values.

42. The apparatus of claim 41 further comprising means for comparing said difference with a predefined difference value.

43. The apparatus of claim 42 further comprising means for externally adjusting the predefined difference value.

44. The apparatus of claim 39 wherein the means for measuring intervals also measures the interval between the initial and final signals of the sequence of generated signals, and the apparatus further comprises:

means for storing an interval constant representative of the interval between initial and final signals for a predetermined genuine piece of currency, and means to determine a normalization constant by calculating the ratio of the measured interval between the initial and final signals and the stored interval constant.

45. A method for determining the authenticity and denomination of paper currency, said currency having a plurality of distinct areas each containing currency identifying characteristics, said method comprising the steps of:

scanning one of said areas with a first electrical signal generating sensor and thereby generating a sequence of electrical signals in response to the currency identifying characteristics detected by the sensor in the area scanned, measuring the intervals between the generated signals, classifying at least some of the measured intervals into an appropriate one of a plurality of sets, the classification of each of the measured intervals being dependent upon the length of that interval, and determining the authenticity and denomination of said currency based upon the classifications of measured intervals in the plurality of sets.

46. The method of claim 45 further comprising the steps of scanning a second of said areas with a second electrical signals generating sensor and rejecting said currency if both the sensors produce signals as they scan the second of said areas.

47. The method of claim 46 wherein the first sensor is a magnetic sensor and the second sensor is an optical sensor.

48. The method of claim 46 wherein the second sensor is an optical sensor which generates a plurality of signals as an acceptable piece of paper currency is moved relative to the optical scanner, and the method further comprises the steps of transporting a piece of paper currency relative to the first and second sensors so that those sensors can scan the piece of paper currency, interrupting the transporting for a period during which the authenticity and denomination are determined, continuing the transporting if the piece of paper currency is acceptable, determining if the second sensor has generated a number of signals exceeding a predefined constant during or after the period of interruption; and rejecting the piece of paper currency if the generated number of signals from the second sensor excedes the predefined constant.

49. The method of claim 1 or 45 further comprising the step of initially establishing operational constants by producing a signal indicating to the validator that a known bill type will be inserted, deriving test information from the insertion of the known bill type, computing appropriate operational constants from said test information, and storing the computed operational constants for future use in determining the authenticity and denomination of paper currency.

50. The method of claim 1 or 45 further comprising the steps of storing one or more operational constants in memory, and modifying said stored constants over a period of time using a microprocessor under program control, based upon experience with acceptable paper currency.

51. The apparatus of claim 39 further comprising means for producing a signal indicating that an authentic piece of a known denomination of paper currency will be inserted, means for deriving test information from the authentic piece, means to compute operational constants from said test information, and means to store the computed operational constants for future use in determining the authenticity and denomination of paper currency.

52. The apparatus of claim 39 or 51 further comprising a memory for storing operational constants and a microprocessor under program control for modifying the operational constants stored in memory based upon experience with paper currency accepted by the apparatus.

* * * * *

UNITED STATES PATENT AND TRADEMARK OFFICE
CERTIFICATE OF CORRECTION

PATENT NO. : 4,628,194

DATED : December 9, 1986

INVENTOR(S) : Bob M. Dobbins & Elwood E. Barnes

It is certified that error appears in the above-identified patent and that said Letters Patent is hereby corrected as shown below:

Abstract, lines 2-3 & 13, "bank note" should be --banknote--.

Col. 78, Claim 12, line 67, before "acceptable", insert --an--; line 68, delete "bills" and insert --denomination of paper currency--.

Col. 83, claim 46, line 27, "signals" should be --signal--.

Signed and Sealed this

Eighth Day of September, 1987

*Attest:*

DONALD J. QUIGG

*Attesting Officer*

*Commissioner of Patents and Trademarks*